(12) United States Patent
Stabelfeldt et al.

(10) Patent No.: US 7,373,284 B2
(45) Date of Patent: May 13, 2008

(54) METHOD OF EVALUATING THE PERFORMANCE OF A PRODUCT USING A VIRTUAL ENVIRONMENT

(75) Inventors: Sara Jane W. Stabelfeldt, Appleton, WI (US); Yung H. Huang, Appleton, WI (US); Christopher M. Pieper, Hortonville, WI (US); Richard N. Dodge, II, Appleton, WI (US); David L. Zenker, Neenah, WI (US); Ellen S. Green, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 611 days.

(21) Appl. No.: 10/843,186

(22) Filed: May 11, 2004

(65) Prior Publication Data

US 2005/0256686 A1   Nov. 17, 2005

(51) Int. Cl.
*G06F 17/50* (2006.01)
*G06F 19/00* (2006.01)

(52) U.S. Cl. .............................. 703/2; 703/6; 700/132; 345/419; 345/629

(58) Field of Classification Search ................. 703/2, 703/6; 700/132; 345/629, 419
See application file for complete search history.

(56) References Cited

U.S. PATENT DOCUMENTS

| | | | |
|---|---|---|---|
| 4,539,585 A | 9/1985 | Spackova et al. | |
| 4,546,434 A | 10/1985 | Gioello | |
| 4,598,376 A | 7/1986 | Burton et al. | |
| 4,885,844 A | 12/1989 | Chun | |
| 5,163,006 A | 11/1992 | Deziel | |
| 5,163,007 A | 11/1992 | Slilaty | |

(Continued)

FOREIGN PATENT DOCUMENTS

EP    0 205 683 A1    12/1986

(Continued)

OTHER PUBLICATIONS

Zhang et al., "Numerical Simulation of 3D Dynamic Garment Pressure", Textile Research Journal, Mar. 2002, vol. 72, No. 3, pp. 245-252, TRI/Princeton, New Jersey, www.textileresearchjournal.com.

(Continued)

*Primary Examiner*—Thai Phan
(74) *Attorney, Agent, or Firm*—Armstrong Teasdale LLP

(57) ABSTRACT

In a method of evaluating a product worn on a body, a computer based body sub-model of at least a portion of the body is created. A computer based product sub-model of the product is created, at least one parameter of which is variable as a function of fluid loading of the product. A computer based interaction model is also created to define instructions as to how the body sub-model and the product sub-model interact and to further define instructions corresponding to a fluid loading of the product. The body sub-model, the product sub-model and the interaction model are combined in a use model to simulate interaction between the body sub-model and the product sub-model in response to fluid loading of the product. The use model is evaluated to determine the performance of at least one product feature of the product in response to fluid loading of the product.

37 Claims, 30 Drawing Sheets

U.S. PATENT DOCUMENTS

| | | |
|---|---|---|
| 5,208,765 A | 5/1993 | Turnbull |
| 5,341,305 A | 8/1994 | Clarino et al. |
| 5,495,568 A | 2/1996 | Beavin |
| 5,548,519 A | 8/1996 | Park et al. |
| 5,680,528 A | 10/1997 | Korszun |
| 5,682,506 A | 10/1997 | Corby, Jr. et al. |
| 5,724,522 A | 3/1998 | Kagami et al. |
| 5,768,135 A | 6/1998 | Park et al. |
| 5,850,222 A | 12/1998 | Cone |
| 5,864,480 A | 1/1999 | Ladd |
| 5,956,525 A | 9/1999 | Minsky |
| 6,070,269 A | 6/2000 | Tardif et al. |
| 6,093,027 A | 7/2000 | Unger et al. |
| 6,101,424 A | 8/2000 | Sawada |
| 6,256,038 B1 | 7/2001 | Krishnamurthy |
| 6,307,568 B1 | 10/2001 | Rom |
| 6,324,437 B1 | 11/2001 | Frankel et al. |
| 6,488,202 B1 | 12/2002 | Seitz et al. |
| 6,701,207 B1 | 3/2004 | Gazzuolo |
| 6,711,455 B1 | 3/2004 | Holloway et al. |
| 6,725,124 B2 | 4/2004 | Yan |
| 6,810,300 B1 * | 10/2004 | Woltman et al. ............ 700/132 |
| 7,099,734 B2 * | 8/2006 | Pieper et al. ............... 700/132 |
| 2004/0236455 A1 * | 11/2004 | Woltman et al. ............ 700/132 |
| 2004/0236552 A1 * | 11/2004 | Pieper et al. ................... 703/6 |

FOREIGN PATENT DOCUMENTS

| | | |
|---|---|---|
| EP | 0 887 055 A1 | 12/1998 |
| EP | 1 124 191 A2 | 8/2001 |
| WO | WO 97/45088 A1 | 12/1997 |
| WO | WO 99/18487 A2 | 4/1999 |
| WO | WO 00/38117 A1 | 6/2000 |
| WO | WO 01/20517 A2 | 3/2001 |
| WO | WO 01/39584 A2 | 6/2001 |
| WO | WO 01/46911 A1 | 6/2001 |
| WO | WO 01/52140 A1 | 7/2001 |
| WO | WO 01/53910 A2 | 7/2001 |
| WO | WO 01/75771 A1 | 10/2001 |

OTHER PUBLICATIONS

Doyle, "Virtual Engineering: Toward a Theory for Modeling and Simulation of Complex Systems", vol. 9: Modeling and Simulation, Appendix B, Aug. 9, 2001, www.nap.edu/html/tech_21st/msb.htm.

Baraff, et al. "Large Steps in Cloth Simulation", Siggraph '98 Conference Proceedings, Orlando, Florida, Jul. 19-24, 1998, pp. 1-12.

Barry, et al. "Computational Fluid Dynamics Modeling of Fabric Systems for Intelligent Garment Design", Mrs. Bulletin, Aug. 2003, pp. 568-573.

Choi, et al. "Stable but Responsive Cloth", Proceedings of Siggraph Annual International Conference on Computer Graphics and Interactive Techniques, vol. 21, No. 3, Jul. 2002, pp. 604-611.

Fluent News "Diapers: Better by Design with CFD", Spring 2000, 1 page.

Hill, et al. "New Developments in the Assessment of Protective Fabrics using Computational Models", International Nonwovens Journal Winter 2004, pp. 22-30.

Li, et al. "Integrated CAD for Functional Textiles and Apparel", Ergonomics of Protective Clothing, May 7, 2000, pp. 8-11.

Li, et al. "A 3D Biomechanical Model for Numerical Simulation of Dynamic Mechanical Interactions of Bra and Breast During Wear", Sen'l Gakkaishi 2003, vol. 59, No. 1, pp. 12-21.

NG, et al. "Computer Graphics Techniques for Modeling Cloth", IEEE Computer Graphics and Applications, vol. 16, No. 5, Sep. 1996, pp. 28-41.

International Search Report for PCT/US2005/014505 dated Aug. 25, 2005, 4 pages.

* cited by examiner

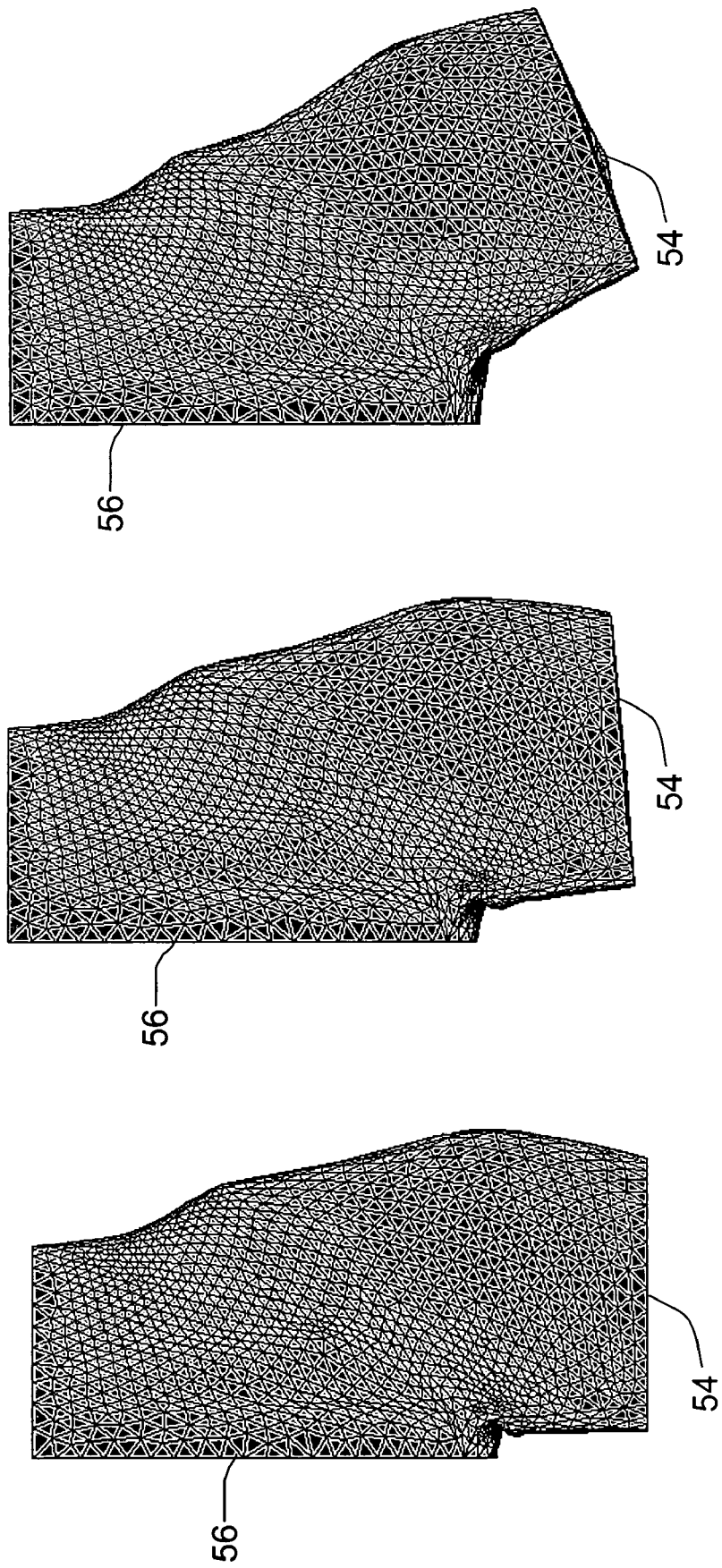

FIG. 27A

| | Code A | | Code B | | Code C | | Code D | |
|---|---|---|---|---|---|---|---|---|
| | Region 1 | Region 2 | Region 1 | Region 2 | Region 1 | Region 2 | Region 1 | Region 2 |
| Area(cm2) | 110 | 284 | 110 | 284 | 110 | 284 | 110 | 284 |
| Density(g/cm3) | 0.24 | 0.24 | 0.24 | 0.24 | 0.24 | 0.24 | 0.24 | 0.24 |
| SAP Basis Weight(gsm) | 543 | 239 | 543 | 239 | 338 | 338 | 338 | 338 |
| Fluff Basis Weight(gsm) | 707 | 311 | 707 | 311 | 439 | 439 | 439 | 439 |
| Total Basis Weight(gsm) | 1250 | 550 | 1250 | 550 | 777 | 777 | 777 | 777 |
| Fluid Capacity(g) | 234 | 266 | 234 | 266 | 145 | 375 | 145 | 375 |
| Absorbent Weight(g) | 13.75 | 15.62 | 13.75 | 15.62 | 8.55 | 22.07 | 8.55 | 22.07 |
| Dry Values | | | | | | | | |
| Fluid Loading(g) | 0 | 0 | 0 | 0 | 0 | 0 | 0 | 0 |
| Thickness(cm) | 0.521 | 0.229 | 0.521 | 0.229 | 0.324 | 0.324 | 0.324 | 0.324 |
| Saturation(g/g) | 0 | 0 | 0 | 0 | 0 | 0 | 0 | 0 |
| Density (g/cm^3) | 0.24 | 0.24 | 0.24 | 0.24 | 0.24 | 0.24 | 0.24 | 0.24 |
| Insult 1 | | | | | | | | |
| Fluid Loading(g) | 70 | 0 | 33 | 37 | 70 | 0 | 20 | 50 |
| Thickness(cm) | 1.22 | 0.229 | 0.982 | 0.432 | 0.924 | 0.324 | 0.604 | 0.604 |
| Saturation(g/g) | 5.09 | 0.00 | 2.40 | 2.37 | 8.19 | 0.00 | 2.34 | 2.27 |
| Density (g/cm^3) | 0.62 | 0.24 | 0.43 | 0.43 | 0.77 | 0.24 | 0.43 | 0.42 |
| Insult 2 | | | | | | | | |
| Fluid Loading(g) | 140 | 0 | 66 | 74 | 140 | 0 | 39 | 101 |
| Thickness(cm) | 1.691 | 0.229 | 1.194 | 0.525 | 1.729 | 0.324 | 0.733 | 0.733 |
| Saturation(g/g) | 10.18 | 0.00 | 4.80 | 4.74 | 16.38 | 0.00 | 4.56 | 4.58 |
| Density (g/cm^3) | 0.83 | 0.24 | 0.61 | 0.60 | 0.78 | 0.24 | 0.59 | 0.59 |

FIG. 27B

| | Code A | | Code B | | Code C | | Code D | |
|---|---|---|---|---|---|---|---|---|
| | Region 1 | Region 2 | Region 1 | Region 2 | Region 1 | Region 2 | Region 1 | Region 2 |

Insult 3
| | | | | | | | | |
|---|---|---|---|---|---|---|---|---|
| Fluid Loading(g) | 210 | 0 | 98 | 112 | 145 | 65 | 59 | 151 |
| Thickness(cm) | 2.504 | 0.229 | 1.392 | 0.613 | 1.845 | 0.644 | 0.85 | 0.85 |
| Saturation(g/g) | 15.27 | 0.00 | 7.13 | 7.17 | 16.97 | 2.95 | 6.90 | 6.84 |
| Density (g/cm^3) | 0.81 | 0.24 | 0.73 | 0.73 | 0.76 | 0.48 | 0.72 | 0.72 |

Insult 4
| | | | | | | | | |
|---|---|---|---|---|---|---|---|---|
| Fluid Loading(g) | 234 | 46 | 131 | 149 | 145 | 135 | 78 | 202 |
| Thickness(cm) | 2.965 | 0.458 | 1.62 | 0.713 | 1.845 | 0.81 | 0.982 | 0.982 |
| Saturation(g/g) | 17.02 | 2.94 | 9.53 | 9.54 | 16.97 | 6.12 | 9.13 | 9.15 |
| Density (g/cm^3) | 0.76 | 0.47 | 0.81 | 0.81 | 0.76 | 0.68 | 0.80 | 0.80 |

Insult 5
| | | | | | | | | |
|---|---|---|---|---|---|---|---|---|
| Fluid Loading(g) | 234 | 116 | 164 | 186 | 145 | 205 | 98 | 252 |
| Thickness(cm) | 2.965 | 0.624 | 1.908 | 0.84 | 1.845 | 0.991 | 1.146 | 1.146 |
| Saturation(g/g) | 17.02 | 7.43 | 11.93 | 11.91 | 16.97 | 9.29 | 11.47 | 11.42 |
| Density (g/cm^3) | 0.76 | 0.74 | 0.85 | 0.85 | 0.76 | 0.81 | 0.85 | 0.84 |

Insult 6
| | | | | | | | | |
|---|---|---|---|---|---|---|---|---|
| Fluid Loading(g) | 234 | 186 | 197 | 223 | 145 | 275 | 117 | 303 |
| Thickness(cm) | 2.965 | 0.841 | 2.299 | 1.012 | 1.845 | 1.233 | 1.362 | 1.362 |
| Saturation(g/g) | 17.02 | 11.91 | 14.33 | 14.28 | 16.97 | 12.46 | 13.69 | 13.73 |
| Density (g/cm^3) | 0.76 | 0.84 | 0.83 | 0.83 | 0.76 | 0.85 | 0.84 | 0.84 |

Insult 7
| | | | | | | | | |
|---|---|---|---|---|---|---|---|---|
| Fluid Loading(g) | 234 | 256 | 229 | 261 | 145 | 345 | 137 | 353 |
| Thickness(cm) | 2.965 | 1.229 | 2.87 | 1.263 | 1.845 | 1.606 | 1.667 | 1.667 |
| Saturation(g/g) | 17.02 | 16.39 | 16.65 | 16.71 | 16.97 | 15.63 | 16.03 | 16.00 |
| Density (g/cm^3) | 0.76 | 0.78 | 0.77 | 0.77 | 0.76 | 0.80 | 0.79 | 0.79 |

METHOD OF EVALUATING THE PERFORMANCE OF A PRODUCT USING A VIRTUAL ENVIRONMENT

BACKGROUND OF THE INVENTION

This invention relates generally to evaluation of articles positioned on a body, and in particular to a computer-based simulation system for evaluating articles with a comfortable fit to a human body across a body's range of motion and subjected to various use conditions.

Clothing and other articles which are used on the body should interface with the body so as to be comfortable when the user is stationary, such as when standing or sitting, and also during movement, such as when walking. One ideal article would fit against the user's body with suitable contact pressure sufficient to hold the article in place but without constricting the skin or degrading comfort. This is challenging because of the wide variation in body shapes of potential users and the various potential material properties the article may have can affect the interactions between the body and the article.

Body fit is often influenced by size or shape of the article but is also characterized by less tangible descriptions such as moving with the body or being less noticeable while wearing. Fit depends on an initial position of the article relative to the body and any subsequent user movements which shift relative positions, deflect the article's shape, and/or cause the article to apply greater or lesser pressure against the user's body. Comfort is influenced by multiple factors including the shape of the user's body, mechanical properties of the underlying bodily tissue, the shape and size of the article, mechanical properties of the article, and interactions between the article and any other adjacent articles. These properties are highly three-dimensional in nature and are not easily analyzed when designing a new article or improving an existing article's configuration.

In addition to comfort, articles may have functional requirements which aggravate the difficulty in finding a satisfactory article configuration. For example, absorbent products for personal care and/or personal protective use, such as disposable diapers, disposable pants, medical garments, feminine hygiene products, incontinence products, medical drapes, facemasks and barrier products, should fit well against the body not only for comfort, but also for effectiveness in absorbing bodily exudates without leakage. A product of this type that fails to fit well may apply undesired pressure against the user's body or contain gaps or openings that can cause the product to fail functionally. For example, as a person stands up from a seated position or walks, his or her thighs may squeeze a diaper or other absorbent product and may deform it in a manner that results in leakage of fluid.

The development of new or improved products that avoid these problems is complex due to the large number of potential shapes, contours, sizes, component materials, and material distributions. The advent of newer materials with an improved range of compressive and elastic properties and less bulk emphasizes a need to understand the complex interactions between the body and the product. Unfortunately, the process of identifying an acceptable or optimum combination of design parameters which is functionally effective and comfortable across a normal range of user body shapes and motions is time consuming and becomes a substantial expense.

New products are typically defined with initial reliance on historical data, and are subsequently tested both in physical laboratories and in wearer use. Such tests use sample products in conjunction with human test subjects or physical models of test subjects. Unfortunately, physical testing has many limitations. The sample products can be constructed only with readily available materials and construction techniques. Even if materials and construction techniques are available, the time and expense of assembling a variety of sample articles for testing can be substantial and potentially prohibitive. Testing procedures are limited to available and acceptable physical tests. These tests, when available, are limited by their physical nature including safety issues, which are especially applicable as they relate to human-use testing. Moreover, the resources needed for human-use testing can be enormous and the time required for that testing could delay market entry. One can go through considerable time and expense to find out that a material or product idea will not work.

SUMMARY OF THE INVENTION

In one embodiment, a method of the present invention of evaluating a product worn on a body generally comprises creating a computer based product sub-model of the product wherein at least one parameter of the product sub-model is variable as a function of fluid loading of the product. A computer based interaction model is created comprising at least in part instructions corresponding to fluid loading of the product. The product sub-model and the interaction model are combined in a use model to simulate interaction of components of the product model upon varying the at least one parameter of the product sub-model as a function of the fluid loading. The use model is evaluated to determine the performance of at least one product feature of the product in response to fluid loading of the product.

In another embodiment the method comprises creating a computer based body sub-model of at least a portion of the body on which the product is positioned. A computer based product sub-model of the product is created, at least one parameter of which is variable as a function of fluid loading of the product. A computer based interaction model is also created and comprises instructions defining how the body sub-model and the product sub-model interact and further comprises instructions corresponding to a fluid loading of the product. The body sub-model, the product sub-model and the interaction model are combined in a use model to simulate interaction between the body sub-model and the product sub-model in response to fluid loading of the product. The use model is evaluated to determine the performance of at least one product feature of the product in response to fluid loading of the product.

In yet another embodiment, the method generally comprises creating a computer based body sub-model of at least a portion of the body on which the product is positioned. A computer based product sub-model of the product is created and comprises at least one of product material data and product geometry data. A computer based interaction model is created to comprise instructions defining how the body sub-model and the product sub-model interact. The interaction model also comprises a field variable wherein at least one parameter of the at least one of the product material data and the product geometry data of the product sub-model is variable as a function of the field variable. The interaction model further comprises instructions for varying the field variable as a function of elapsed simulation time to thereby vary the at least one parameter. The body sub-model, the product sub-model and the interaction model are combined in a use model which simulates an elapse of time during which the at least one parameter is modified to thereby modify the product sub-model from a first condition of the product to a second condition thereof. The use model simulates interaction between the body sub-model and the product sub-model to produce a first representation of at least one product feature of the product corresponding to the first condition of the product and to further produce a second representation of the at least one product feature of the product corresponding to the second condition of the product. The use model is evaluated to determine the performance of the at least one product feature of the product during the elapsed simulation time.

Other objects and features of the present invention will be in part apparent and in part pointed out hereinafter.

BRIEF DESCRIPTION OF THE DRAWINGS

FIGS. 7A-C are perspective representations of a finite element model of the representative wearer illustrating leg closure articulation;

FIGS. 27A and 27B are together a table of parameters used in performing four different example simulations;

Figure 1:
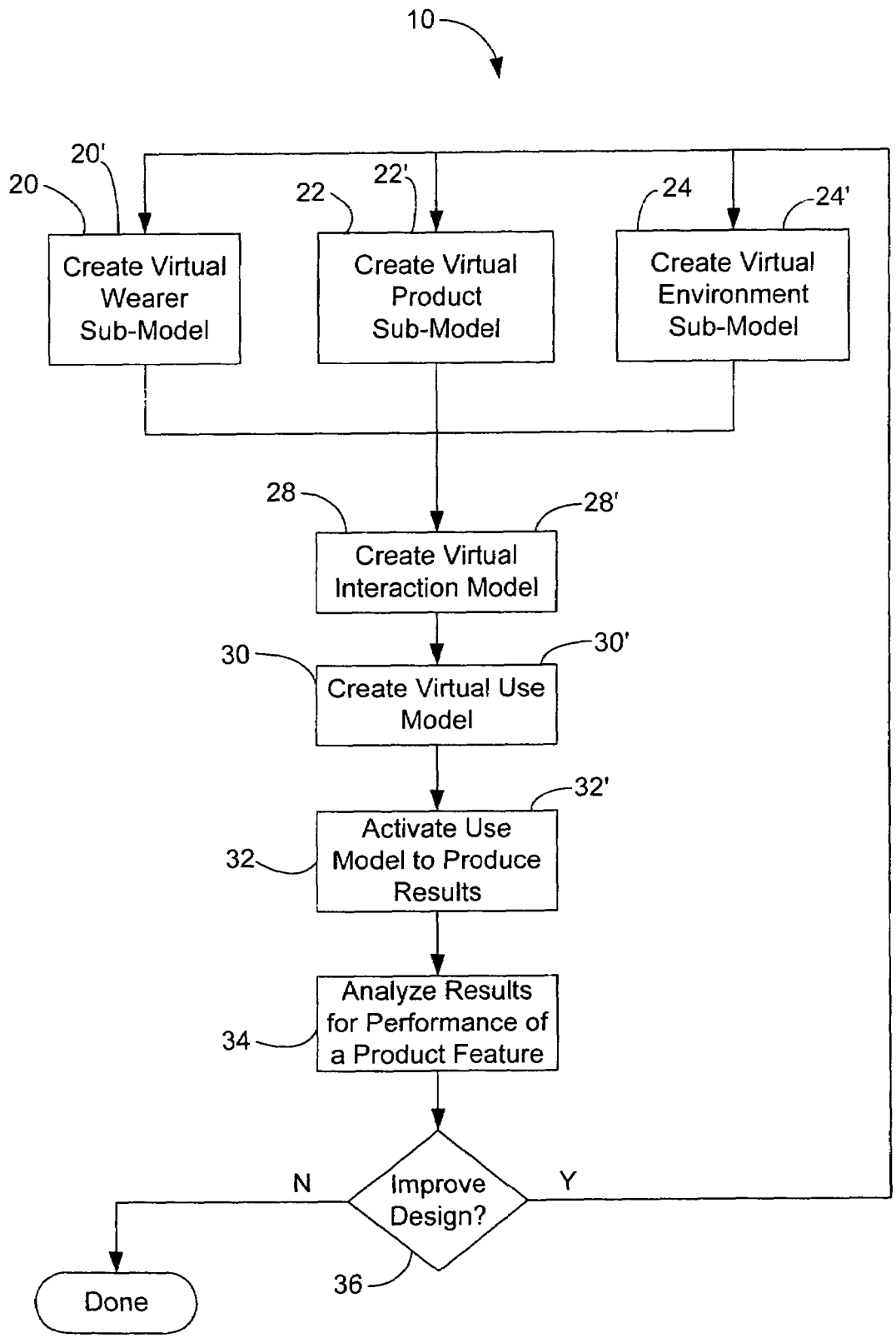
FIG. 1 is a flow diagram showing a method of evaluating and designing a product for use on a body.

Appendix 1 provides an example of input files for an example using the method to evaluate a diaper.

Appendix 2 provides an example of input files for an example using the method to evaluate a feminine care pad.

Appendix 3 provides an example of an input file for an example using the method to evaluate a fluid loaded diaper.

Corresponding reference characters indicate corresponding parts throughout the views of the drawings.

DEFINITIONS

"Body fit" is the relationship between a body and a product, and may also include the influence of the environment on the body and product.

"Constraints" may include forces, internal pressure, and limits to displacement at selected nodes.

"Contact constraints" define how components interact with each other such as by including specifications dictating or restricting the relative locations or contact surfaces of a model or sub-model and assigning frictional or thermal characteristics when surfaces meet.

"Kinematic constraints" define specifications dictating or restricting the motions of a model or sub-model.

"Instruction" defines how parts of the different sub-models interact with each other.

"Material properties" define the characteristics or parameters of a modeled material and may include the elastic modulus, Poisson's ratio and the like. For example, a user can select mechanical properties to simulate fabric, nonwovens, elastics, bone, muscle, body fat, tendon, etc.

"Product features" are measurable features of a product used to evaluate or design the product, such as stress, force vectors, contact pressure, curvature of a surface, deformation, density profiles, etc.

DETAILED DESCRIPTION OF THE PREFERRED EMBODIMENT

Referring now to the drawings and in particular to FIG. 1, a method, generally indicated by reference numeral 10, of evaluating a product for use on a body, is shown. The method 10 is used to develop a preferred product configuration using a computer-based virtual product development and testing system. When used herein, examples of specific equipment, software, products, and wearers are for illustrative purposes, and other types of these items may be used without departing from the scope of the present invention. In one embodiment, the method 10 includes creating a virtual wearer sub-model 20 at step 20' and creating a virtual product sub-model 22 at step 22'. An environment sub-model 24 may also be generated at step 24' so that environmental factors affecting the product or the wearer may also be used in designing or evaluating the product. Information used to create the sub-models 20, 22 and 24 can be obtained from product studies, databases, input from customers, or other sources of product, wearer or environmental data. Numerical method analysis is used to transform the modeling solution of complex interaction between the wearer sub-model 20 and the product sub-model 22 into a system of algebraic equations. Any of the several methods of conducting numerical method analysis known to those skilled in the art may be used. Preferably, finite element analysis (FEA) is used, however, other methods such as finite difference scheme (FDS), boundary element method, minimax methods for parameterized forms, neural network schemes, or cellular automata can also be used. Generally, FEA simplifies the problem into a finite number of unknown fields, sub-divides the region to be analyzed into elements, and expresses each unknown field in terms of assumed approximating functions within each element. Each geometric sub-model is divided into small sections called finite elements through a process referred to as meshing, with a number of nodal points, or nodes, defined at intersections of adjacent elements in the mesh. Meshing is performed using conventional software. Constraints and material properties are then applied to each element of the meshed structure. For example, a user can select mechanical properties to simulate fabric, nonwovens, elastics, bone, muscle, body fat or tendon. As known to those skilled in the art, the types of analysis on the meshed model may include static linear analysis, dynamic non-linear analysis, stability analysis, fluid flow analysis, or heat transfer analysis.

Instructions defining how the wearer sub-model 20, the product sub-model 22 and the environment sub-model 24 interact are introduced in an interaction model 28 created at step 28'. The sub-models 20, 22 and 24 and the interaction defined by the interaction model 28 are then combined to create a virtual use model 30 at step 30' simulating the use of the virtual product sub-model 22 by the virtual wearer sub-model 20. The use model 30 calculates the forces, deformations and stresses caused by movement and interaction between the virtual wearer sub-model 20 and the virtual product sub-model 22 using FEA analysis to solve the solutions for the algebraic systems of equations using conventional FEA software to produce simulation results 32 at step 32'.

The results 32 of the use model 30 are analyzed at step 34 to evaluate the performance of body and/or product features embodied in the virtual sub-model 20, 22 such as when positioned on a virtual wearer and exposed to typical movements or forces. The analysis evaluates the performance of at least one body and/or product feature of the product and/or wearer body. As will be explained in more detail below, body and product features are analyzed to better understand the product structure prior to developing and manufacturing a prototype. For example, two possible product features that may be measured and analyzed are a stress and a strain field. The stress or strain fields are analyzed to determine if the stresses or strains are within desired parameters. If the desired performance level is not achieved, or if additional testing is desired, the analyzed results can be used at step 36 to redesign the virtual product by modifying the characteristics of one or more of the of the sub-models 20, 22 and 24 or the interaction model 28 in order to modify the properties that affect the performance of the body and product features. A user may decide at step 36 to modify the sub-models, or a software program may perform an iterative process to obtain results 32 within a specified range of values. Alternately, the user may decide to modify the sub-models after completing the interaction model at step 28' or the use model at step 30'. After modifying one or more characteristics of the sub-models 20, 22, 24 or the interaction model 28, the steps of running the interaction model 28 and the use model 30 and to obtain new results 32 are performed. The results 32 are again analyzed at step 34 to evaluate the new design. A user may also perform the method 10 using several sub-models 20, 22 and/or 24 having different parameters to perform a controlled set of experiments. For example, sub-models can be created with high and low values for desired parameters and tested. The user then analyzes the results 32 of the multiple runs and based on expertise, statistical analysis, or other decision-making factors, select suitable parameters. It is contemplated that the user may perform the method 10 using any combination of sub-models, for example, creating several product sub-models 22 for use with a wearer sub-model 20 or several environmental sub-models for use with a wearer sub-model. Once acceptable or optimum performance levels for the performance features are determined, the product sub-model 22 can be used as an aid in designing a prototype of the product or specific components of the product.

The method of the invention can be used to design and evaluate any product positioned on a body and particularly a product worn on the human body. For purposes of describing the method and system, the invention is described hereinafter primarily with reference to two personal care absorbent products, specifically a feminine care pad and a diaper. However, it is understood that the method and system may be applied to design and evaluate other wearable articles, such as for example incontinence articles, training pants, facemasks, shoes, and clothing, as well as other products such as medical bandages, medical drapes, jewelry and the like without departing from the scope of this invention.

The Virtual Wearer Sub-Model

The computer-based virtual wearer sub-model 20 is a model of a body in a form that can be used for computer simulation. The wearer sub-model 20 preferably defines a deformable "body", such as a person's torso, created to evaluate a product to be worn on the body defined by the product sub-model 22. Alternately, the wearer sub-model 20 can be defined as a rigid body or other object. Preferably, the wearer sub-model 20 is a model of a representative wearer of the product to be designed and evaluated. In one embodiment, the virtual wearer sub-model 20 defines a solid shape corresponding to a representative wearer of the product having mechanical and surface properties. The representative wearer is determined from available usage, demographic, and/or anthropometric data. Although any set of criteria can be used to define this wearer, preferably the criteria defines the three-dimensional surface topography of the wearer, or may include height, weight, and waist, hip, and thigh circumference measurements for the wearer.

Figure 2:
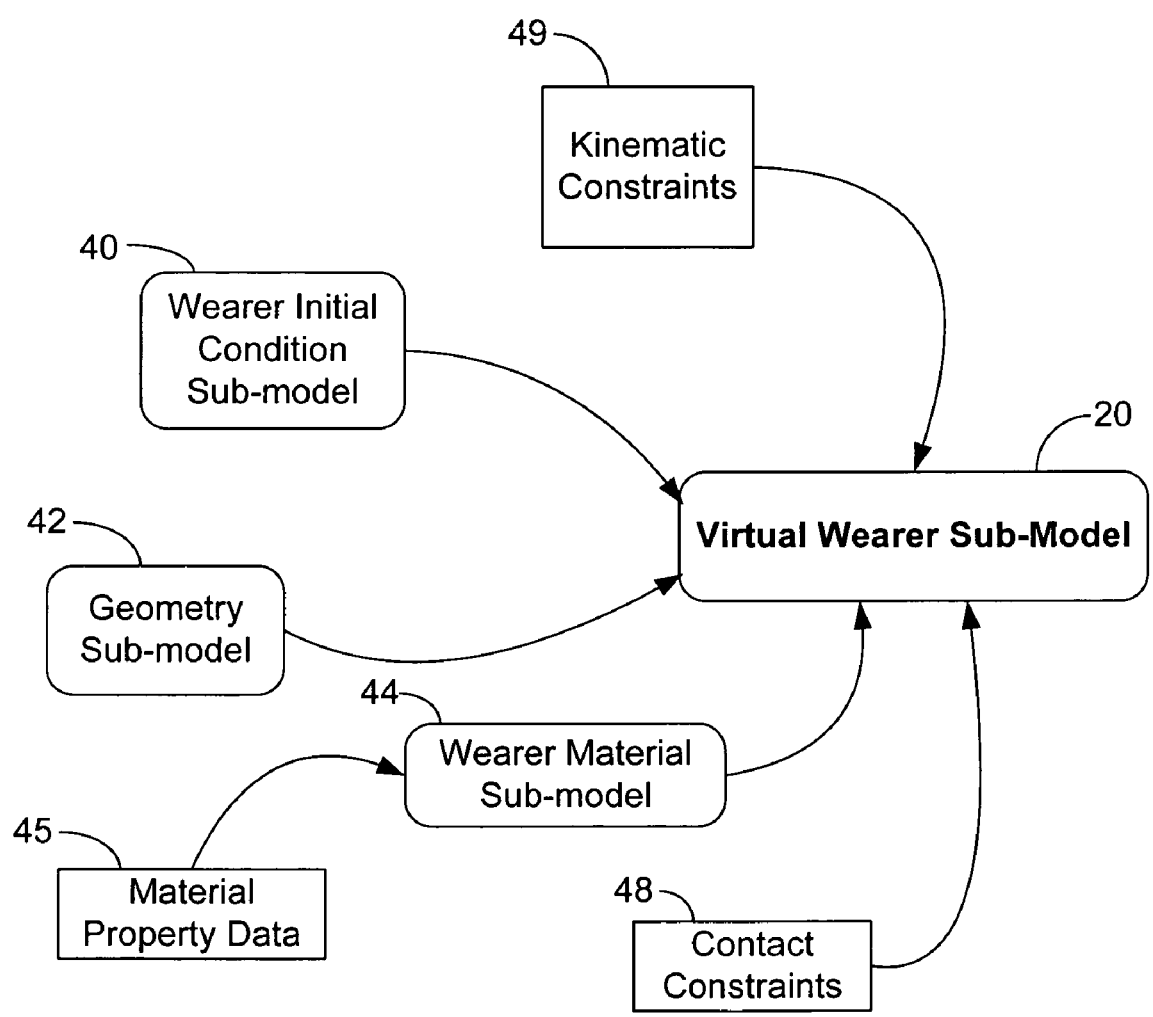
FIG. 2 is a flow diagram showing steps of creating a wearer sub-model for the method of FIG. 1.

As illustrated in FIG. 2, the virtual wearer sub-model 20 includes various sub-models defining information about the typically simplified representation of the wearer. The wearer sub-model 20 includes a wearer initial condition sub-model 40. The wearer initial condition sub-model 40 includes any specified condition that is present at a time selected as the beginning of the event to be modeled. Examples of such initial conditions include the temperature of the body or whether muscles modeled by the model are flexed.

The virtual wearer sub-model 20 includes a geometry sub-model 42. The geometry sub-model 42 includes specifications of the one dimensional (1-D), two-dimensional (2-D), or three-dimensional (3-D) shape and dimensions of the wearer components as well as the position and orientation within a reference frame. In one embodiment, the geometry sub-model 42 includes coordinates of 3-D surface patches describing the exterior shape of the wearer and any internal components to be modeled. For example, the geometry sub-model 42 may include 3-D coordinates relating the location of a hip joint to a point on the surface of the wearer.

The wearer sub-model 20 includes a wearer material sub-model 44. The wearer material sub-model 44 receives material property data 45 for the wearer to be modeled. The material property data 45 may include information such as the measured, modeled or estimated material characteristics or parameters of the representative wearer. For example, the material property data 45 may include information related to the elastic modulus, Poisson's ratio, or density, such as density of bone or soft tissue, of the wearer. The wearer material sub-model 44 defines the intrinsic (measured or estimated) material behavior of the material property components. For example, soft tissue is modeled using a hyperelastic material model to describe a non-linear stress versus strain relationship and incompressibility.

The wearer sub-model 20 also includes contact constraints 48 that define how wearer components interact with each other. The contact constraints 48 include specifications dictating or restricting the relative locations or contact surfaces of the wearer or portion of the wearer and assigns frictional or thermal characteristics when surfaces meet. The contact constraints 48 include whether the components are bonded together or are free to slide with respect to each other. For example, the exterior surfaces (skin) of the wearer may touch but may not penetrate other surfaces. Preferably, the wearer sub-model 20 defines a representative wearer that is deformable with realistic mechanical properties. The sub-model 20 can account for significant variation in mechanical properties with location, such as inner thigh vs. mid back, and natural contours or overall shapes. The wearer sub-model 20 should include sufficient definition to allow the product to "hang" on natural points on the body (e.g., a diaper is held up by the hips). The wearer sub-model 20 also includes kinematic constraints 49 dictating or restricting the motions (translational or rotational) of a wearer or portion of the wearer. Some examples of such kinematic constraints 49 are the head of the femur is not allowed to translate with respect to the acetabulum, and the rotation angle of the hip may be limited to, for example, 45 degrees. The wearer sub-model 20 should balance the need to have realistic anatomical features with the need for appropriate model simplicity.

Figure 3:
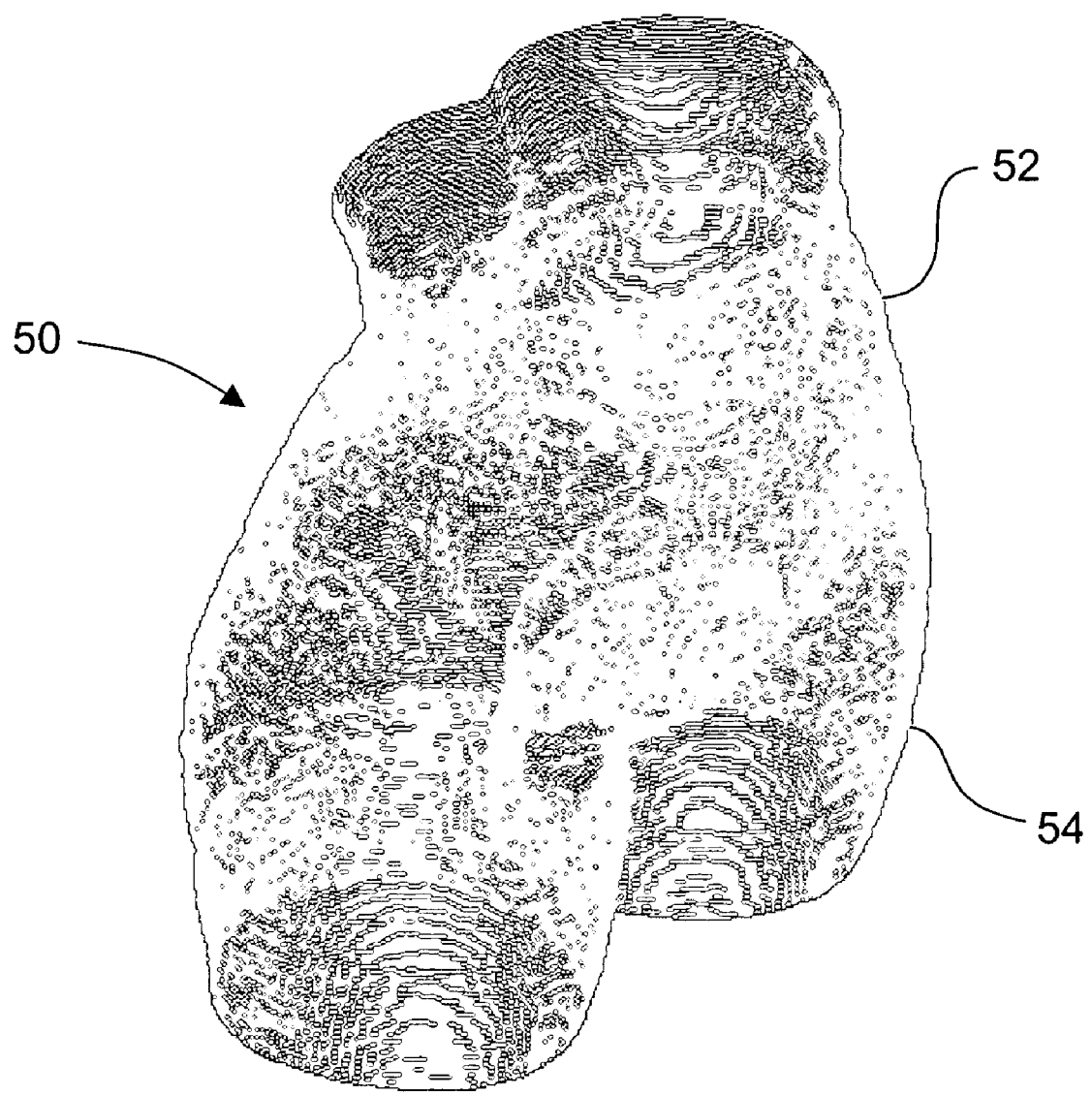
FIG. 3 is a perspective representation of a point cloud model of a representative wearer.

The virtual wearer sub-model 20 is created from a surface point cloud of the representative wearer as indicated generally by reference numeral 50 in FIG. 3. Point cloud data includes a series of points in 3-space that define the surface of an object or body and are generated from various digitization or scanning technologies as is known in the art. In one embodiment, the surface point cloud 50 is obtained from a database containing surface point clouds of persons of various physical sizes. Although any available database or source of surface point clouds can be used to obtain the surface point cloud 50 of the wearer, in one embodiment the data is obtained for an adult wearer from the well known, commercially-available Civilian American and European Surface Anthropometry Resource database collected by the U.S. Air Force commonly known as the CAESAR database (information available on the World Wide Web at hec.afr-l.af.mil/cardlab/caesar/index.html).

If the method 10 is used to evaluate or design a diaper, a point cloud of a torso is obtained from a mannequin model of a small-size infant. It is desirable to use a surface point cloud 50 of a pose with an unobstructed view of a region of interest on the body to be modeled. FIG. 3 illustrates a pose of a standing pose of the subject used for evaluating a feminine pad. In one embodiment, in order to reduce the calculational complexity of the model, only the portion of the body in the vicinity of the region of interest is modeled. For example, the wearer sub-model 20 is used in the design of a feminine care pad. In this example, the lower torso 52 and upper legs 54 of the representative wearer are modeled, as they are the body portions that most strongly influence the performance of the product described herein. However, one skilled in the art will understand that any portion of the body may be considered a region of interest depending on the product being designed or evaluated.

Figure 4:
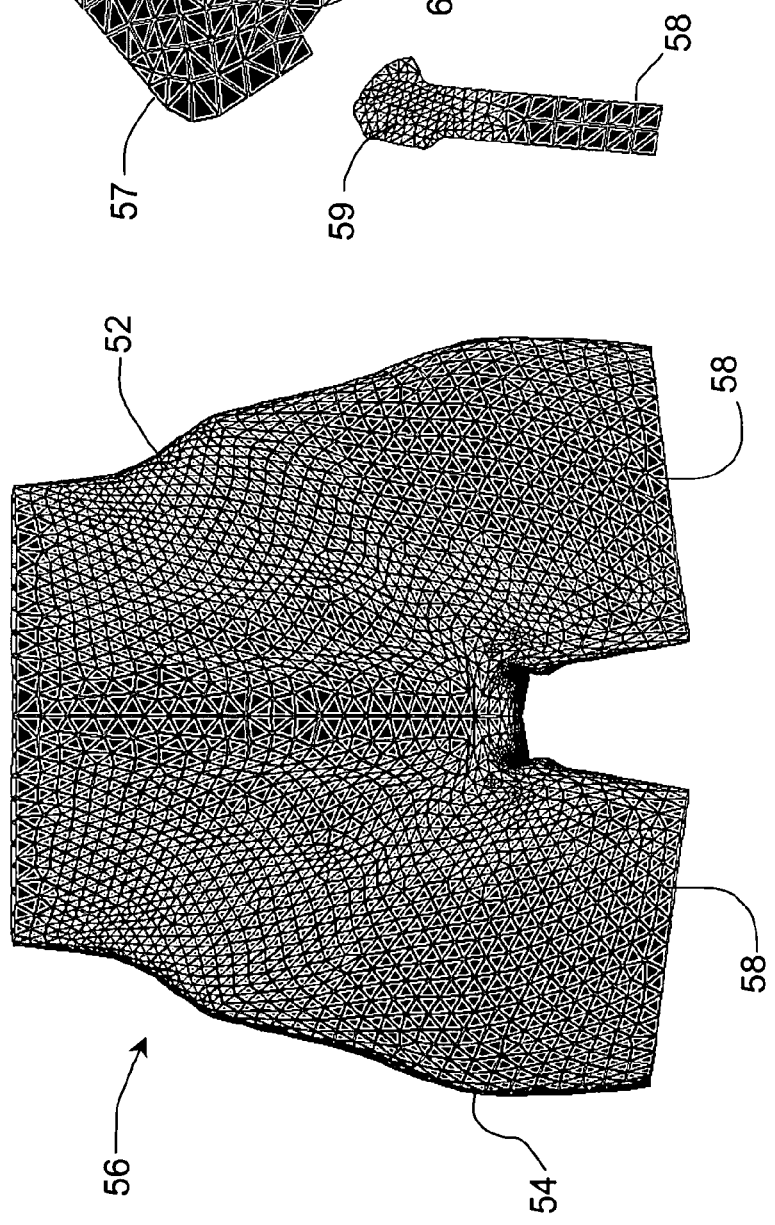
FIG. 4 is a perspective representation of a volume mesh model of the representative wearer shown in FIG. 3.

Referring now to FIG. 4, a volume mesh model 56 of the wearer's torso geometry is generated from the surface point cloud 50 of FIG. 3. As shown in this example, the volume mesh model 56 defines the surface of the torso 52 and upper legs 54 with a discretized representation of adjacent sections with interconnected nodes. In one embodiment, a watertight volume is generated from the point cloud data using methods known to those skilled in the art. It is desirable to create a "watertight" network of surface patches enclosing the representative wearer volume. The surface model may be subsequently converted to a solid model using appropriate methods specific to the software being used as is known to those skilled in the art. The solid model representation of the wearer may be discretized or meshed using suitable meshing software. Any suitable combinations of geometry manipulation or meshing software can be used to convert the surface point cloud 50 into a volume mesh 56, such as I-DEAS® meshing software from EDS of Plano, Tex., or Geomagic® geometry manipulation software from Raindrop Geomagic of Research Triangle Park, N.C.

Typically, surface point cloud data inherently contains gaps and distortions resulting from the scanning procedure used to produce the surface point cloud 50. During the mesh generation process, these gaps are filled in and distortions removed. For example, the CAESAR data was obtained by laser scan of a partially clothed person. Therefore, this procedure cannot generate surface point cloud data of hidden regions covered by clothing. The CAESAR database lacks detail in the relevant perineal region of the subject due to the subject's legs being almost closed in the standing position. Accordingly, the labia region and other regions altered or hidden by the clothing are filled in. If needed or desired, more detailed data for the hidden regions can be generated. The enhancement of the raw surface data is done to isolate and carefully define the area of importance. Although any area can be isolated and defined, in this example, the torso region is isolated and key surface features such as areas of high curvature are carefully defined in the volume mesh model 56.

Figure 5:
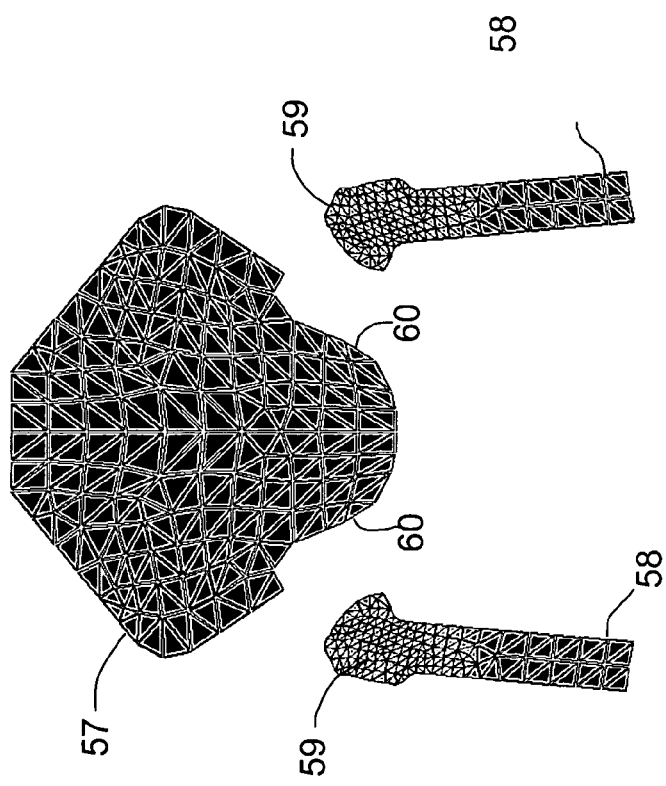
FIG. 5 is a perspective representation of a volume mesh model of a pelvis and femurs of the representative wearer.

As depicted in FIG. 5, the internal structure of the torso is also modeled. Previously, a foam torso test stand has been used to physically test products. In one embodiment, the foam torso test stand's internal components are modeled rather than actual human anatomy to simplify the modeling effort and to allow for direct qualitative comparison between virtual models and test stand data. Starting from the triangular-based volume mesh (see FIG. 4) of the torso and a triangular-based volume mesh of internal components such as a pelvis 57 and femurs 58 as illustrated in FIG. 5, triangular-based volume meshes are created to complete the volume between the components that will be filled with solid elements. Thus, disjoint legs are constructed in the same fashion with pivot points 59 located at approximate hip joint locations 60 to allow for realistic leg closure and fore-aft articulation.

The next step in the simulation process involves adding detail to and refining the user mesh from a coarse mesh to a fine mesh (grid) size if needed. The tissue properties of the representative wearer are then applied to the volume mesh model 56 in the virtual wearer sub-model 20 with the material property data 45. In one embodiment, tissue properties for bone, muscle, fat, and skin are obtained. In another embodiment, bone and bulk soft tissue (lumped properties for muscle, fat, and skin) are modeled. The tissue properties may be obtained from literature and/or test data for use with the wearer sub-model 20. However, one skilled in the art will understand that other suitable tissue properties can be used and any appropriate method used to obtain them. In one embodiment, a softened layer simulating surface fat and muscle is bonded to a rigid substructure to allow for compliance in the torso for later installation of the virtual product sub-model 22.

Figure 6C:
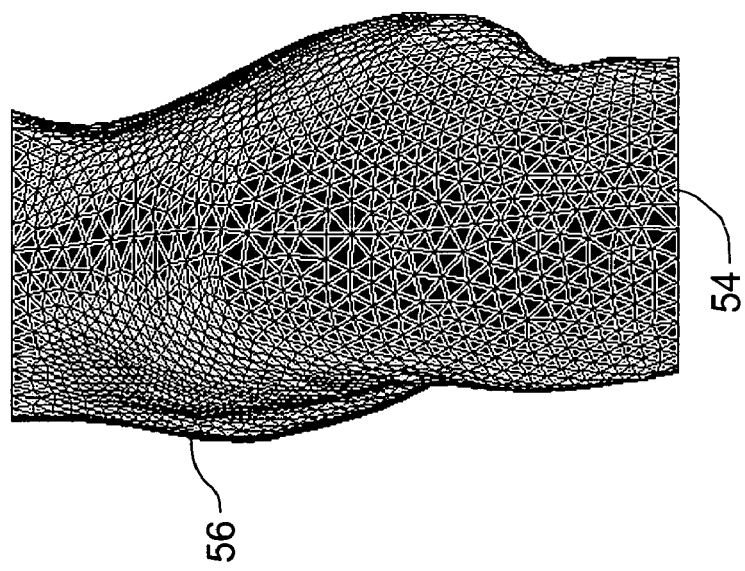
FIGS. 6A-C are perspective representations of a finite element model of the representative wearer illustrating fore/aft articulation.
Figure 6B:
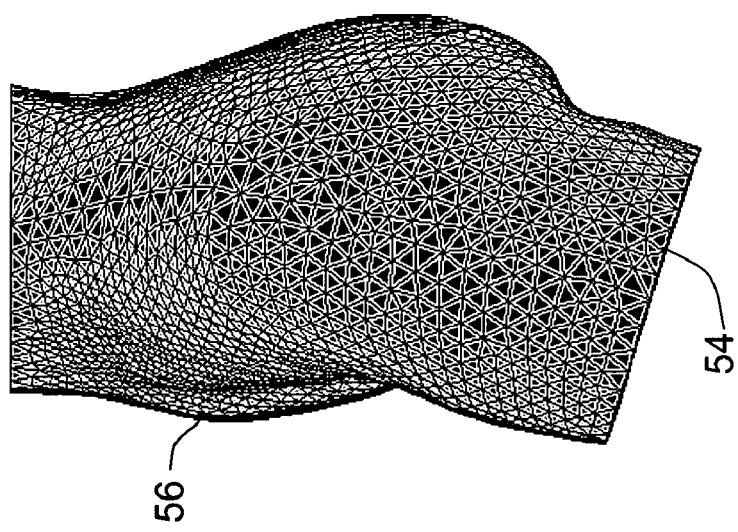
Figure 6A:
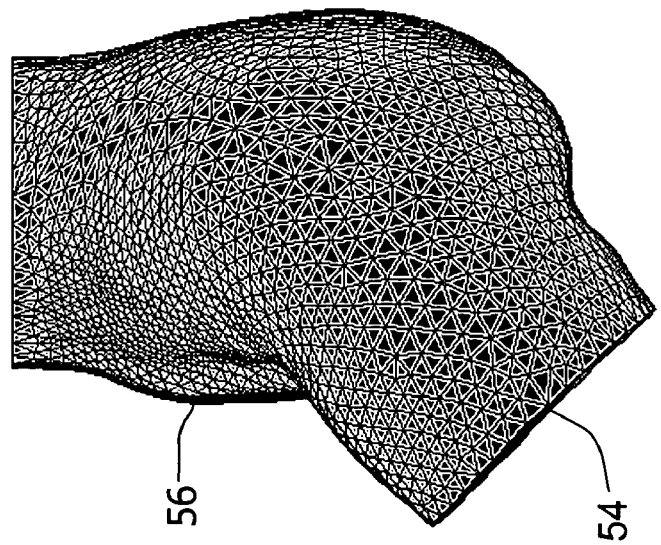

The volume mesh model 56 and the tissue properties are combined to create a finite element model using suitable software. Although any suitable finite element software can be used for the modeling, the process described herein uses the ABAQUS®/Explicit finite element software, such as Version 5.8, 6.2 or 6.3, commercially available from Abaqus, Inc. of Pawtucket, R.I. Alternately ABAQUS®/Standard finite element software is used. It is desirable to give the finite element model an initial undeformed and unstressed shape in the wearer initial condition sub-model 40. For example, in the feminine pad embodiment, a position approximately halfway between a sitting position and a standing position with the legs slightly spread is desirable. This is to mimic the construction of a physical mannequin torso. This initial position allows the finite element model to be moved into either a sitting or standing position without generating excessively distorted elements within the model. The upper legs 54 can also be articulated fore/aft as illustrated in FIGS. 6A-C, or spread through reasonably large angles as illustrated in FIGS. 7A-C.

The Product Sub-Model

Figure 8:
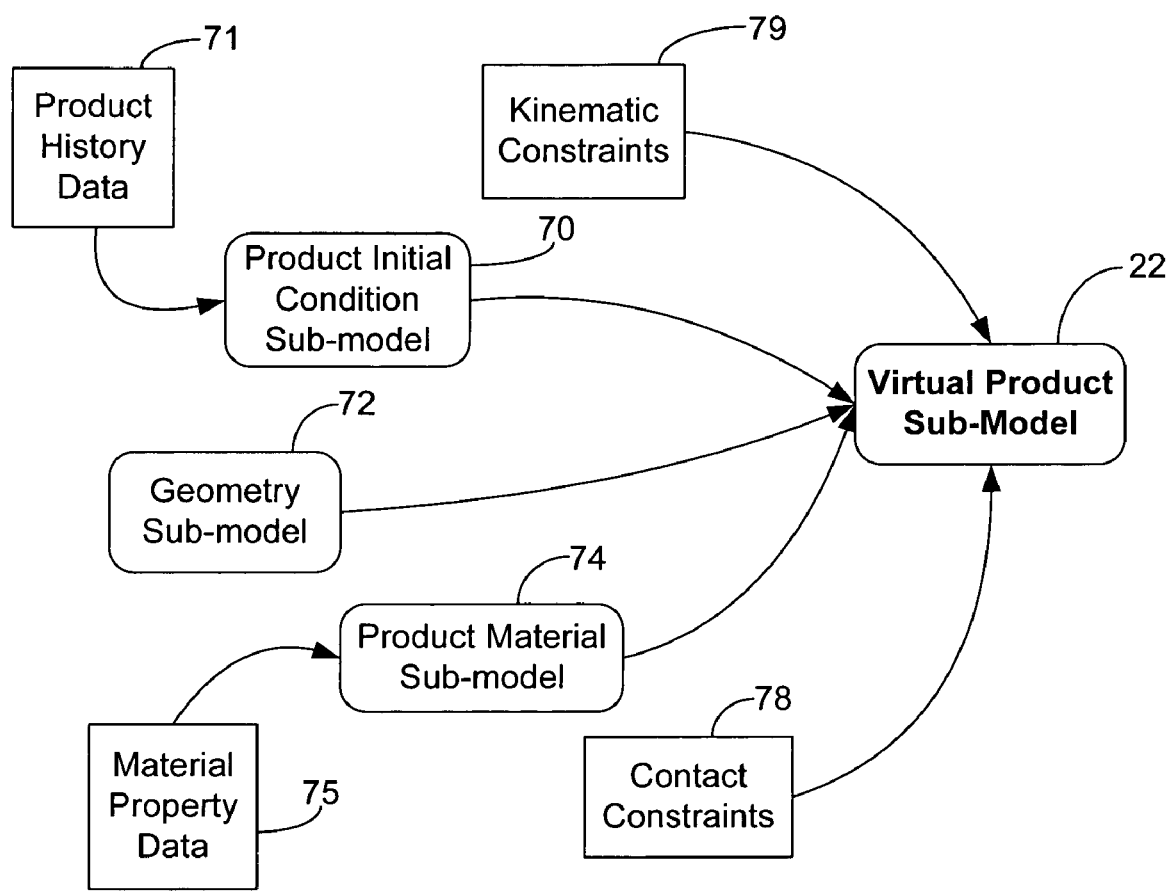
FIG. 8 is a flow diagram showing steps of creating a product sub-model for the method of FIG. 1.

FIG. 8 illustrates the creation of the product sub-model 22 of FIG. 1. As will be understood by those skilled in the art, the product to be modeled is selected based on the product desired to be developed and evaluated using the virtual model method 10. In one embodiment, the product sub-model 22 simplifies the product into a form having a solid shape with selected mechanical and surface properties so that the model can be placed in simulation. The computer-based virtual product sub-model 22 is preferably created as a three-dimensional definition of a desired product with a conventional Computer Aided Design (CAD) system. Although any suitable computer drawing tool can be used to represent the product, the example described herein uses AutoCAD® computer drawing software from Autodesk, Inc. of Sausalito, Calif. and Solid Works® from SolidWorks, Corp. of Concord, Mass.

As illustrated in FIG. 8, the virtual product sub-model 22 includes various sub-models defining information about the typically simplified representation of the product. The product sub-model 22 includes a product initial condition sub-model 70. The product initial condition sub-model 70 includes any specified condition from a product data history 71 that is present at a time selected as the beginning of the event to be modeled obtained. Examples of such initial conditions include the initial temperature of the product or initial stress conditions, such as prestressing. For example, elastic in the diaper may be prestressed (stretched) when attached to a cover. The product sub-model 22 may undergo an annealing process to artificially force the accumulated stresses and strains in the product or a portion of the product to be zero while maintaining a specified position.

The product sub-model 22 includes a product geometry sub-model 72. The product geometry sub-model 72 includes specifications of the 1-D, 2-D, or 3-D shape and dimensions of the product components as well as their position and orientation in a reference frame. For example, in one embodiment, the geometry sub-model 72 includes CAD drawings, solid models, thickness of a layer, embossing lines, and macroscopic absorbent pad topology.

The product sub-model 22 includes a product material sub-model 74. The product material sub-model 74 is a representation of the intrinsic (measured or estimated) material behavior of the product components. The product material sub-model 74 receives product material property data 75 for the product to be modeled. The material property data 75 may include information such as the measured, modeled or estimated material characteristics or parameters of the representative product. Material property data 75 may be obtained from preexisting databases or through testing. The material property data 75 may include information related to the elastic modulus, Poisson's ratio, density of product components, shear modulus, bulk modulus, yield stress, and/or elongation at yield of the product. For example, the product material sub-model 74 may use a linear elastic model, a hyperelastic model, or a viscoelastic model to describe the stress and strain behavior, degree of compressibility, and time dependency in the product material. It is understood by those skilled in the art that some material properties are dependent on the "in-use" conditions of the product material. For example, the material properties of some product materials, such as elastic or elastomeric materials and adhesives may be dependent on such conditions as the product temperature or body temperature of the wearer, the relative humidity, the percent elongation, material deformation, and the like. Preferably, where material properties are dependent on the in-use conditions, material property data 75 specific for the modeled conditions are used. Where the material properties are not substantially dependent on the typical conditions or where it is desired to simplify the complexity of the sub-model, more generic material property data 75 may be used.

The product sub-model 22 also includes contact constraints 78 that define how product components interact with each other. The contact constraints 78 include specifications dictating or restricting the relative locations or contact surfaces of a product or portion of the product and assigning frictional or thermal characteristics when surfaces meet. The contact constraints include whether the components are bonded together or are free to slide with respect to each other. For example, contact constraints 78 may include forced bonding of product layers, such as a liner and a surge layer, at their interface with a no slip/no separation condition, or engagement of diaper fasteners.

The product sub-model 22 also includes kinematic constraints 79 which include specifications dictating/restricting the motions (translational or rotational) of a product or portion of the product. Some examples of such kinematic constraints 79 are fixed positions of the mid diaper back during application of the diaper.

Figure 9:
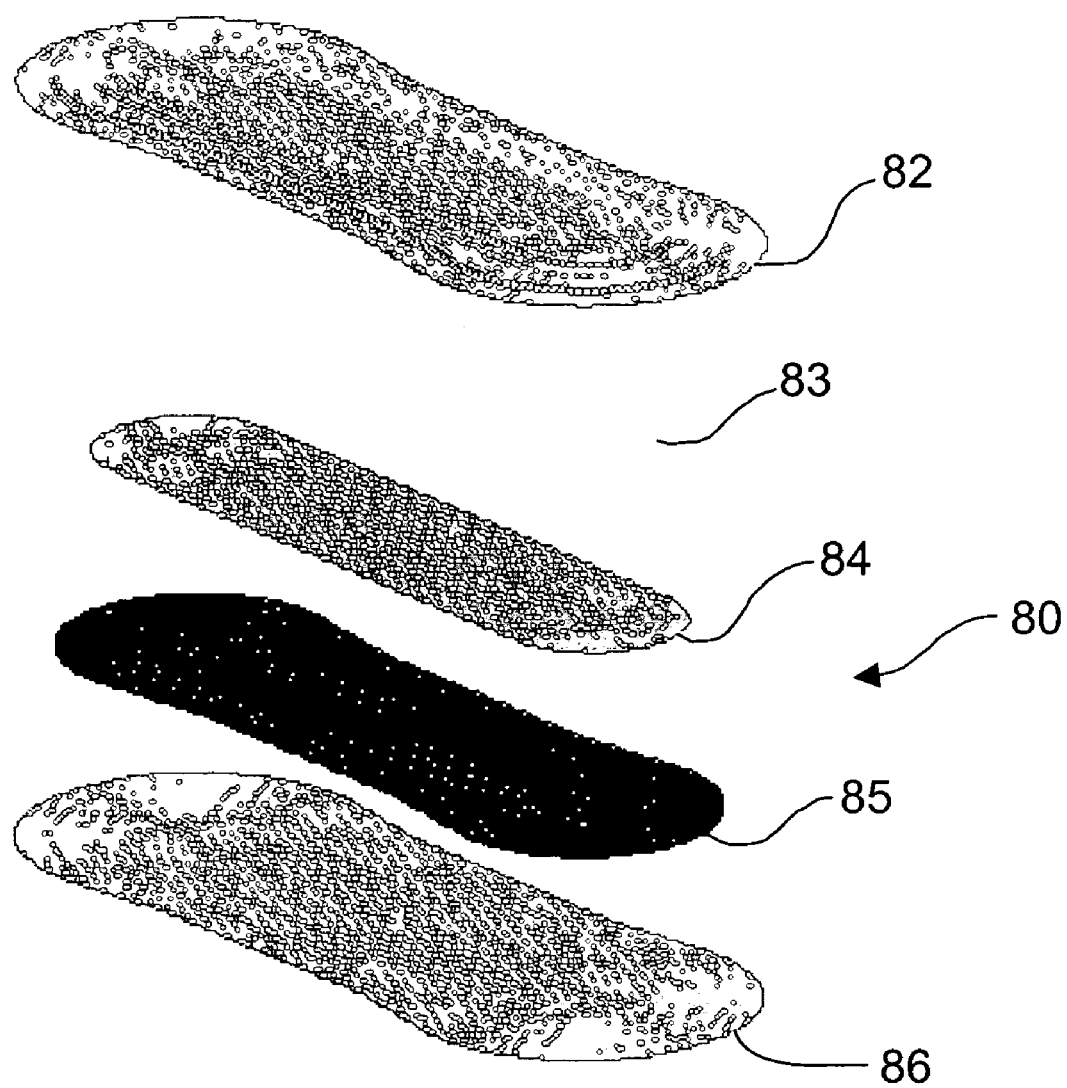
FIG. 9 is a perspective representation of a finite element model of the representative product.

In one embodiment illustrated in FIG. 9, a product, generally indicated at 80, representative of a feminine care pad is generated. The feminine pad product sub-model 22 comprises five layers 82-86 of different materials. The top layer 82, defined as the layer closest to the torso during use, is the cover and is modeled with shell elements. The second layer 83 is a thick distribution layer modeled with solid elements. One skilled in the art will understand using shell elements or solid elements to model different layers. The third layer 84 is a thin fluid transfer layer modeled with shell elements. The fourth layer 85 is a thick shaping layer modeled with solid elements. The bottom layer 86 is a thin baffle layer modeled with shell elements.

Mesh density may be increased, if desired, in selected localities to improve both the modeling accuracy and the fidelity of the finite element analysis in a region of interest. Similarly, the number of layers may be reduced and the modeling of layer interaction may be simplified to reduce time required for analysis, if such simplification is not detrimental to accuracy for a particular simulation, such as when layer interaction is of secondary importance. The complexity of the mesh (number, size, and shape of elements) is a balance between the needs to reduce computational analysis requirements and to provide good resolution into the analysis. Contact between the various layers 82-86 is accounted for initially with a tied contact pair option available in the modeling software. In an alternate embodiment, this accounting can be modified to permit slippage between layers 82-86 that are not bonded in the actual product as defined by the contact constraints 78.

Mechanical properties of the various materials and components of the product 80 are obtained and defined in the material property data 75 to be used in the product sub-model 22. Although any suitable mechanical properties could work, the properties used herein include stress and strain relationships, Poisson's ratio, density and friction properties. These properties are obtained from estimates, measurements, and literature references on the individual components, the product used, or similar products.

The product and properties are combined to create a finite element model of the virtual product sub-model 22. Although any suitable finite element software can be used for the modeling, the software package used herein is ABAQUS®/Explicit. The product sub-model 22 can account for multiple layers or components with specific functions (e.g., temporary storage, transport, non-wet feeling) or made from anisotropic materials (e.g., mechanical properties different in x, y and z directions). The product sub-model 22 can account for material properties for individual components vs. lumped aggregate product. Different material models are required for different components (vs. for example treating everything as a simple linear elastic). The product sub-model 22 can account for geometry based on design drawings or specifications and products that are often held in place by adjacent clothing structures. The product sub-model 22 can account for buckling behavior or plasticity that can lead to non-reversible or permanent deformation of the product (for example, once the diaper or pad is squeezed between thighs, it does not return to its initial shape). The product sub-model 22 can account for limited intrinsic drape or preset shaping patterns. Multiple fitting or deformation patterns are possible.

The Environment Sub-Model

The computer-based virtual environment sub-model 24 of FIG. 1 describes the interactive elements of the environment that will participate in the virtual use model 30. The environment sub-model 24 includes information about typically simplified representation of the surroundings. Examples of environmental elements that can have an effect on deformation of the product during use include fluids, such as blood, urine, sweat, and other body exudates, external forces, such as from a car seat or a panty, temperature which can change mechanical behavior of elastic and gasketing components, and other environmental factors, such as clothing, a mother's hand, and/or a caregiver's habits. Additionally, packaging and storage conditions can dictate appropriate initial conditions for the simulation. One example of an environment item is a virtual panty sub-model used in the feminine pad embodiment. In order to improve the accuracy of the product sub-model 22, the virtual panty model is added to the product sub-model 22 to aid in application of the feminine pad to the wearer.

Figure 10:
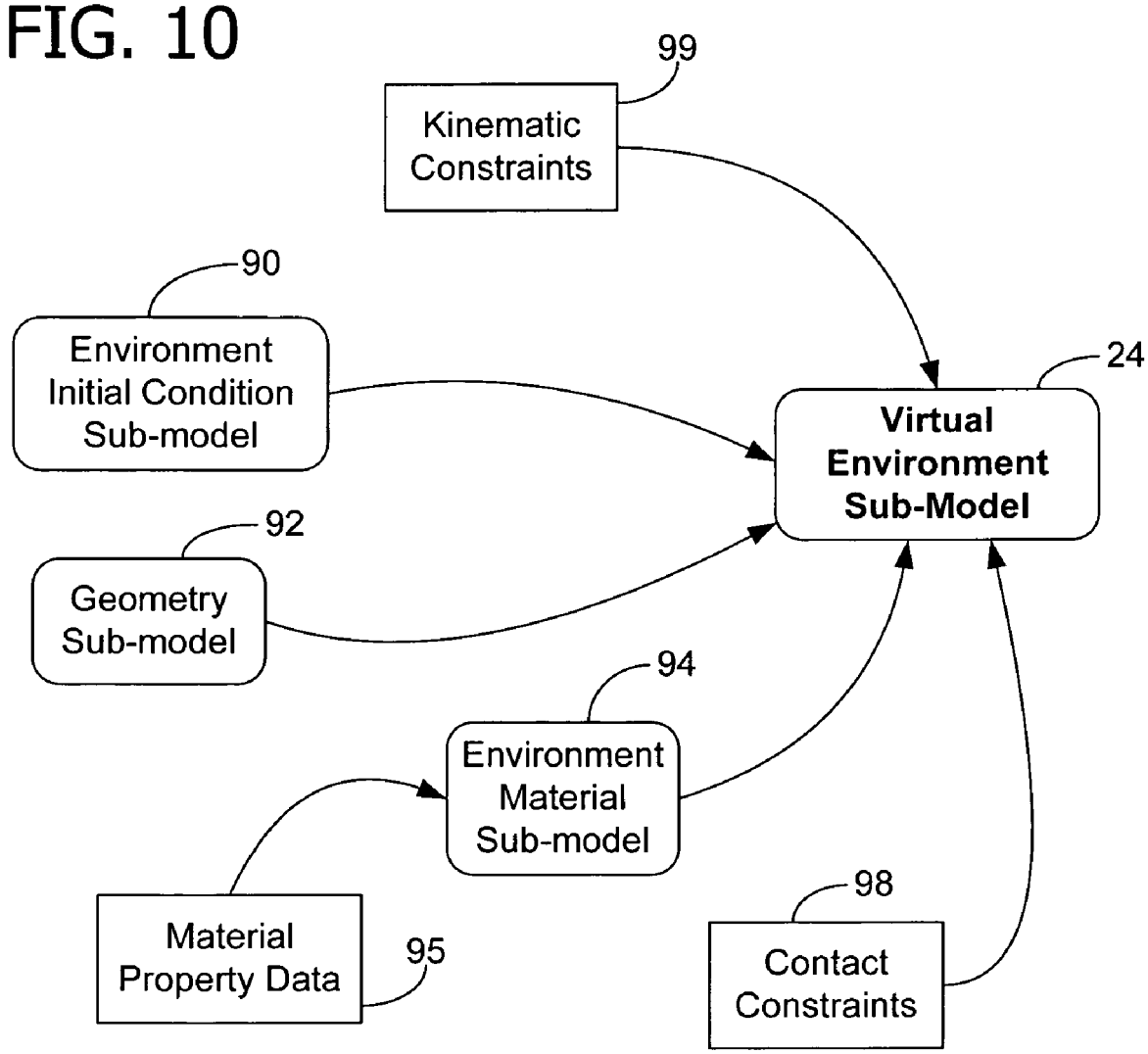
FIG. 10 is a flow diagram showing steps of creating an environment sub-model for the method of FIG. 1.

As illustrated in FIG. 10, the virtual environment sub-model 24 includes an environment initial condition sub-model 90, a geometry sub-model 92, and an environment material sub-model 94. The environment initial condition sub-model 90 includes any specified condition that is present at a time selected as the beginning of the event to be modeled. Examples of such initial conditions are an initial velocity of a caregiver's hand, an ambient temperature, and/or components of the panty that are initially positioned separated from each other.

The geometry sub-model 92 may include specifications of the 1-D, 2-D, or 3-D shape and dimensions of the initial of the environmental objects as well as their position and orientation in a reference frame. For example, in some embodiments, the geometry sub-model 92 includes 2-D or 3-D geometry of a car seat or changing table, a parent's hand, and/or geometry of the panty. The environmental material sub-model 94 uses material property data 95. The material property data 95 may include information such as the measured, modeled or estimated material characteristics or parameters of the environmental objects. For example, the material property data 95 may include information related to the density of the environmental item, such as the density of a car seat or panty. The environmental material sub-model 94 is a representation of the intrinsic (measured or estimated) material behavior of the environmental objects. For example, the environmental material sub-model may use a hyperelastic model to describe the panty material.

The environmental sub-model 24 also includes contact constraints 98 that define how environmental components interact with each other such as by including specifications dictating/restricting the relative locations or contact surfaces of the environmental objects or portion of the objects and assigning frictional or thermal characteristics when surfaces meet. The contact constraints 98 include whether the components are bonded together or are free to slide with respect to each other. For example, contact constraints 98 may include information as to whether the cushion on the changing table is in contact with the table and can move on the surface of the table, but not pass through the table.

The environmental sub-model 24 also includes kinematic constraints 99 which include specifications dictating or restricting the motions (translations or rotations) of environmental objects. Some examples of such kinematic constraints 99 are a changing table, car seat, infant carrier or other item fixed in space (i.e., not allowed to move), a pad pusher constrained to move in the vertical direction, or edges of different panty materials joined so as to make a single seam move together.

Virtual Interaction Model

Figure 11:
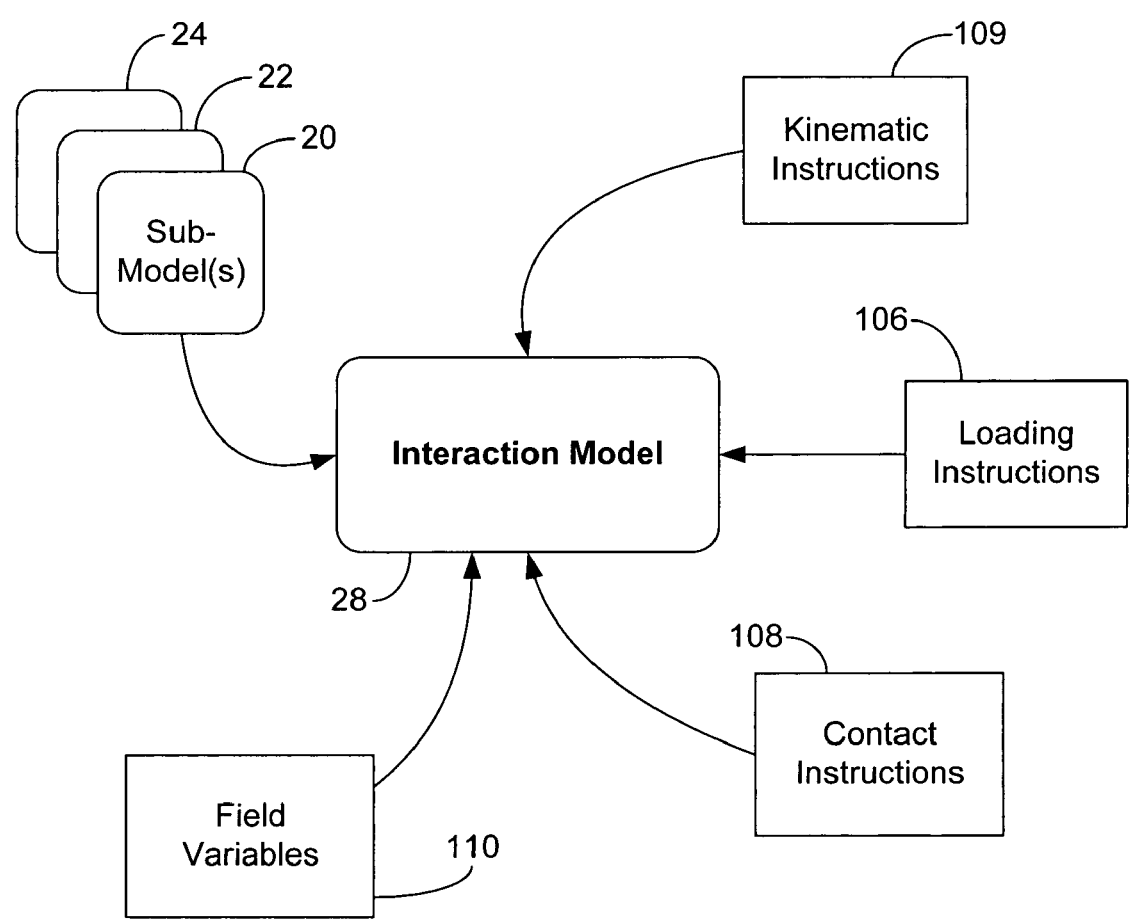
FIG. 11 is a flow diagram showing steps of creating an interaction model for the method of FIG. 1.

Referring now to FIG. 11, the interaction model 28 is intended to establish interactive relationships between the sub-models 20, 22 and 24 and includes both additional constraints as well as dynamic instructions. In one embodiment, the interaction model 28 defines how the product as defined in the product sub-model 22 is applied to the body as defined in the wearer sub-model 22. For example, the interaction model 28 may constrain the product components (from the product sub-model 22) from penetrating the wearer (from the wearer sub-model 20). The interaction model 28 may also specify how the product and body are to move to facilitate the virtual donning of a product. The interaction model 28 may specify the stresses, forces, contacts pressures, displacements, velocities or accelerations (in the product or the body) at a node, along a line or on a surface. Additionally, the interaction model 28 may account for placement of the product on the body which can affect performance. In one embodiment, an external pad pusher is used to apply and position a feminine hygiene pad relative the body, and then removed for the remainder of the run. The interaction model 28 may account for realistic application (in terms of force, location) of the product to the body (vs. another approach, such as an expanding second skin that becomes a product). Additionally, the expected latitude in product placement due to individual preference can be defined in the interaction model 28. The interaction model 28 can force the product into a certain configuration to position the product and then relax to allow the product to reach an equilibrium condition determined by the internal forces of the product. For example, waist elastics on a diaper are forced into a desired position relative the wearer and then the internal forces of the diaper are allowed to move the diaper into an equilibrium position on the wearer.

The interaction model 28 includes kinematic instructions 109 which may include specifications defining the positions and motions (translational or rotational) of the sub-models, such as the wearer walking when the product is in place and applying product and clothing to the wearer. The kinematic instructions may include position/displacement instructions (e.g., the front edge of diaper is displaced by (dx, dy, dz); back edge of diaper is free to move in the x direction but constrained in the y and z directions to dy=dz=0). The kinematic instructions 109 may include velocity vector instructions (e.g., an initial velocity vector is specified on an object initially in motion, the motion can be allowed to decay or maintained using a boundary condition). The kinematic instructions 109 may include acceleration instructions (e.g., an acceleration may be specified at one or more points to facilitate the application of a virtual product).

Additionally, the kinematic instructions 109 may include multi-point constraints (MPC's) (e.g., the points on adjacent seam edges of a panty may have their translational degrees of freedom constrained to be equal—causing them to move together). The kinematic instructions may include equation instructions (e.g., relating one or more degrees of freedom of two or more points by some specified mathematical equation, thus constraining their relative motion). The kinematic instructions 109 may include connector instructions (e.g., a pre-built set of loading and/or kinematic constraints intended to mimic mechanical joints such as a slider or a revolute joint). The kinematic instructions may include damping instructions (e.g., a relation that produces a force opposing motion based on a relative velocity of a component).

The kinematic instructions 109 may include sticking instructions (e.g., no relative motion between surfaces allowed) and sliding instructions (e.g., relative motion allowed, separation of surfaces may or may not be allowed depending on the specification). Additionally, the kinematic instructions 109 may include friction instructions (e.g., mechanism to produce a force opposing motion between surfaces in contact) and lubrication effect instructions (e.g., a means of affecting the friction behavior depending on one or more independently specified values such as degree of lubrication or temperature). Kinematic instructions also define the motion of the wearer throughout the simulation. One to several representational uses and motions of the product sub-model 22 by the wearer sub-model 20 and the forces generated can be modeled in the interaction model 28. The motions defined in the interaction model 28 to be modeled are selected based on the motions a developer desires to model to assist in developing the product. As illustrated in the examples described herein, the type of motions typically selected are everyday motions (e.g., walking, a sit to stand movement, spreading/closing legs, etc.) or motions that cause a performance stress on the product, such as motions that might cause tearing of the product. For example, although any series of motions may result in a positional gush from a feminine care pad, motions performed transitioning from a sitting to a standing position and motions performed when closing the legs resulting in squeezing of the product are particularly useful in evaluating the performance of the product and are modeled. Although any suitable technique can be used to determine the motions of the wearer, one technique used herein is the MotionStar® motion modeling system from Ascension Technology Corp. of Burlington, Vt., coupled with the JACK human simulation software from EDS of Plano, Tex. to determine the motion. To analyze the motion of the wearer, data is obtained using sensors at certain wearer body points. Although many sensors can be used with the MotionStar system, the analysis described herein uses six sensors. These sensors determine the position and orientation associated with the back of the neck, the back of the waist, the right and left knees, and the right and left feet. The data obtained is interpreted and translated through the JACK software into joint center motion of the bottom vertebrae in the spine, the right and left hip joints, and the right and left knee joints. The motion data obtained is then incorporated into the interaction sub-model 28. Other sources of data for body movement or motion analysis can be utilized, such as data from one of several published sources known to those familiar with the art of motion analysis.

The interaction model 28 includes loading instructions 106 defining pressures, moments or forces, temperatures or other thermodynamic fields acting on the sub-models. For example, the loading instructions may include the parent's hand pulling the diaper fastener with a given force, or gravity. Additionally, the loading instructions 106 may include force (e.g., concentrated load acting on a single point of series of points), pressure (e.g., force distributed over an area) and body force (e.g., the force acting on a body continuum such as gravity or buoyancy).

The interaction model 28 includes contact instructions 108 dictating or restricting the relative locations or contact surfaces of the sub-models 20, 22, 24 or portion of the objects and assigning frictional or thermal characteristics when surfaces meet. For example, the interaction model 28 can define that the product sub-model 22 cannot penetrate the wearer sub-model 20, that clothing modeled in the environment sub-model 24 cannot penetrate the product sub-model 22, and the friction type and value between product sub-model and the wearer sub-model. Additionally, heat source and/or sink factors and the transfer of heat between components in contact can be defined. For example, heat transferred from the wearer sub-model 20 to the product sub-model 22 simulates body heat going into the product. The contact instructions 108 may include contact/surface interactions (e.g., specification of how two or more surfaces or surface representations interact when and while they meet).

The interaction model 28 receives field variables 110 such as field intensity for various physical or fictitious quantities that can affect material properties or potentially other loads or instructions. These field values may correspond to physical or fictitious quantities such as temperature. In one embodiment, the nodal temperatures are specified to facilitate shrinkage/expansion as in stretched elastics. In another embodiment, varying (temperature dependent) material properties are introduced, using temperature as a true or fictitious value. Other field variables may include light intensity, proximity to a magnetic source, intensity of fields generated by electric energy, microwave energy, or ultrasound, a lubrication factor, a relative humidity factor, the skin orientation (i.e., Langer's lines), a local body tissue modulus, material (property) variability, heat transfer factors to/from a heat source/sink, and initial or boundary conditions for field dependent loads. Other field variables 110 may include local (non-uniform) material property (e.g., specifying some areas of the body's local material property), stochastical local variation (local deviation of a property or boundary condition). Other field variables 110 may include the mass fraction or a fraction of a quantity of interest with respect to the total mass of the volume, such as, for example, the mass of fluid in a cubic mm of absorbent material. Additionally, the mass transfer or movement of mass across a defined boundary, typically specified as the flux or mass moving through a unit area can be specified as a field variable.

The Use Model

Figure 12:
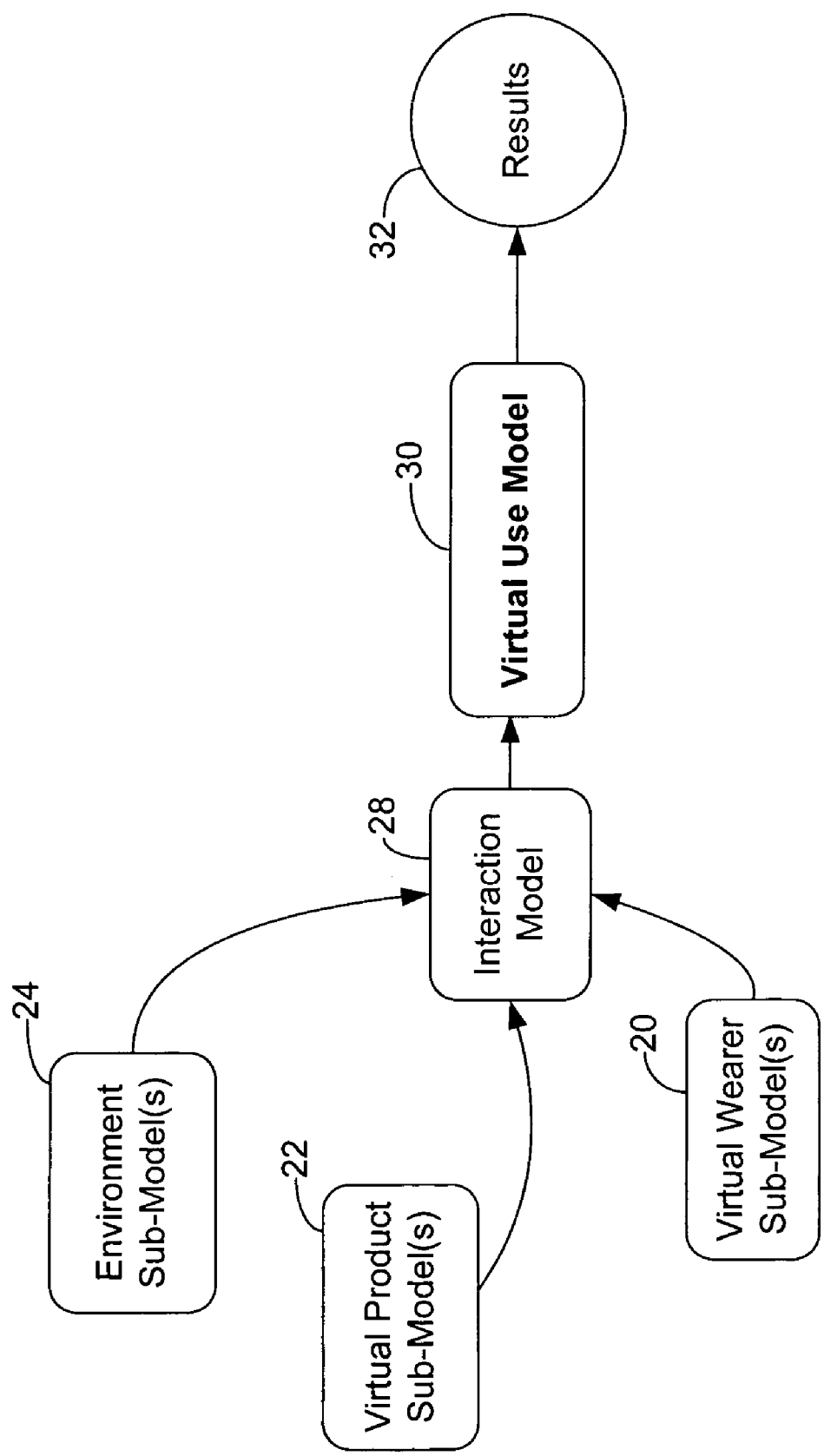
FIG. 12 is a flow diagram showing steps of creating a use model for the method of FIG. 1.

Referring now to FIG. 12, the virtual use model 30 combines and integrates instructions and model definitions from the wearer sub-model 20, the product sub-model 22, the environment sub-model 24 and the interaction model 28, to define a virtual use simulation. The use model 30 calculates or otherwise determines the forces, stresses and strains caused by movement and interaction between the virtual wearer sub-model 20, the virtual product sub-model 22 and the environment sub-model 24 using FEA analysis to produce simulation results 32. Any combination of one or more of the virtual wearer sub-models 20, virtual product sub-models 22, and virtual environment sub-models 24 may be included in the virtual use model 30 as desired for the particular evaluation to be performed or product to be designed. The virtual use model 30 is driven by the instructions provided by the interaction model 28 and is representative of motion induced by the interaction model 28 on the sub-models 20, 22, 24 through an elapse of time. Preferably, the use model 30 calculates the actual forces on the product or the body at a level of mm resolution.

Animations can be produced as an aid in setting up, using and interpreting the models. Animations can display simulation results over time, depicting the model in any desired orientation. The display options may be set to show the entire wearer and product or just that portion of the wearer and/or product that is of interest for a particular result. Some examples of animations used for viewing results are as follows. The animations help to visualize the actual articulation of the torso and the application of the product discussed herein with references to static images. For example, animations can show the product being applied to the torso, followed by leg closure, then by leg stride. Animations can also show the articulation of the torso from a frontal view, a side view, and an isometric view. Animation can also show a coronal cross-section view of the product being applied to the torso. Views of the torso, product, and environmental features, or of the torso and product, or of only the product can be shown. Finally, animation can show a coronal cross-section view of the product being applied to the torso, initially with legs spread, followed by leg closure.

It may be necessary to use various techniques known to those skilled in the art of FEA to enable the numerical methods to operate. For example to prevent element hourglassing, beam elements around the perimeter of the product can be inserted. To prevent long run times due to artificial inertial effects, mass scaling may be used. To prevent overclosure/wave propagation, damping can be inserted. To prevent limited wearer range of motion due to excessive element distortion, the removal volumes of material can be used. To more accurately model the anisotropic elastic material, a homogeneous membrane together with elastic strands can be used. To allow for non-uniform strain between attached elastic components, elastics can be tied to every 3rd node of the product. To provide controlled contraction of elastics, temperature and thermal expansion can be controlled. To control buckling in a certain direction, a pressure such as from an air puff or rigid pusher can be used. To control contact instabilities, the penalty contact method can be used. To reduce non-physical stress buildup (e.g., in the body) annealing protocols can be used to remove stresses and strain. To control the speed versus accuracy and stability, local or global remeshing can be used. These examples are for illustrative purposes. It may be necessary to use some, all, or additional techniques during the performance of this method 10 to control excessive element distortion, propagation of numerical instability and speed versus accuracy issues.

The results 32 of the use model 30 are analyzed at step 34 to evaluate the performance of virtual product. The analysis 34 evaluates the performance of at least one body or product feature of the product and/or wearer body. The response includes details of the product's behavior, driven by interactions with itself and potentially other factors such as a wearer and/or its surrounding environment. The results 32 include the performance of one or more product features related to the fit, comfort or use of the product. Depending on the product to be developed, a number of body or product features can be looked at to determine whether the product will perform satisfactorily under normal use conditions.

The product features analyzed may include one or more of features such as, but without limitation, product stress, product force vectors, contact pressure distribution on the body, curvature of a product surface, product deformation, density profiles, predicted stresses at selected locations of the product, the gaps between the body and the product, the appearance of the product or garments introduced by the environment sub-model when worn by the body, deformation of the body, contact area between the body and the product, the integral of the pressure over the contact area, the contact area between the panty and the product, appearance of the product when in contact with an external article. For the examples described herein, a product developer can examine the contact pressure on the user from the product, which is a factor in determining the product's comfort. It was seen that the contact pressure distribution in the product varied during use, with higher contact pressure regions adjacent the legs, and lower contact pressure regions away from the legs. In addition, density variations in the product provide insight into the absorbent behavior or permeability of the product. Areas of higher density can tend to absorb fluid less rapidly than areas of lower density. Tensile stress within the product is a large factor in determining the integrity of the product. A concentration of tensile stress in a particular region of the product can lead to tearing of the materials in that region. The fit of the product relative to the wearer contributes to the discretion in the use of the product. Also, the shape of the product during use contributes to many of these results including discretion, pressure, and absorbency. Some or all of these and other product features can be modeled and analyzed by the process described herein. A variety of product designs (e.g., shape, size, materials) may be simulated and comparatively analyzed. Less promising candidate designs may be removed from further study.

The fit of the product can be measured using quantitative measurements to define fit. Some measurements include uniform and optimal tension, contact pressure or stress throughout the product or a portion of the product, providing and/or maintaining a desired surface area of coverage during changes in body position, and conformance to the body surface area. Additional measurements can include how the product follows the natural lines of the body, the relative motion between portions of the product and the body, and bunching, twisting or roping of the surface topography of the product. Examples of product features analyzing the fit of the product include product deformation such as can be determined by the measurement of product movement or shift during wear (i.e., during wearer movement) and gaps formed between the product and the body. In some instances, gaps can cause particular products, such as absorbent articles, to have reduced effectiveness. Product stresses can be analyzed to determine the potential for material tears or places that need stretchable material or reinforcement. The force vectors for every element of the diaper may be output throughout the simulation. This type of output aids product developers when investigating different product designs. Specifically, product developers can analyze the forces, noting any large vectors such as those which may cause the product to droop over time. Reduction of large forces may lead to better fit maintenance or a reduction of product failures (i.e., tearing). The product curvature can be analyzed to determine the conformance of the product toward or away from the body. The product strain can be analyzed such as to determine the amount of stretch being used by diaper fasteners. The contact area can be analyzed to determine if the product is covering the entire target surface area of the body. Shape analysis or anthropometric landmark analysis of the wearer can be used to determine fit ranges such as the distance between facial landmarks to determine area for facemask coverage. Additionally, the relative distance between a product feature and a wearer landmark can be analyzed to determine fit such as the droop measured as the distance from the belly button to the top of the product waist.

Examples of body and product features analyzing the comfort of the product include contact pressure distribution on the body and the magnitude of natural body shape alteration caused by product. These features can lead to skin irritation or make the product uncomfortable to wear. The appearance of the product when worn by the body can be analyzed to determine how the product buckles, twists and/or bunches during wearer movement. The contours of the product can be mapped to trace the path on the wearer where the contact pressure is equal to a certain value or range. A thermal analysis can be performed to determine the heat or humidity between the product/wearer as compared to environment.

Examples of product features analyzing the effects of the environment on the product include the appearance of the product such as the discreetness of product during wear. The contact area between the product and any additional garment worn on the body can be analyzed, such as whether the product is in contact with the garment or does a portion of the product hang outside the garment.

Analysis 34 of the performance of the body and product features typically indicates changes that may be made to the product for improved performance. If the desired performance level is not achieved, or if additional testing is desired, the product sub-model 22 is redesigned in order to modify the performance of the product feature. For example, a concentration of tensile stresses in a particular region of the product may indicate that a material or shape change needs to be made in that region. The product developer may also revise the wearer sub-model 20 to revise the body that the product is being evaluated on. Additionally, the environmental sub-model can be modified to account for different environmental conditions. After modifying one or more characteristics of the sub-models 20, 22, 24, the steps of running the interaction model 28 and the use model 30 and to obtain new results 32 are performed. The results 32 are again analyzed at step 34 to evaluate the new design. In this manner, results of a product analysis may be fed back into the product design process in an iterative manner until the design of a product meets whatever goals are set out for it. The product developer may decide at step 36 to modify the sub-models, or a software program may perform an iterative process to obtain results 32 within a specified range of values. Once acceptable or optimum performance levels for the performance features are determined, the product sub-model 22 can be used as an aid in designing a prototype of the product or specific components of the product.

The process may also be repeated using different products, wearers, and uses. Thus, virtually any combination of a wearer and a product of clothing or other articles which are used on the body may be modeled. For example, the entire modeling process may be repeated for a representative baby using a particular diaper design. In another example, a representative adult incontinence product user may be modeled using a particular adult incontinence product. In another example, a representative child may be modeled using a product of clothing such as pajamas. In each of these, the same iterative product development process may be followed to develop a product that meets any initial performance goals.

Correlations can be made between simulated or virtual data and in-use wearer data to establish product shaping, body fit and comfort targets for multiple product platforms, improving product fit with the body and wearer perception of wearing comfort and security. Proposed improvements can be screened virtually to ascertain if the product achieves desired performance of product features related to, for example, absorption of the product, gapping between the product and the wearer, contact pressure between the product and the wearer, proximity of the product to the wearer, and/or relative orientation of surfaces of the product to gravity. The performance of body and product features can be compared against wearer preferences for fit and comfort.

EXAMPLE 1

Diaper Embodiments

Embodiment 1a

Figure 13:
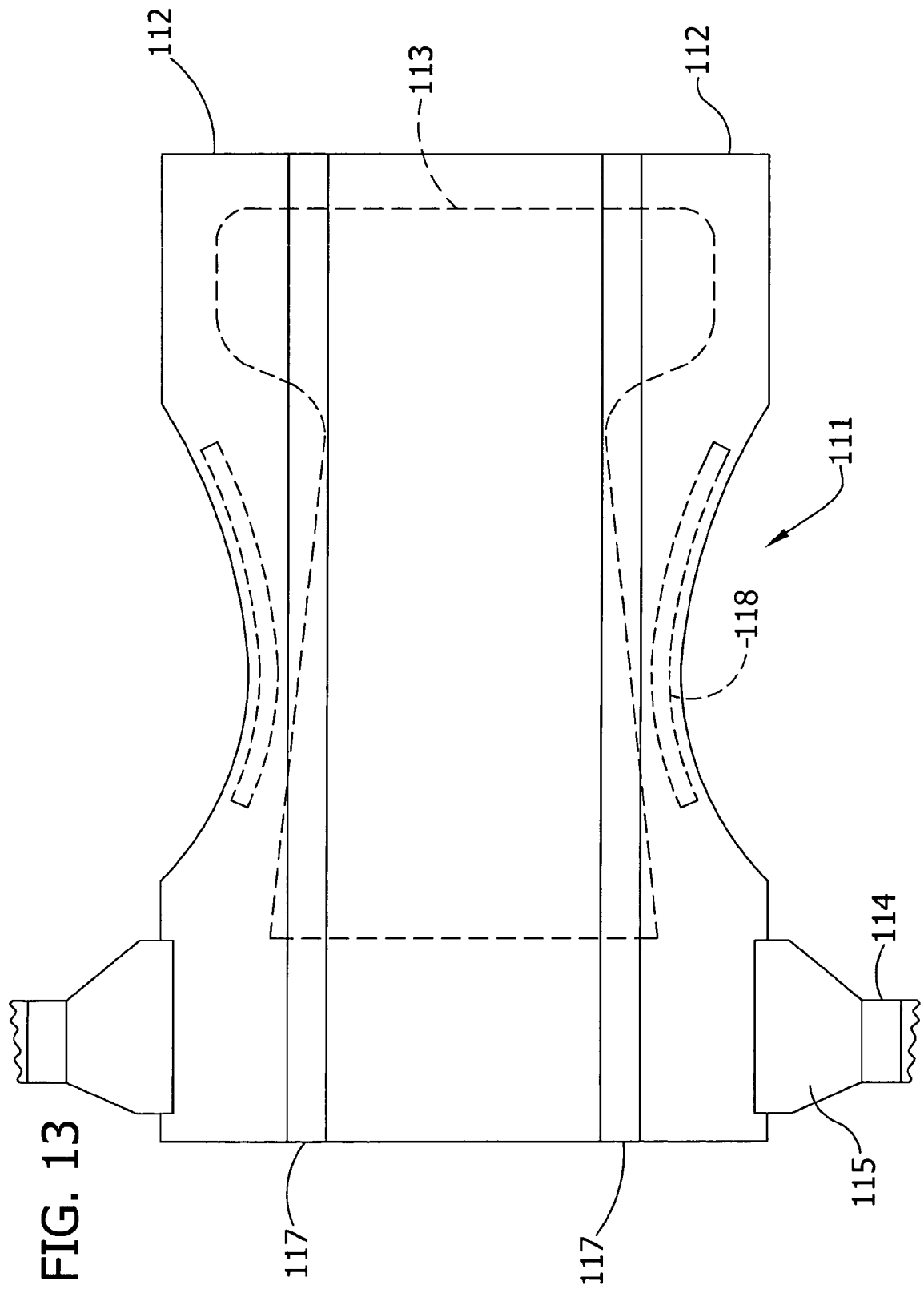
FIG. 13 is a top plan view of a representative product, partly broken away to show internal construction.
Figure 13A:
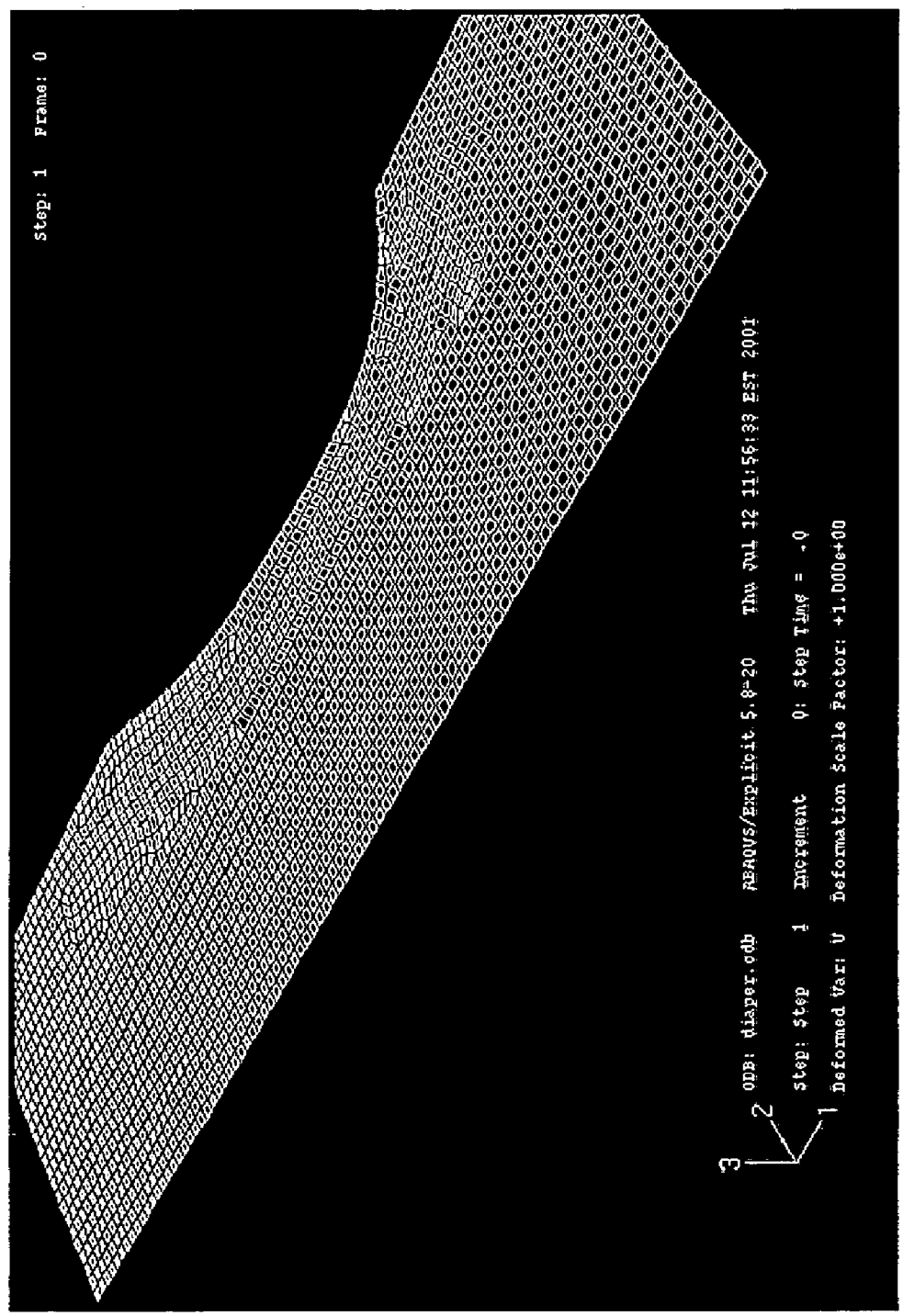
FIG. 13A is a perspective simplified representation of the product of FIG. 13 according to one embodiment of the method.
Figure 14:
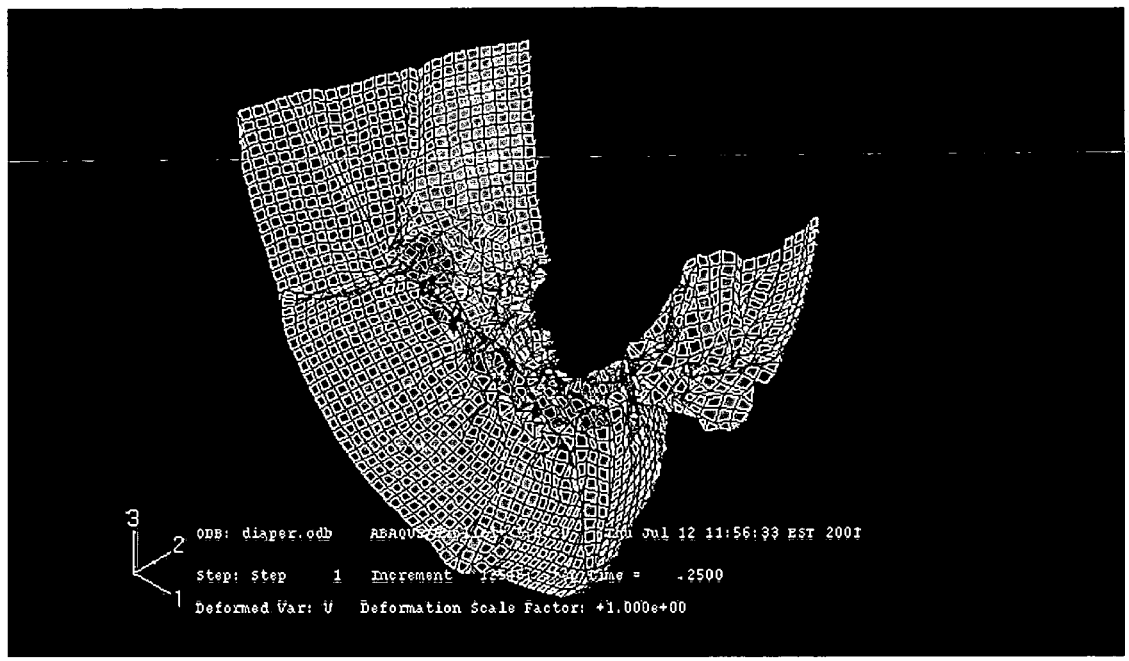
FIG. 14 is a perspective representation of an example of the product in a simulated final position.
Figure 15:
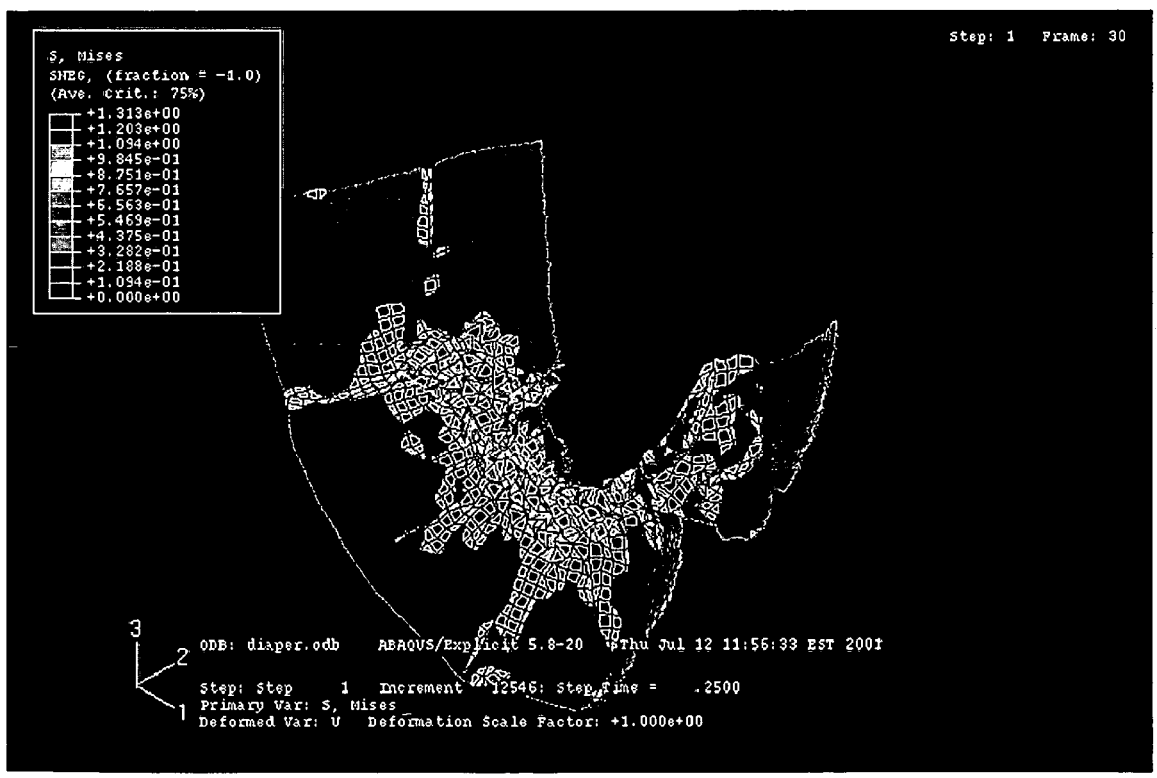
FIG. 15 is a perspective representation of the stresses (Mises stresses) in the product.

The first diaper embodiment described herein is a product only model used to evaluate deformation and stresses around the leg and containment flap elastic regions. FIG. 13 illustrates an exemplary diaper, indicated generally at 111, with typical fasteners and elastics. For example, the diaper 111 has a cover 112, an absorbent body 113, fasteners 114, fastener elastics 115, containment flaps 117 and leg elastics 118. Initially, a plane of symmetry along the long axis of the diaper was implemented to reduce computer run times during the initial steps of development. Later, the plane of symmetry constraint was removed by mirroring the diaper about the plane of symmetry. When the mirroring was implemented, modifications were also made to the loading conditions (i.e., forces necessary to apply the diaper), kinematic instructions, and contact instructions. Appendix 1 provides an example of the input files for the diaper embodiments. Diaper embodiment 1a focused on the leg and containment flap elastics and simulated the diaper being stretched out flat, released, and then allowed to come to a "resting" position. Therefore, the geometry in this phase of the diaper creation was relatively simplistic, and only included detailed material models for the leg and containment flap elastics. The rest of the diaper was modeled as one continuous homogeneous sheet. FIG. 13A shows the diaper in the simulation initial position, held flat and under tension. FIG. 14 depicts the diaper in the simulation final position, with external tensions released and the diaper allowed to relax. Element stresses were also calculated throughout the simulation, and the final stresses (Mises stresses) are displayed in FIG. 15.

The non-woven materials were modeled as shell elements of type S4R (reduced integration quadrilateral shell element). This is a shell element, which is often used for structures in which the thickness is significantly smaller than the other dimensions. The leg and containment flap elastics were modeled as two force members (ABAQUS type T3D2 truss elements), which act as rods that can only support an axial force between the two points. They have no resistance to bending. This description is representative of how the leg and containment flap elastics primarily behave, and demonstrates the importance of choosing elements that best represent the behavior of the material they are modeling. Table 1 lists the material definitions and material property data of embodiment 1a of the virtual diaper.

TABLE 1

Material definitions and material property data of the virtual diaper. The units for this model are a standard SI form of N-mm-sec-Mgr.

| | Element Type | Thickness (mm) | Density (tonne/mm3) | Young's Modulus (MPa) | Poisson's Ratio |
|---|---|---|---|---|---|
| Center Region | S4R | 0.1574 | 9.32*10 − 10 | 7.549 | 0.3 |
| Outer Region | S4R | 0.0574 | 9.32*10 − 10 | 7.549 | 0.3 |
| Containment flap Material | S4R | 0.065 | 1.23*10 − 9 | 29.9 | 0.3 |
| Leg Elastic | T3D2 | 0.1 | 1*10 − 9 | 2 | 0.4 |
| Containment flap Elastic | T3D2 | 0.1131 | 1.1*10 − 9 | 2.82 | 0.4 |

Note:
a Megagram is equal to a metric ton.

With no external wearer or environment in this simulation, it was necessary to apply a very small pressure (similar to a puff of air) in the negative (3) direction (refer to FIG. 13A for axes orientation). This allowed the diaper to buckle downwards, or away from the body, instead of upwards, or toward the body. To account for the variation in amount of strain between the elastics and the diaper, the elastics were connected to every 3rd node instead of every node. This allowed the elastics to stretch without distorting the diaper elements.

Embodiment 1b

The second embodiment included a more detailed product and a wearer located in a static position. In this model, contact pressures during product application and deformation of the product were investigated. The increased detail in the product included modeling the geometry and properties of an absorbent core, fastener elastic, and a fastener in addition to the leg elastic, containment flap elastic, and containment flap material modeled in embodiment 1a.

Material property data of the updated diaper may be found in Table 2. The elastics (containment flap, leg, and fastener elastic) were modeled as Neo-Hookean hyperelastic materials, which means that the materials are incompressible and show non-linear behavior. To accurately describe the non-linearity in these materials, stress vs. strain data was directly input to the model. All of the elements except the leg and containment flap elastic were modeled as S4Rs. These elements allow a user to represent many types of materials in one element (e.g., a composite shell element). For example, a section may be modeled as having cover and absorbent. Each material in this section will be defined by its own properties, but the materials will not be allowed to "shear" (move back and forth) with respect to one another, but are constrained to move as a unit. Utilizing this assumption allows for faster simulation run times during model development. The leg and containment flap elastics continue to be modeled as T3D2 truss elements, but the material properties were updated to better represent their characteristics.

TABLE 2

Material definitions and material property data for the updated virtual diaper.

| | Element Type | Thickness (mm) | Density (tonne/mm3) | Young's Modulus (MPa) | Poisson's Ratio |
|---|---|---|---|---|---|
| Absorbent | S4R | 5.0 | 5.0*10 − 10 | 1.0 | 0.1 |
| Containment | S4R | 0.3 | 1.23*10 − 9 | 29.9 | 0.3 |

TABLE 2-continued

Material definitions and material property data for the updated virtual diaper.

| | Element Type | Thickness (mm) | Density (tonne/mm3) | Young's Modulus (MPa) | Poisson's Ratio |
|---|---|---|---|---|---|
| flap material Containment flap elastic | T3D2 | 0.01767 | $1.1*10-9$ | Test stress vs. strain data | 0.5 |
| Leg Elastic | T3D2 | 0.01767 | $1.1*10-9$ | Test stress vs. strain data | 0.5 |
| Fastener Elastic | S4R | 0.6 | $1.1*10-9$ | Test stress vs. strain data | 0.5 |
| Fastener | S4R | 1.6 | $1.23*10-9$ | 29.9 | 0.3 |
| Cover | S4R | 0.15 | $9.32*10-10$ | 7.549 | 0.3 |

Figure 16:
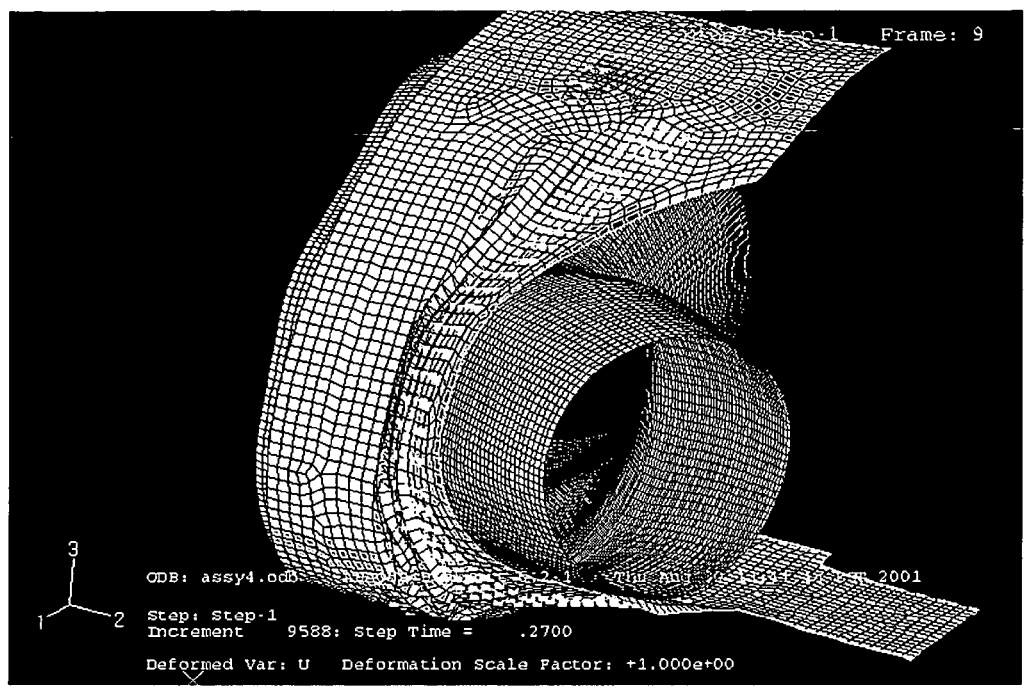
FIG. 16 is another perspective representation of the product applied to the wearer showing placement of the product.

In addition to adding complexity to the diaper, the method of diaper application during the simulation was refined to appear representative of actual diaper application. This included refining the direction, timing, and magnitude of the application forces so that the data is consistent with typical use. FIG. 16 depicts how the diaper is pulled between the legs and then wrapped onto the torso of the body. Deformation of the product and contact between the virtual product and virtual infant during the simulation of application is shown in FIGS. 16 and 17.

A model of a baby's torso situated in the diapering position (e.g., lying down with legs spread) was used for the wearer sub-model. The geometry data for the infant wearer sub-model 20 was obtained from a mannequin model of a small infant. The process used to obtain this data included scanning a mannequin torso to obtain a 3-D point cloud. The point cloud data was then converted into a surface model using Geomagic software. The surface model was then converted into a FEA model using the meshing and model definition features of Abaqus/CAE. This step requires specification of both the geometry and element type (with associated material properties) of the wearer. The elements specified for this virtual wearer were the rigid material R3D4 elements (three-dimensional quadrilaterals). This element type does not require the specification of any material properties. It is used to model the 2-D surfaces of a 3-D rigid body. To make the surface properties more realistic, a softening layer was included above the rigid foundation. The softening layer was specified as a 3 mm thick layer that would fully compress to the rigid foundation at a contact pressure of 0.1 MPa.

Techniques necessary to enable the simulation to operate for this embodiment included changing from the default Lagrange contact algorithm to Penalty contact in order to fasten the diaper ear. This was done to prevent element hourglassing (nonphysical grid distortions, potentially leading to contact problems). Placing 0.1 mm beam elements around the perimeter of the diaper prevented hourglassing elsewhere in the diaper. These elements were given the properties of diaper cover material. To stabilize and better control the rate of contraction of the elastics and the diaper, the initial condition pre-stress in the elastics was removed and replaced with a temperature control. Instead of causing elastic contraction by lessening the pre-stress, an arbitrary temperature lowering is used to contract the elastics. This method provides more control over the rate of diaper deformation and results in a successful and more stable simulation.

Figure 17:
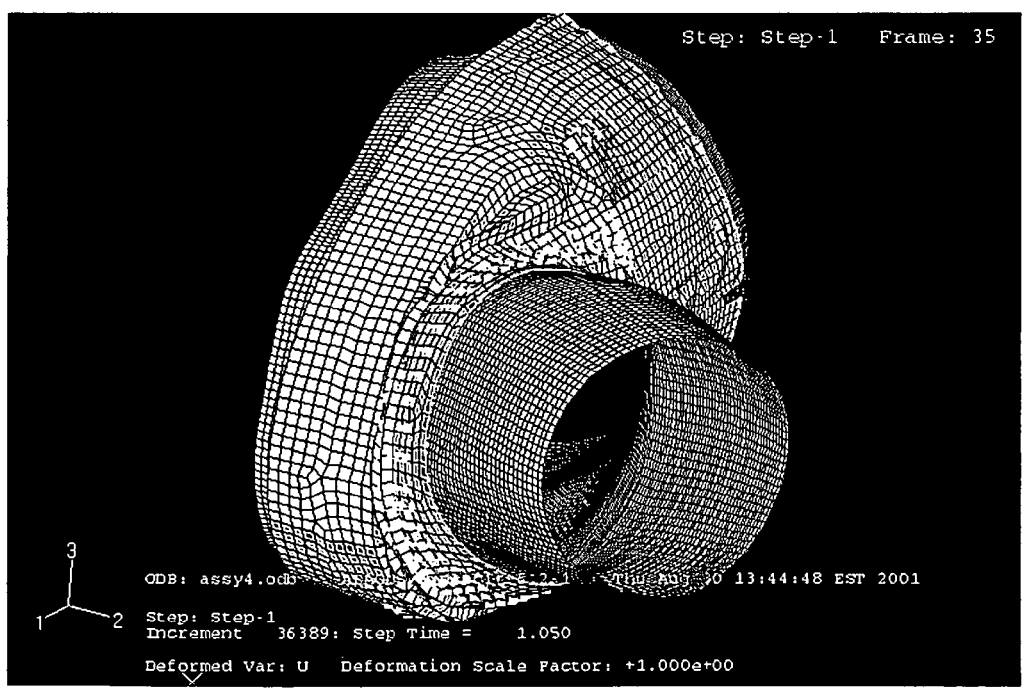
FIG. 17 is a perspective representation of a product according to one embodiment of the method.
Figure 18:
FIG. 18 is a perspective representation of the wearer showing the contact pressure profile between the product and the wearer.
Figure 19:
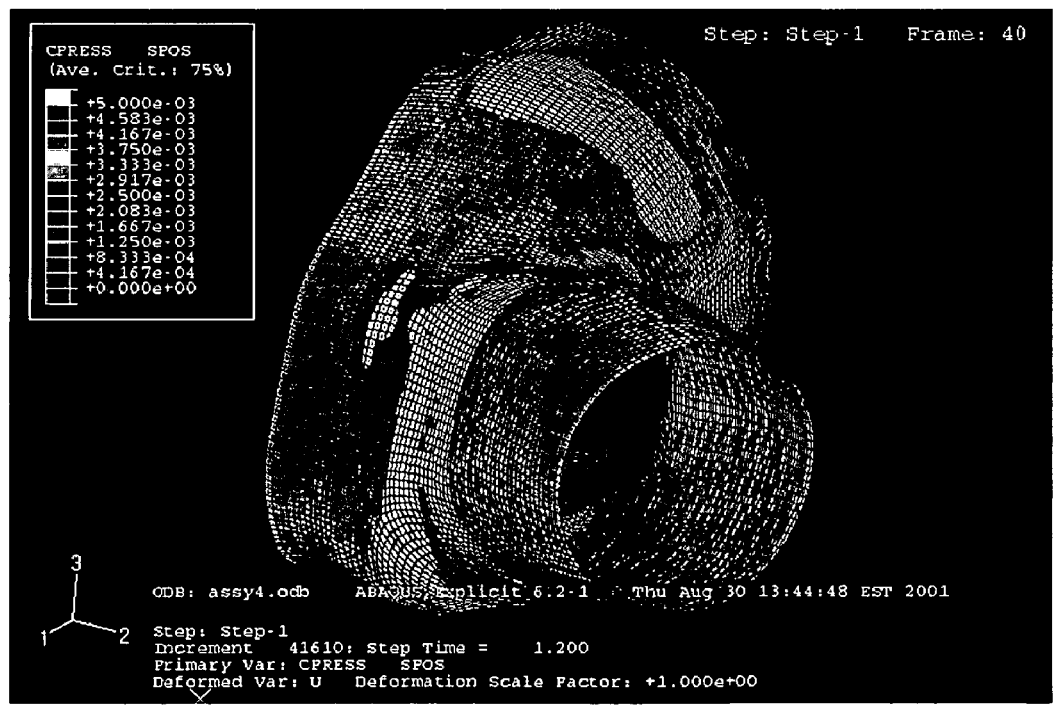
FIG. 19 is another perspective representation of the wearer showing the contact pressure profile between the product and the wearer at a different point during application.

A snapshot from the simulation of applying the diaper to the virtual user is shown in FIG. 17. During this simulation, contact pressures between the diaper and the baby were also calculated as the diaper was applied. FIGS. 18 and 19 show the contact pressures at different moments during the application. The diaper is hidden in these pictures so that the effects of the diaper on the baby can be easily visualized. It was necessary to reduce the element size on the user for this simulation so that accurate readings of contact pressure could be obtained. Contact pressure could be used to investigate diaper gaps (potential leakage sites), which have no contact pressure, and potential redmarking sites, which are areas of higher contact pressure. Diaper designs can then be modified based on the results of such simulations to obtain consistent pressures around the whole gasket that are not so high as too cause redmarking but high enough to prevent gapping.

Simulations were run with varying diaper coefficients of friction between the diaper and the torso from 0 to 3. Between 0 and 0.5 no significant difference was found in the deformation or contact pressure results. At a friction coefficient of 3, the contact pressure was only slightly different, but the positioning of the diaper did vary. It was found that at higher levels of friction the diaper sits lower at the waist and on the leg. Additionally, as the friction level is increased, the results become more sensitive to the method of diaper application.

Embodiment 1c

The third embodiment included a dynamic wearer with an internal bone structure, joints, and deformable soft tissue. In this embodiment, deformation of the product and wearer were investigated along with stresses, contact pressures, and force vectors over a range of wearer motion. To incorporate motion into the user, it was necessary to update the user from a rigid model with a compliant surface to a completely soft model with an internal bone structure. The model was given a simplified backbone, pelvis, and two femurs. Specifications of the material properties for both the soft tissue and the bones in this embodiment are summarized Table 3 below. It should be noted that these values may be altered based upon the desired characteristics of the wearer to be modeled.

TABLE 3

Material definitions and material property data for the virtual wearer.

| | Element type | Density (tonne/mm3) | Young's modulus (MPa) | Poisson's Ratio |
|---|---|---|---|---|
| Bone | B31 | $7.8*10-6$ | $2.07*108$ | 0.292 |
| Soft Tissue | C3D4 | $1*10-9$ | 0.5 | 0.3 |

Figure 20:
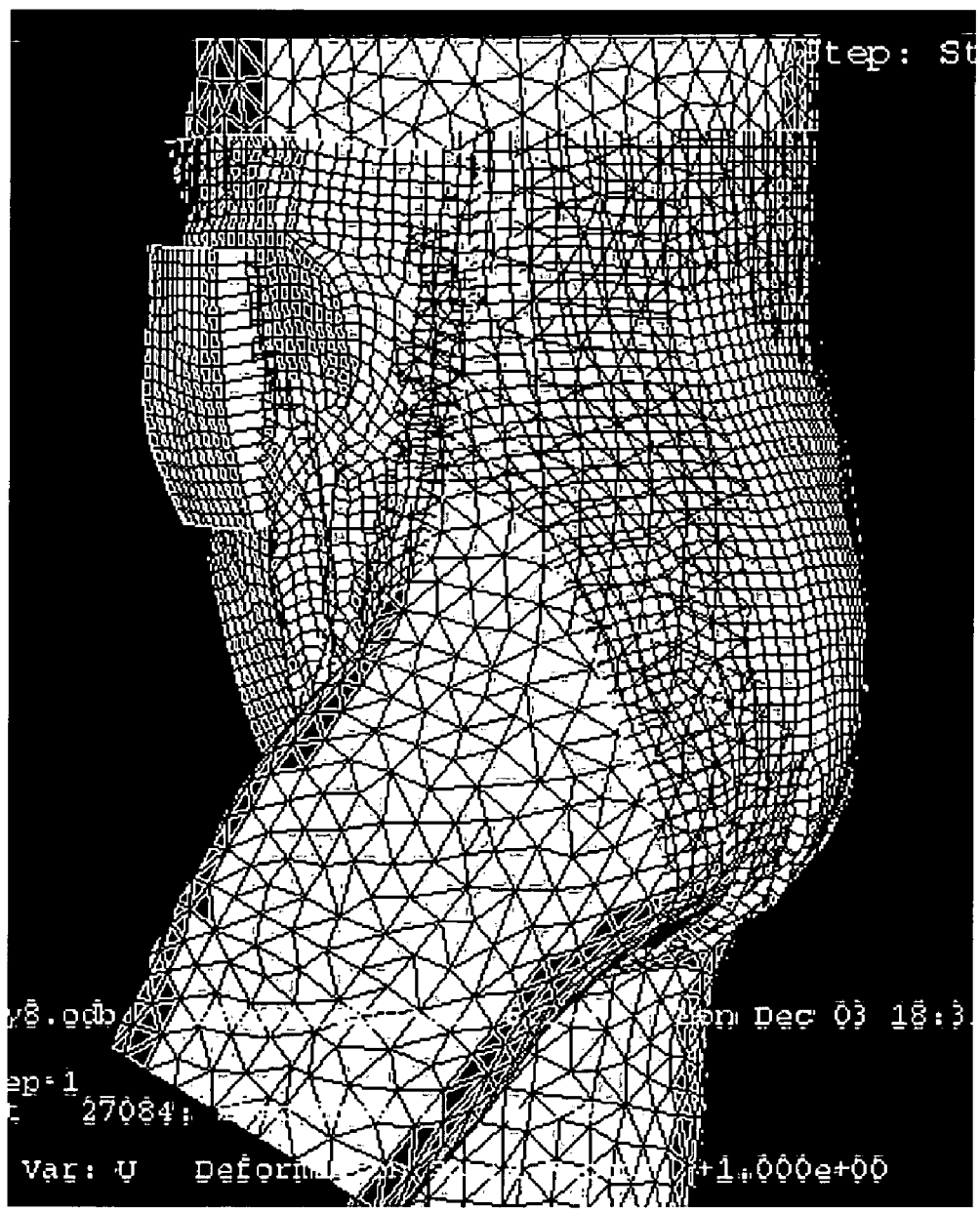
FIG. 20 is a perspective representation of the wearer walking with the product.

The elements chosen to represent the bones were beam elements. This type of element was chosen because it is good for components in which the length dimension is significantly greater than the other two dimensions (such as the femurs and backbone). The soft tissue was modeled with continuum elements that are flexible enough to adequately represent almost any shape and loading. These elements model small blocks of material in a component and can be connected to each other on any face. This allows for the versatility to model the complex shape of the infant torso. Once the torso was updated with a bone structure to allow for movement, motion could be applied to the model. The average hip motion of 2 year olds during walking was obtained for use in the simulation. (See Sutherland et al., The Development of Mature Walking, MacKeith Press, London, England, 1998, illustrating graphs that depict the hip angle versus percent gait cycle.) A representative depiction of the virtual user walking may be found in FIG. 20.

Figure 21:
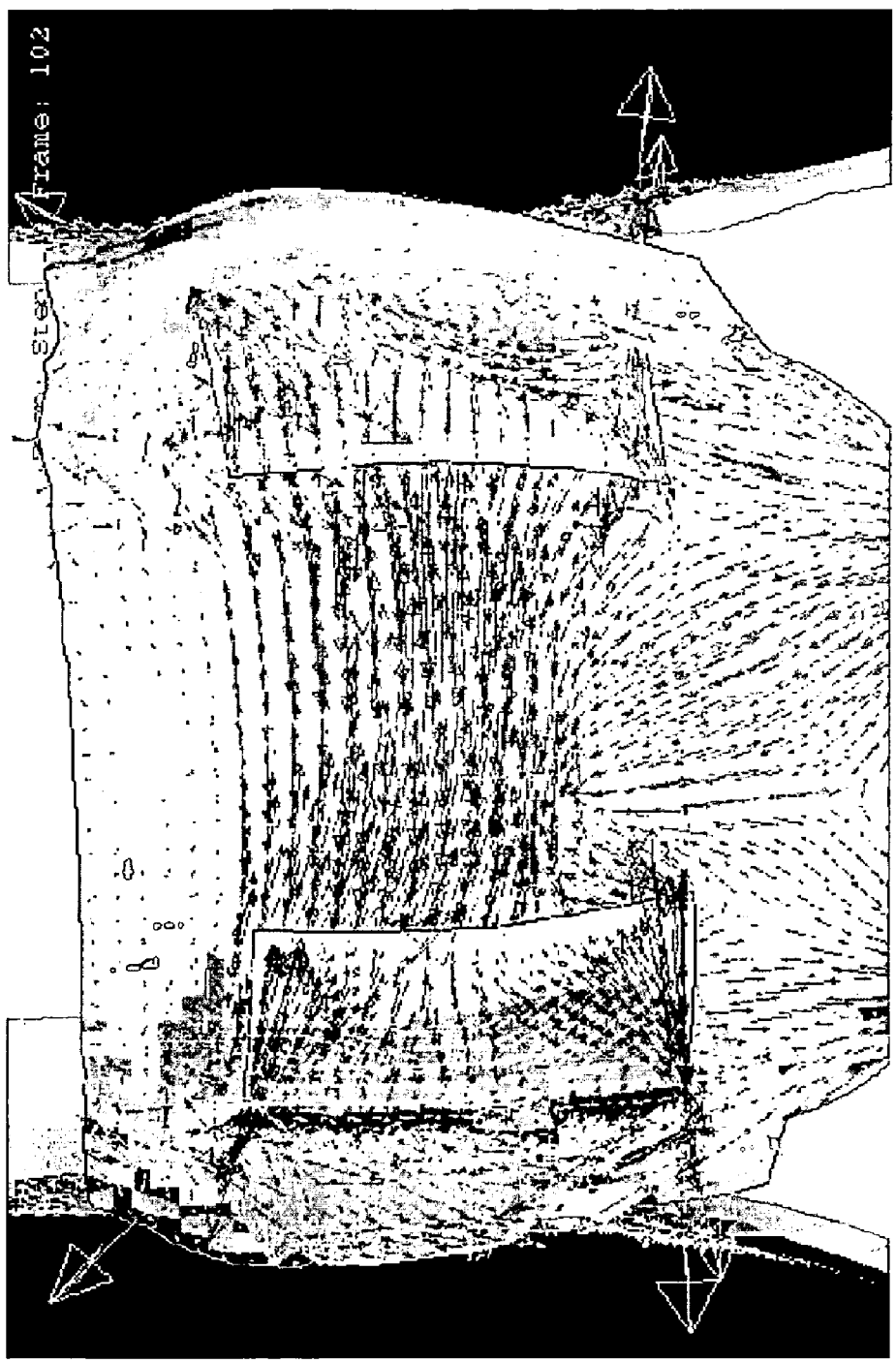
FIG. 21 is a perspective representation of forces on the product represented as vectors.

The simulation output included diaper and wearer deformation, product stresses, and contact pressures between the product and wearer through the entire process of applying the diaper and moving the wearer through the walking motion. The force vectors for every element of the diaper were also output throughout the simulation. This type of output aids in the analysis of different product designs. Specifically, it can be used to analyze force magnitudes and directions, noting any large vectors such as those highlighted in FIG. 21. Different diaper designs may be compared to display force variations. Reduction of large forces may lead to better fit maintenance or a reduction of diaper failures (i.e., ear tears).

EXAMPLE 2

Feminine Care Pad

Additional features of the feminine care pad embodiment are discussed below. Appendix 2 provides an example of the input files for the feminine care pad embodiments. In one embodiment, a typical feminine pad wearer was determined from available usage, demographic, and/or anthropometric data and modeled as the representative wearer. A representative wearer for the feminine pad is defined as a person that is 5 feet 6 inches tall, weighs 140 pounds, and has waist, hip, and thigh measurements of 27 inches, 41 inches, and 24 inches, respectively. To specify the geometry of the wearer, a point cloud of an adult female with similar body measurements to those listed above was identified from the CAESAR database. The point cloud was then converted into a Finite Element mesh_using software programs such as Geomagic, Ideas or Abaqus/CAE. Material property definitions used to describe wearer soft tissue behavior have used a Neo-Hookean hyperelastic material model. Bones can be treated as rigid or as elastic. Skin can be defined as either a layer of shell or membrane elements over the soft tissue volume and is typically given the same material behavior as the underlying soft tissue.

To improve the virtual wearer sub-model 20, quasi-spherical volumes of simulated material are removed from the finite element model in the regions surrounding the hip joints 60 of FIG. 5. This is done to allow for a greater range of motion of the leg which would be inhibited due to deformation and possible failure (due to excessive deformation) of the elements in the regions surrounding the hip joints 60 because of modeling simplifications of the soft tissue and joints. Similar failure in the physical foam torso material in these regions was noted resulting in tears that could propagate to the model surface, The product sub-model 22 is simplified to reduce calculational complexity only modeling the two solid layers 83, 85 as illustrated in FIG. 9. Alternately, in one embodiment, a continuous mesh between the distribution and shaping layers 83, 85 is used instead of contact modeling. Slots in the distribution layer are modeled and retained, as these slots tend to focus the deformation during movement, such as when the wearer closes her legs. The simplified product consists of the two thick layers, the distribution layer 83, and the shaping layer 85, bonded at their interface. This simplification reduces numerical problems encountered with the stacked design, but allows for the general product deformations observed in visualization of the product in conjunction with the foam torso test stand.

Figure 22:
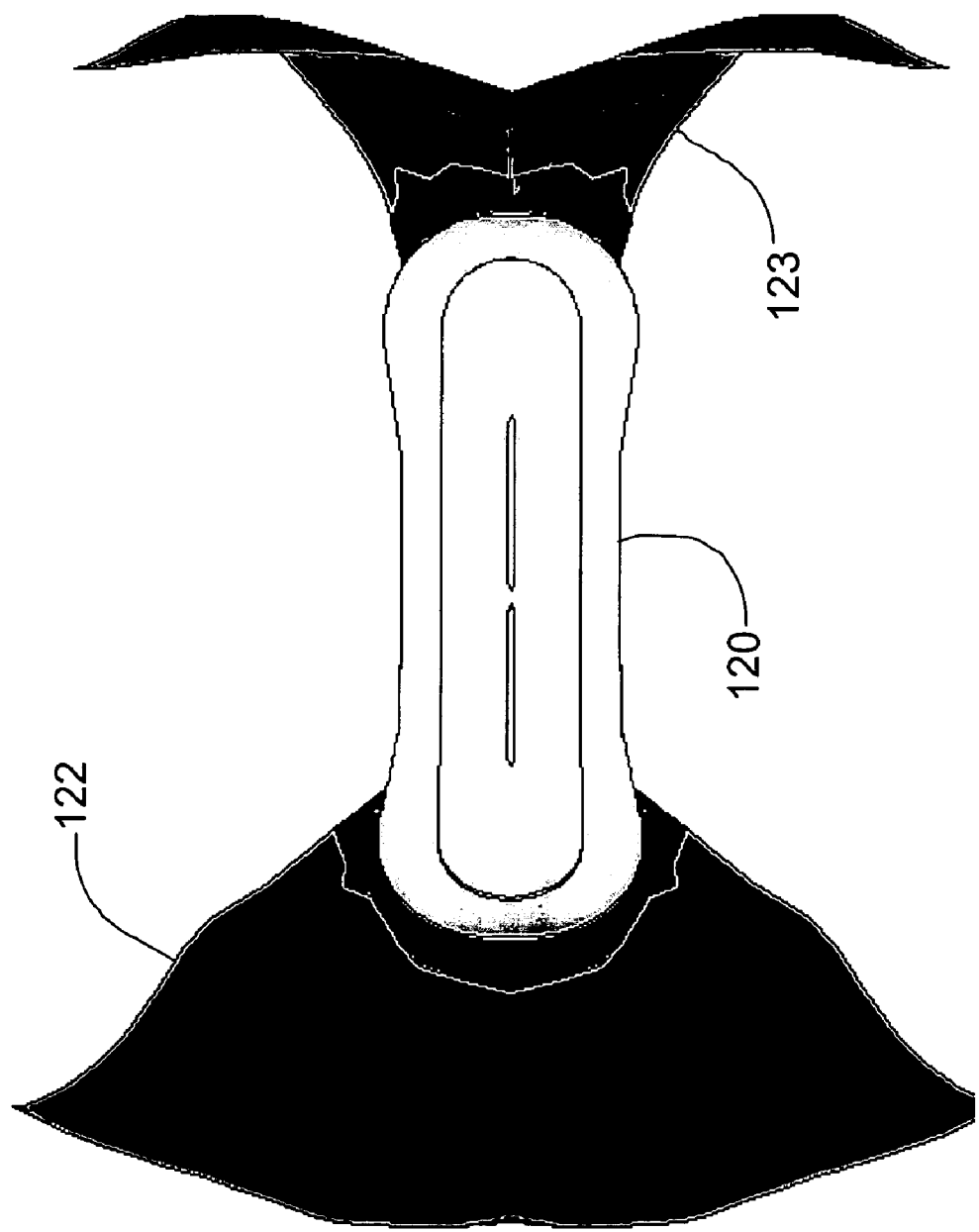
FIG. 22 is a schematic plan representation of a panty and a rigid surface used to apply the product of FIG. 9.

An environmental sub-model was also created to represent a panty, generally indicated at 120. A depiction of the product sub-model 22 and panty sub-model is illustrated in FIG. 22. The virtual panty model 120 is used on the simplified torso application runs. The panty as modeled is initially flat and without material away from V-shaped regions 122, 123 at the front and rear. Panty waistbands (not shown) are pulled up and toward the torso by enforced displacements. Lines of beams are desirable along each waistband to provide lateral stiffness to avoid numerical problems with modeling as will be understood by one skilled in the art. Table 4 lists the material definitions and material property data of the feminine care pad, the panty and the representative wearer.

TABLE 4

Material definitions and material property data for the virtual wearer and virtual feminine care pad.

| Component | Element Type | Thickness (mm) | Density (tonne/mm3) | Material Model | Young's Modulus (MPa) | Poisson's Ratio | Other Parameters |
|---|---|---|---|---|---|---|---|
| foam (body) | C3D4 | n/a | 1.00*10 − 9 | Hyperelastic | n/a | n/a | c10 = 1.0 (MPa), c01 = 0.0 (MPa), D = 0.05 (MPa-1) |
| skin | M3D3 | 1.00E−04 | 1.00*10 − 9 | Hyperelastic | n/a | n/a | c10 = 1.0 (MPa), c01 = 0.0 (MPa), D = 0.05 (MPa-1) |
| Distribution | C3D8R | n/a | 1.40*10 − 10 | Elastic/Plastic | 16.8 | 0.1 | plastic (MPa, mm/mm) {{0.24, 0.0}, {0.31, 0.0073}, {0.62, 0.014}} |
| lycra | T3D2 | 1 | 1.00*10 − 10 | Elastic | 100 | 0.3 | |
| shaping | C3D8R | n/a | 8.00*10 − 11 | Elastic/Plastic | 2.79 | 0.1 | plastic (MPa, mm/mm) {{0.051, 0.0}, {0.97, 0.0036}, {0.17, 0.015}} |
| panty | M3D3 | 0.1 | 1.00*10 − 10 | Hyperelastic | n/a | n/a | c10 = 1.0 (MPa), c01 = 0.0 (MPa), D = 0.05 (MPa-1) |

Application of the product involves the virtual panty model 120 being moved down and the waistbands moved away from the torso, from the original, neutral position to a position that permits the virtual product sub-model 22 to be captured between the virtual panty model 120 and the virtual wearer sub-model 20. The motion of the waistbands can then be reversed, allowing the virtual panty model 120 to return to the known waistband locations, thus applying the virtual product sub-model 22 to the torso with reasonable restraint forces. It was found that the virtual wearer sub-model 20 had many small element faces in the torso 52 to leg 54 transitional areas that presented some issues in the numerical stability of the panty component. The panty was remeshed in this region, keeping the same outline and topology, but replacing many of the smaller elements with several larger elements closer to the average element size in the rest of the panty. Panty models of various types of panties (e.g., bikini, briefs, etc.) can be generated and tested with the use model 30.

The use model 30 is used to determine if the virtual product sub-model 22 can be applied to the torso with the virtual panty 120, or if the panty can only be used to contain the product after application. An explicit integration based finite element software should be used for the application process because of the many contact interactions that are active. To achieve reasonable run times, the technique of mass scaling can be used to increase the stable time increment. It was seen that appropriate mass scaling allows the simulation to proceed using larger stable time increments without adversely affecting the validity of the simulation result. This causes the panty to deform and stretch without moving the product against the torso.

In one embodiment, a rigid surface or pad pusher (not shown) was modeled to push the product 80 against the torso 52 and then move away, allowing the panty model 120 to retain the product 80 against the torso. This rigid surface is based upon the topology of the panty that would come into contact with the product during installation. The initial position of the surface is slightly above the panty surface, and its motion history is slightly in advance of the panty motion. This avoids any problems with duplicate contact conditions on the product from the panty during installation. The surface is quickly moved away from the product once the application is complete to allow the panty to take over the contact interaction that would retain the product against the torso.

To obtain suitable virtual product response, it is desirable that the restraint conditions imposed by the panty are as close to reality as possible. In one detailed model, the virtual panty model 120 is still only composed of the V-shaped regions 122,123 at the front and rear of the panty, but the initial shape is not arbitrary and flat, but rather based upon the topology of the standing torso. A coating of membrane elements is placed upon the standing torso, and then modified to obtain a straight panty waistband at the front and rear. The edges of the panty mesh connecting the front and rear waistbands on either side of the panty are also modified to yield as smooth a transition as possible. The virtual panty in the detailed model is related to the torso in overall topology, and the location of the waistbands in a neutral applied position is known.

Figure 23:
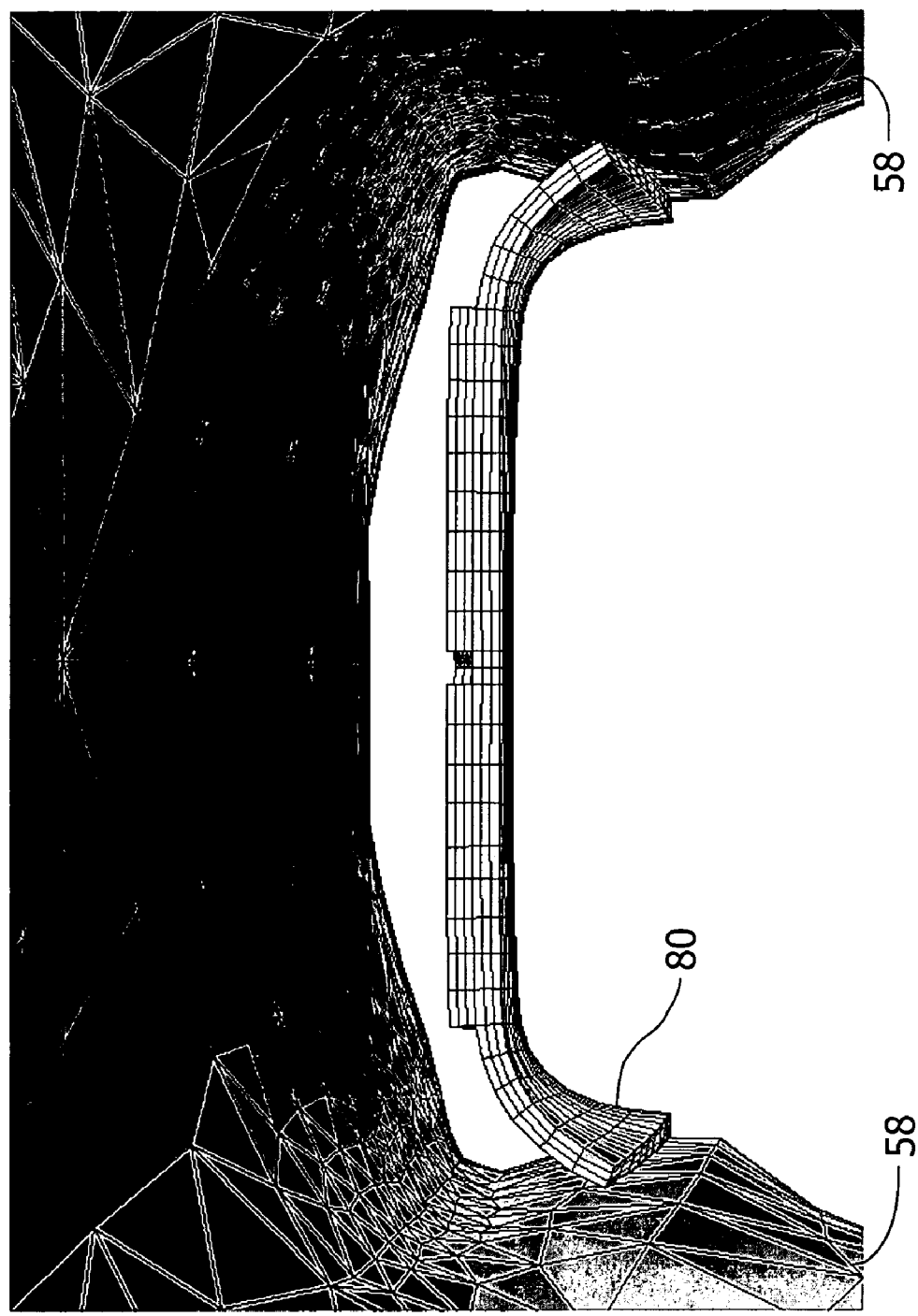
FIG. 23 is a schematic cross-sectional representation of the representative product of FIG. 22 in conjunction with a representative wearer.
Figure 24:
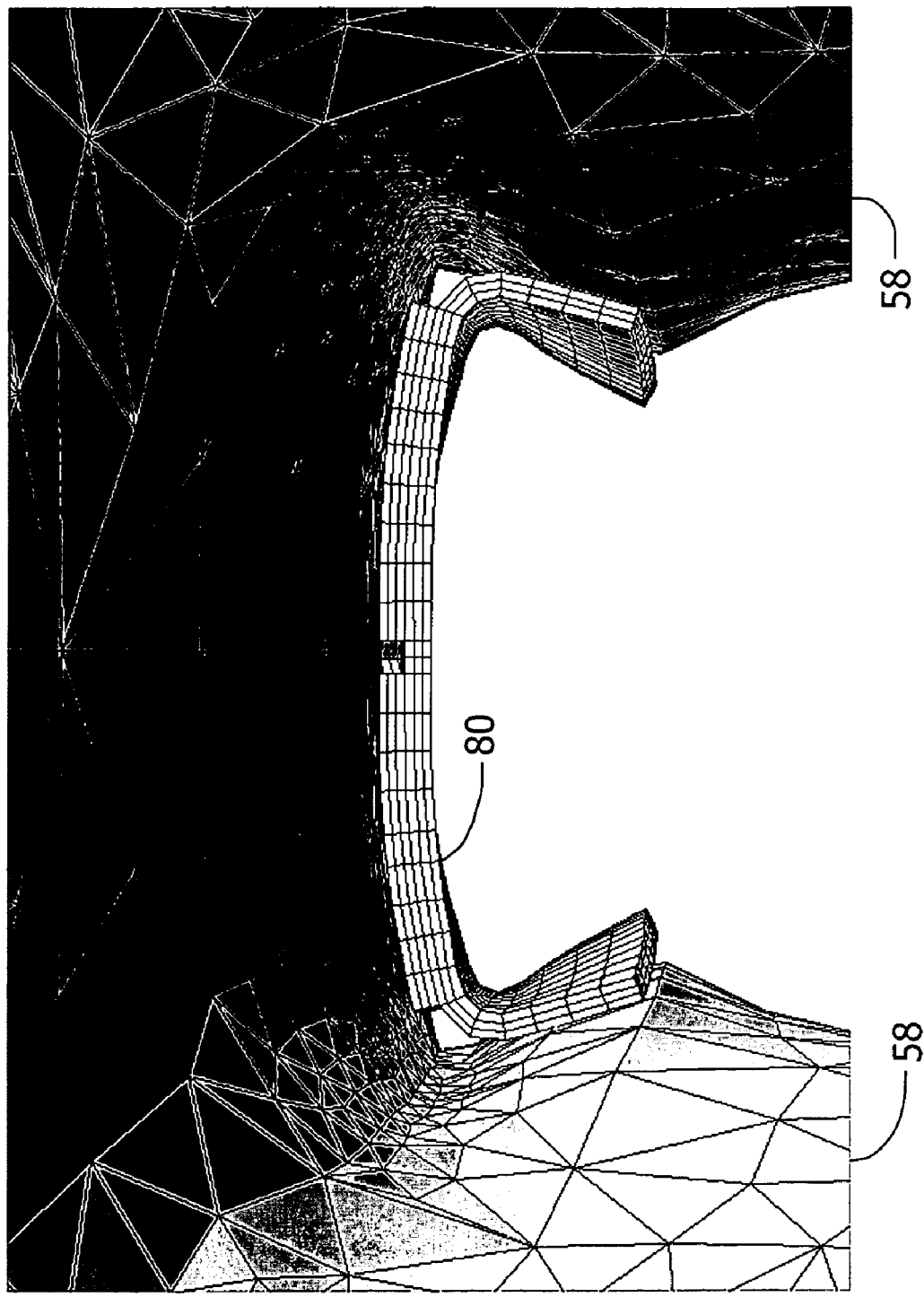
FIG. 24 is a schematic cross-sectional representation of the wearer with the representative product in place.
Figure 25:
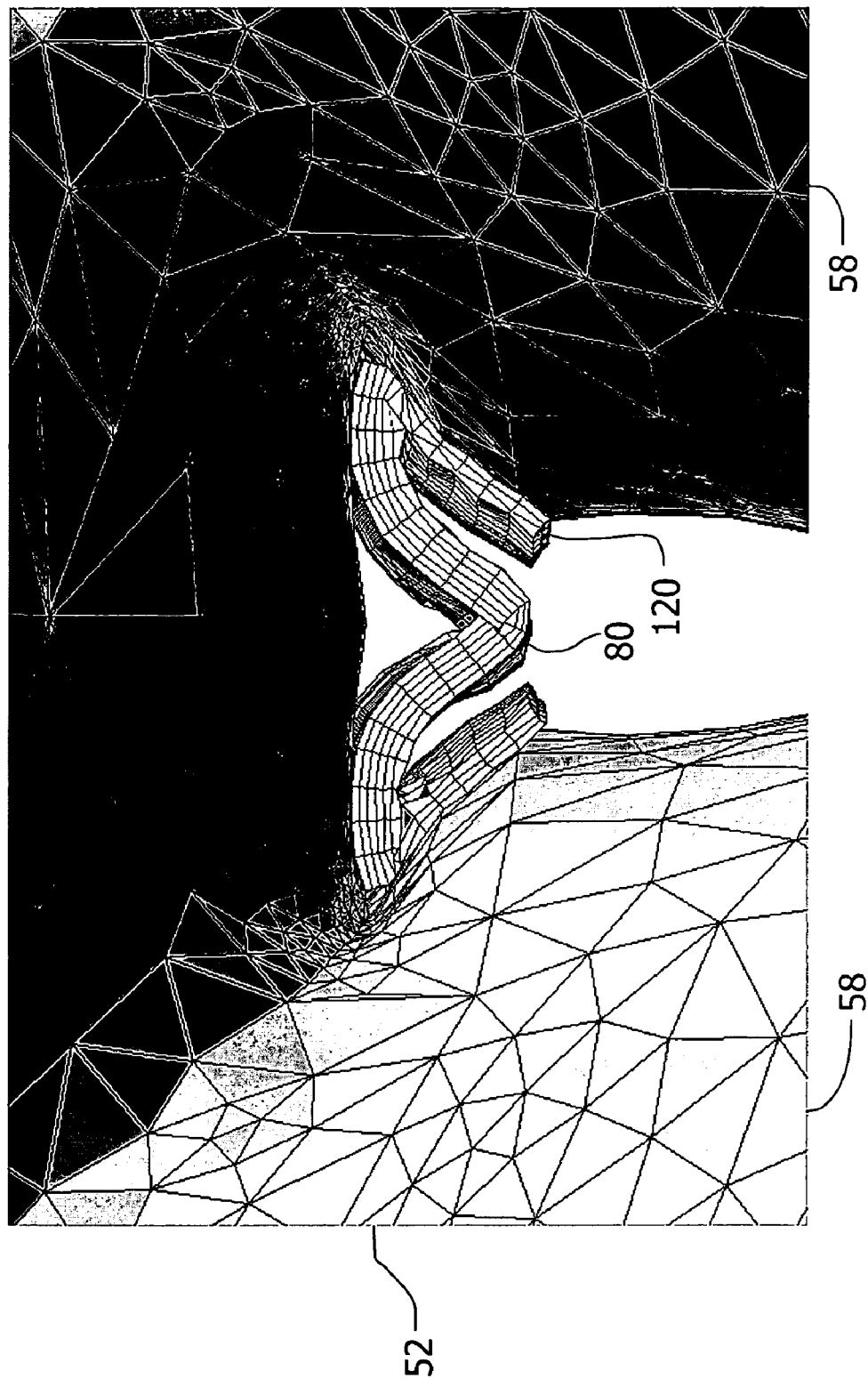
FIG. 25 is a schematic cross-sectional representation of the wearer after thighs have moved together illustrating deformation of the product.

FIGS. 23-25 are cross-sectional views of one embodiment of the product 80, illustrated as a feminine care pad, showing the product/torso deformations during product installation onto the torso 58 followed by leg closure. In the example shown, the product 80 is initially deformed onto a standing torso 58 with legs spread at an 18 degree angle using the rigid surface (not shown) and the conformal panty (not shown). This allows the product 80 to conform to the torso 58 over the entire area of the product. Because the legs have to be spread during the initial product application, the panty only consists of the V-shaped regions (122, 123 of FIG. 22) at the front and rear of the torso. Using the V-shaped region simplifies the application process because a full panty would not have to be pulled up and over the outer thighs with the legs spread. Once the product 80 is snug against the torso 58 as illustrated in FIG. 24, the rigid surface is removed, and the panty is allowed to provide the retention force by controlling the waistband position against the torso.

With the product, panty, and torso in their as-installed positions, the legs are closed as illustrated in FIG. 25. In one embodiment, closing the legs results in the outer edges of the shaping layer 85 near the center of the product 80 being bent down by contact with the thighs, while the rest of the product, mainly the distribution layer 83, is in partial contact with the torso 58. When the legs are closed, the deformation pattern of the product 80 closely resembles the deformation seen in test stand data.

Use of a conformal panty model 120 and known waistband locations ensure that the retention forces after product installation are reasonable. Because the panty model 120 provides the base for the product 80 in actual use, the interaction of the panty with not only the product, but also with the articulating torso 58, should be well defined.

In other embodiments, one or more parameters of the product sub-model 22 (i.e., of the product geometry sub-model 72 and/or the product material sub-model 74) may be modified as a function of fluid loading of the product (e.g., due to insults by bodily fluids such as urine, blood, sweat, etc.) during the simulation to evaluate product and/or body features at various stages of fluid saturation over an elapsed period of simulation time. In this manner, interaction between fluid, the virtual product and the virtual body can more accurately depict actual usage of the product.

As an example, one product sub-model 22 parameter that may be varied to simulate fluid loading of the product is the stress-strain relationships of absorbent components of the product, such as the absorbent body 113 of the diaper 111 illustrated in FIG. 13 and described previously in connection with the Example 1 simulations. To construct a virtual model of a fluid load dependent stress-strain relationship according to one particularly suitable embodiment, the stress-strain relationship is specified in the product material sub-model 74 (and more particularly in the material property data 75 thereof) as being dependent upon the temperature field (or other suitable simulation parameter field). A temperature field is assigned to the absorbent component, or region of the absorbent component, that is to become fluid loaded. This field is linked to the stress-strain relationships of the absorbent component or region thereof as a function of the saturation level of the absorbent component. As used herein, the term saturation level refers to the amount of fluid, in grams, per gram weight of the dry absorbent component (or region being loaded). Thus, each change in the temperature field during a simulation corresponds to a change in saturation level, with each saturation level having a corresponding stress-strain relationship defined in the material property data 75 for the product sub-model 22.

Initially, the temperature field may be set to that temperature corresponding to a dry condition of the absorbent component. Then, after an elapsed simulation time period, the temperature is changed (e.g., pursuant to instructions provided in the interaction model) to model an increase in saturation level of the absorbent component (or region thereof). The stress-strain relationship of the absorbent component is then modified to correspond to the saturation level of the absorbent component to thereby simulate the fluid loading.

In one particular embodiment, the functional relationship between the stress-strain relationship and the saturation level of the absorbent component is suitably modeled using the following equation:

$$\epsilon = \frac{\sigma}{E_d e^{-ms}} + K\left(\frac{\sigma}{E_d e^{-ms}}\right)^n \qquad \text{Eq. 1}$$

where, $E_d$ is Young's modulus of the absorbent component material in the dry state;

K is a curve fit parameter;

n is a curve fit parameter;

m is curve fit parameter; and s is the saturation level (grams fluid/gram weight of absorbent component).

The stress-strain relationship of the absorbent component is suitably modeled isotropically, i.e., applied uniformly in both a machine direction (longitudinal direction) and cross-machine direction (lateral direction) of the absorbent component. However, it is contemplated that the stress-strain relationship may otherwise be modeled anisotropically in the machine direction and cross-machine direction of the absorbent component without departing from the scope of this invention. It is also contemplated that stress-strain relationships may be modeled non-uniformly in different regions or zones of the absorbent component, e.g., to model non-uniform constructions (such as non-uniform thickness, density, basis weight, superabsorbent concentration, etc.) of the absorbent component.

The stress-strain relationship of the absorbent component in the Z-direction, or thickness direction, may be modeled in a manner similar to the machine direction and cross-machine direction. However, it is contemplated that in some embodiments the Z-direction (e.g., compression) stress-strain relationship will be independent of the saturation level of the absorbent component and therefore need not be modeled as varying with fluid loading.

Another product sub-model 22 parameter that can be modeled as varying with fluid loading is the thickness of the absorbent component, or region thereof. For example, where the absorbent component contains superabsorbent material, it is contemplated that the thickness of the absorbent component will increase as the superabsorbent material absorbs fluid and swells (increases in volume). In one embodiment, the thickness of the absorbent component is initially set (e.g., in the product geometry sub-model 72) to correspond to the thickness of the absorbent component at a desired saturation level but otherwise remain independent of saturation level throughout the simulation. In another embodiment, the thickness of the absorbent component may vary in response to simulated fluid loading of the virtual product. For example, the thickness of the absorbent component (i.e., in the product geometry sub-model) may be linked to and vary with the temperature field in a manner similar to the stress-strain relationships described previously, wherein temperatures within the field correspond to various saturation levels of the absorbent component.

Specifically, the material model used to describe the absorbent article may include a mechanism for thermal expansion (this is a common feature for the material models available in a commercial finite element analysis program such as ABAQUS) in which the local thermal strain is determined as the product of a thermal expansion coefficient (often referred to by the Greek symbol alpha) and the temperature difference (the difference between the current local temperature and a reference temperature). The mechanism of thermal expansion is an analogous means to describe the volume change resulting from fiber and superabsorbent swelling with increasing moisture content. In the case where the temperature field is used to describe the saturation level (e.g., not the swelling level), the swelling level (level of volume increase) can be controlled by making the thermal expansion coefficient depend on an independently controlled field variable. The value of this new field variable may be set such that the product of temperature and thermal expansion coefficient result in the desired degree of local swelling. Specifically, one may define the thermal expansion coefficient to be dependent upon the value of a field variable (called "field1" for example) such that alpha (field1)=field1. Thus, specifying the appropriate value of field1 at each point in the model results in the appropriate degree of thermal strain which has been designed to be analogous to absorbent swelling. It is also understood that the thickness may be initially set to that corresponding to a dry condition of the absorbent component and remain unchanged throughout the simulation without departing from the scope of this invention.

The weight of the absorbent component (or region thereof) may also be modeled as varying with saturation level. As an example, the weight of each finite element of the modeled absorbent component is suitably defined as:

(finite element volume)×(density)×(gravitational acceleration) Eq. 2

Thus, in one suitable embodiment, the gravitational acceleration (g) applied to each element as defined in the environmental sub-model 24, instead of conventionally remaining as a constant, may vary with the local mass ratio (ratio of the element's current mass with its dry mass) of the absorbent component. For example, in one embodiment the gravitational acceleration may be individually specified for each element. In such an embodiment, the gravitational acceleration would be modified as the wet mass of the absorbent component changed during an elapsed simulation time period. In particular, the gravitational acceleration may suitably vary in proportion to an expected change in density of the absorbent component due to fluid loading thereof. In such an embodiment, the weight of the fluid is taken into account in the absorbent component properties and is not modeled as an independent parameter. That is, the fluid itself is not modeled as having its own weight separate from the weight of the absorbent component. It is contemplated, therefore, that the weight of the absorbent component may be modeled in the product sub-model 22 instead of the environmental sub-model 24 and remain within the scope of this invention.

In another embodiment, the gravitational acceleration remains constant and the density may be defined in the product sub-model 22 as varying with saturation level (e.g., with the temperature field). It is also contemplated that the fluid may be separately modeled in the environmental sub-model 24 independent of the absorbent component. In such an embodiment, the weight of the fluid would be defined by the environmental sub-model 24 and applied to the product sub-model 22 by the interaction model 28.

In a fluid loading simulation, the product sub-model 22 (and the environmental sub-model 24 where applicable) are created to include the one or more parameters that vary as a function of saturation level (e.g., as a function of the temperature field in the embodiments described previously). Initial condition sub-models (e.g., initial condition sub-models 70, 80 of the product sub-model 22 and environmental sub-model 24) are set to model the product in a corresponding first or initial condition. For example, the product may initially be modeled in a dry condition, or as being in a partially fluid saturated condition. The instructions provided by the virtual interaction model 28 define the location at which fluid loading is to be simulated. Specifically, the interaction model 28 instructions vary the temperature field at the defined fluid loading locations over an elapsed simulation time period. For example, the instructions may define a fluid fill pattern in which the absorbent component (or region thereof) is saturated uniformly. In other embodiments, the defined fluid fill pattern may be non-uniform wherein particular regions of the absorbent component become saturated more rapidly than others to thereby more accurately simulate actual product usage.

Upon combining the interaction model 28 and product sub-model 22 (and/or the environmental sub-model 24 and the body sub-model 20 where present) to define the virtual use model 30 as illustrated in FIG. 12 and described previously, the temperature field is modified over the elapsed simulation time period to thereby simulate fluid loading of the product. For example, where the product is initially modeled in a dry condition, fluid insult of the product may be modeled. Where the product is initially modeled in a partially saturated condition, additional fluid loading of the product may be modeled. It is also contemplated that repeated fluid loadings may be simulated to model repeated insults of the virtual product so as evaluate the performance of the product as the product becomes increasingly saturated with fluid.

It is further contemplated that the interaction model 28 may comprise kinematic instructions 109 which simulate virtual body movement as described previously to allow performance evaluation of a fluid loaded product during and/or following one or more wearer movements. For example, in one suitable embodiment the computer based simulation may include simulating application of the product to a wearer, simulating wearer movement through a series of movements, simulating fluid loading of the product, and again simulating wearer movement through the series of movements. Where simulation includes modeling of repeated insults, the same series of movements may be simulated following each additional fluid insult.

Referring back to FIG. 1, the results 32 provided by the virtual use model 30 are analyzed at step 34 to evaluate the performance of the virtual product under fluid loaded conditions. The analysis 34 evaluates the performance of at least one feature of the product and/or wearer body. For example, such features may include, without limitation, product stress, product force vectors, contact pressure distribution on the body (e.g., particularly at the waist and leg elastics), curvature of a product surface, product deformation, density profiles, predicted stresses at selected locations of the product, gaps between the body and the product, the appearance of the product, the appearance of garments introduced by the environment sub-model when worn by the body, deformation of the body, contact area between the body and the product, the integral of the pressure over the contact area, contact area between a garment and the product, and the appearance of the product when in contact with an external article.

The fit of the product can be measured using quantitative measurements. Some measurements include uniform and optimal tension, contact pressure or stress throughout the product or a portion of the product, providing and/or maintaining a desired surface area of coverage during changes in body position, and conformance to the body surface area. Additional measurements can include how the product follows the natural lines of the body, the relative motion between portions of the product and the body, and bunching, twisting or roping of the surface topography of the product.

Examples of product features analyzing the fit of the product include product deformation such as can be determined by the measurement of product movement or shift during wear (i.e., during wearer movement) and gaps formed between the product and the body. Product stresses can be analyzed to determine the potential for material tears or places that need stretchable material or reinforcement. The force vectors for every element of the diaper may be output throughout the simulation. Reduction of large forces may lead to better fit maintenance or a reduction of product failures (i.e., tearing). The product curvature can be analyzed to determine the conformance of the product toward or away from the body. The product strain can be analyzed such as to determine the amount of stretch being used by diaper fasteners. The contact area can be analyzed to determine if the product is covering the entire target surface area of the body. Shape analysis or anthropometric landmark analysis of the wearer can be used to determine fit ranges such as the distance between facial landmarks to determine area for facemask coverage. Additionally, the relative distance between a product feature and a wearer landmark can be analyzed to determine fit such as the droop measured as the distance from the belly button to the top of the product waist.

Examples of wearer body and product features analyzing the comfort of the product include contact pressure distribution on the body and the magnitude of natural body shape alteration caused by product. These features can lead to skin irritation or make the product uncomfortable to wear. The appearance of the product when worn by the body can be analyzed to determine how the product swells, buckles, twists and/or bunches during wearer movement. The contours of the product can be mapped to trace the path on the wearer where the contact pressure is equal to a certain value or range. A thermal analysis can be performed to determine the heat or humidity between the product/wearer as compared to environment.

EXAMPLE 3

Fluid Loaded Diaper

Figure 26:
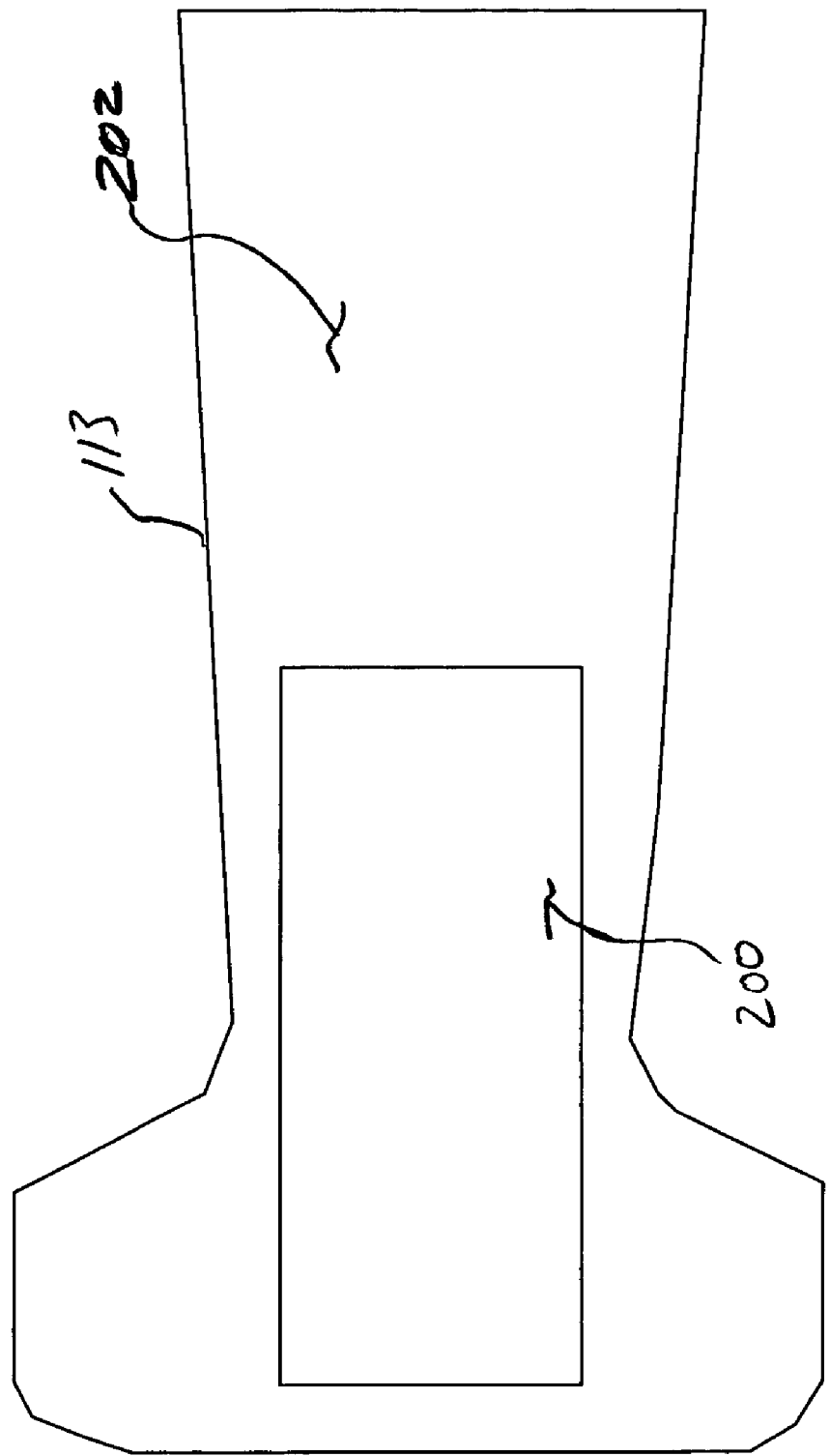
FIG. 26 is a schematic top plan view of an absorbent body of a diaper.

Four computer based simulations were run to evaluate the effect of fluid loading on the comfort and fit performance of diapers having different absorbent body constructions. Appendix 3 is an example of additional software code (i.e., in addition to the code provided in the diaper example code of Appendix 1) used to model fluid loading of the virtual diaper. Specifically, the product sub-model 22 was created to model a HUGGIES diaper design from Kimberly-Clark Worldwide, Inc. of Neenah, Wis. The absorbent body 113 (FIG. 13) of the diaper 111 was modeled in the product sub-model 22 as having two regions 200, 202 as shown in the illustration of FIG. 26. The area of the first region 200 was 110 square centimeters and the area of the second region 202 was 284 square centimeters. The density throughout the first and second regions 20, 202 was modeled as being uniform at 0.24 grams per cubic centimeter.

Two different absorbent body types were modeled. In one embodiment, the absorbent body 113 was modeled as an airformed, flat absorbent body comprised of 13.3 grams of conventional superabsorbent material, modeled as having an absorbent capacity of 30 grams-liquid per gram weight (g/g), and 17.3 grams of conventional pulp fluff, modeled as having an absorbent capacity of 7 g/g. The superabsorbent material and pulp fluff were modeled as being distributed uniformly throughout the absorbent body 113 at a total basis weight of 777 grams/square meter (gsm) (338 gsm of superabsorbent material and 439 gsm of pulp fluff) and a dry thickness of 0.324 cm.

In the second embodiment, the absorbent body 113 was modeled as an airformed, zoned absorbent body comprised of the same materials as in the first embodiment but with the basis weight and thickness at region 200 of the absorbent body modeled as being greater than the basis weight and thickness at region 202. Specifically, the superabsorbent basis weight in region 200 was 543 gsm compared to 239 gsm in region 202; the fluff basis weight in region 200 was 707 gsm compared to 311 gsm in region 202 the total basis weight in region 200 was 1,250 gsm compared to 550 gsm in region 202; and the dry thickness of region 200 was 0.521 cm compared to a 0.229 cm dry thickness of region 202.

Two different fluid fill patterns (i.e., the manner in which the absorbent body 113 is fluid loaded during the simulation) were also modeled. In a "bottom-up" fill pattern, fluid was modeled as being taken only into region 200 of the absorbent body 113 until the absorbent capacity of region 200 was reached, after which additional fluid loaded into the absorbent body was simulated as being taken only into region 202. In a "uniform" fill pattern, the two regions 200, 202 of the absorbent body 113 were modeled such that the saturation level (in grams-liquid per gram dry weight) of the regions was substantially the same upon each simulated fluid loading of the absorbent body.

The four simulations (as set forth in the table of FIGS. 27A and 27B) included modeling of the following absorbent body 113 and fill pattern combinations:
Code A: zoned absorbent body/bottom-up fill
Code B: zoned absorbent body/uniform fill
Code C: flat absorbent body/bottom-up fill
Code D: flat absorbent body/uniform fill In each simulation, the virtual diaper was modeled as first being donned on a virtual body, such as the baby's torso described previously in Example 1, and the legs then brought together in a standing position. The virtual body was then instructed to move through a series of movements including movement from a standing position to a sitting position and then back to a standing position. Next, the simulation modeled a fluid insult of 70 grams, followed by simulated movement of the wearer's body through the standing to sitting to standing series of movements. The fluid insult step and subsequent series of movements step were repeated up to six times during the simulation.

Three different simulation methods were employed for each of the four simulation codes set forth above.

Simulation Method 1

In this simulation method, the thickness of the absorbent body 113 was specified initially (e.g., in the product geometry sub-model) as the dry thickness of the absorbent body and remained independent of fluid loading throughout the simulation. The stress-strain relationships of the absorbent body 113 were modeled in the material property data 75 as being dependent on the temperature field as described previously herein, with temperatures within the temperature field corresponding to various saturation levels of the absorbent body following respective insults thereof. Thus, the temperature of the absorbent body 113 was initially set to the designated temperature associated with a dry condition of the absorbent body, and was subsequently adjusted in accordance with instructions provided in the interaction model to simulate each insult of the absorbent body.

The stress-strain relationships of the absorbent body 113 were modeled isotropically using Eq. 1 above, with:
$E_d$=932 kPa
K=250,000
n=4.3
m=0.1868

The weight of the absorbent body 113 was also modeled as varying with saturation in the manner described above. That is, the gravitational acceleration was varied directly (at the same time as the temperature change) in proportion to an expected change in density of the absorbent body upon fluid loading.

Figure 28:
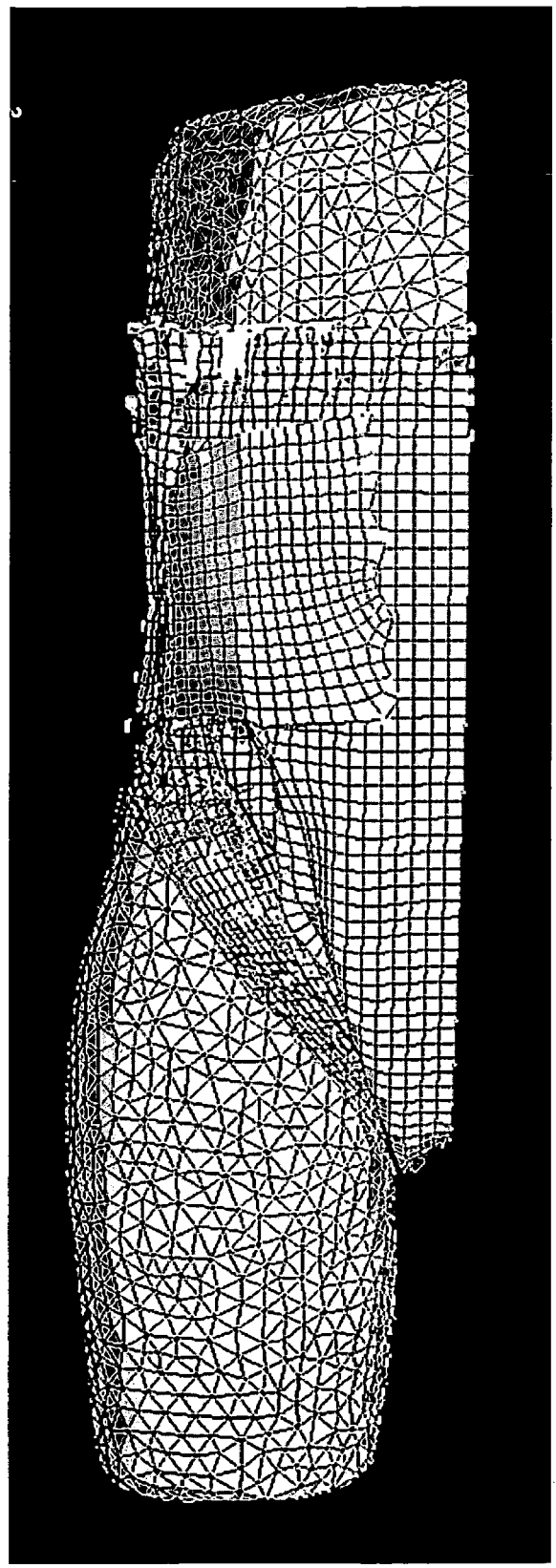
FIG. 28 is a front elevation representation of one-half of a diaper on a wearer's torso with the diaper in a dry condition.
Figure 29:
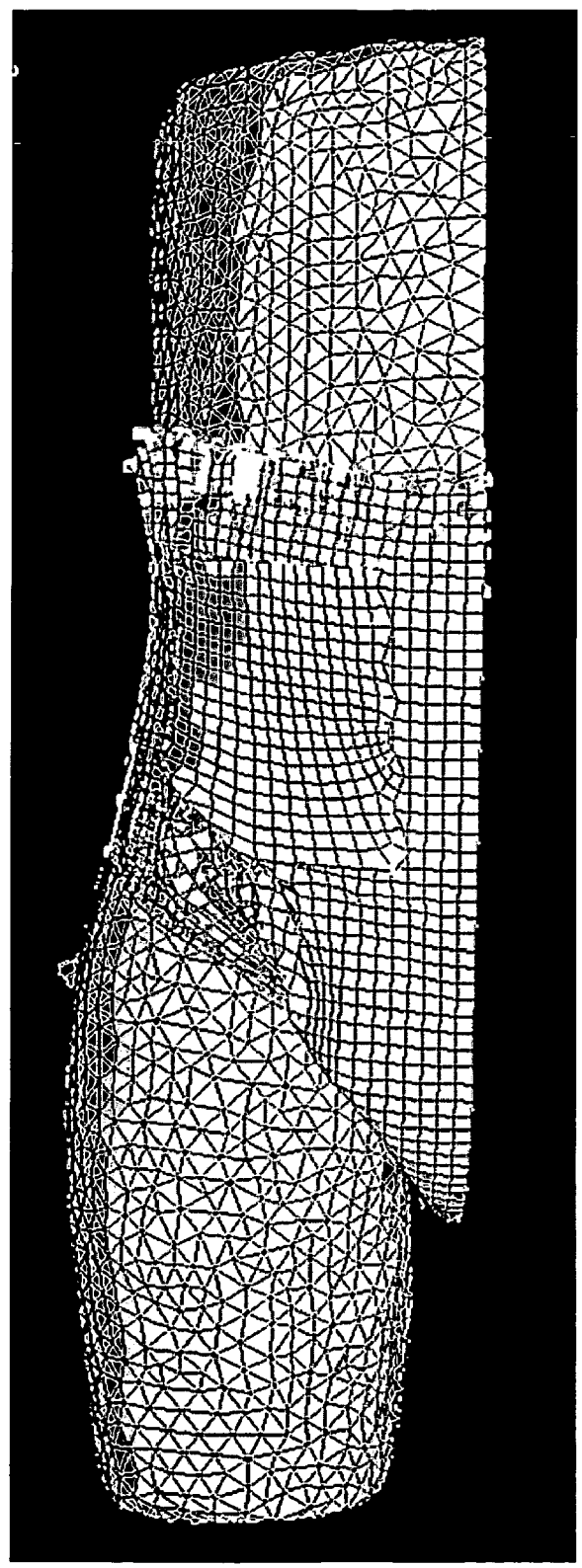
FIG. 29 is a front elevation representation similar to FIG. 28 with the diaper in a fluid loaded condition.
Figure 30:
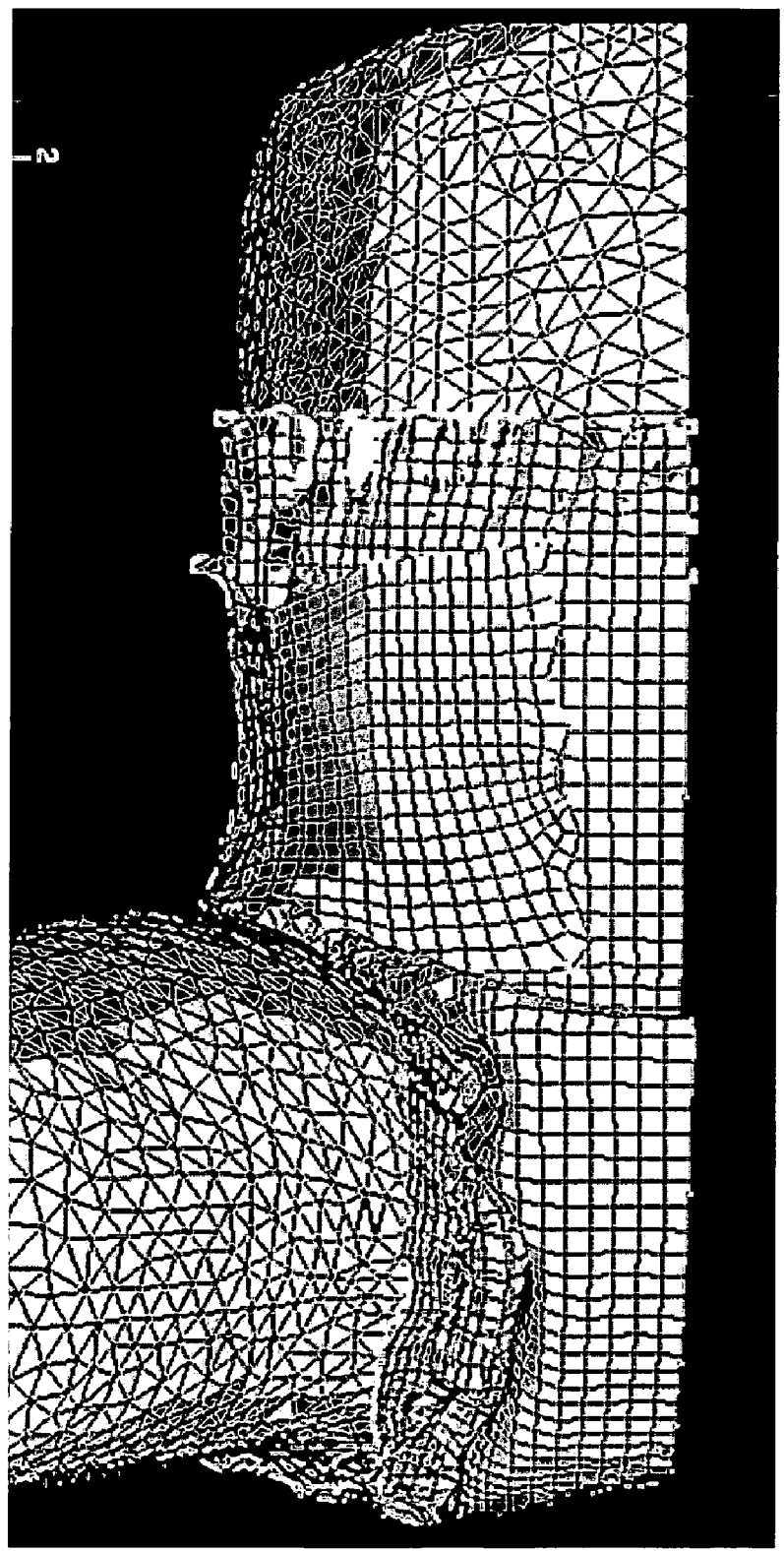
FIG. 30 is a front elevation representation similar to FIG. 29 with the wearer in a sitting position.

Using the results 32 of the virtual use model 30 defined by the simulation, various product and/or body features were evaluated at the dry condition and at different saturation levels (e.g., following each fluid loading and corresponding series of movements) throughout the simulation. For example, FIG. 28 shows the code D virtual diaper (flat absorbent body/uniform fill pattern) following initial donning and movement (in a dry condition) using simulation method 1. FIG. 29 shows the same virtual diaper following fluid loading (2 insults). The virtual diaper has drooped at its waist and expanded at its crotch as a result of the modeled fluid loading. FIG. 30 shows the same code D virtual diaper with the virtual body in a simulated sitting position after the diaper was fluid loaded with a first fluid insult of 70 grams using simulation method 1.

As another example, the droop of the diaper was also evaluated. The droop was normalized by subtracting the droop determined at a reference position defined after the diaper was initially donned on the wearer and the legs were brought together, from the droop determined at a later simulation time period. The following sampling of diaper droop data was measured for the code D diaper using simulation method 1.

| Point in Simulation | Droop (mm) |
| --- | --- |
| Dry diaper after first movement series | 17.44 |
| After first fluid loading | 21.29 |
| After second movement series | 27.68 |
| After second fluid loading | 32.52 |
| After third motion series | 38.39 |
| Measurement after a do nothing rest period | 38.97 |

Simulation Method 2

This simulation method was substantially the same as simulation method 1, but instead initially specified the thickness of the absorbent body 113 as being that of the absorbent body at a predetermined saturation level. Because the thickness of the absorbent body 113 did not vary with fluid loading in simulation method 1, the fluid loaded thickness of the absorbent body was used in simulation method 2 to investigate the impact of thickness variations on fit and comfort.

Figure 31:
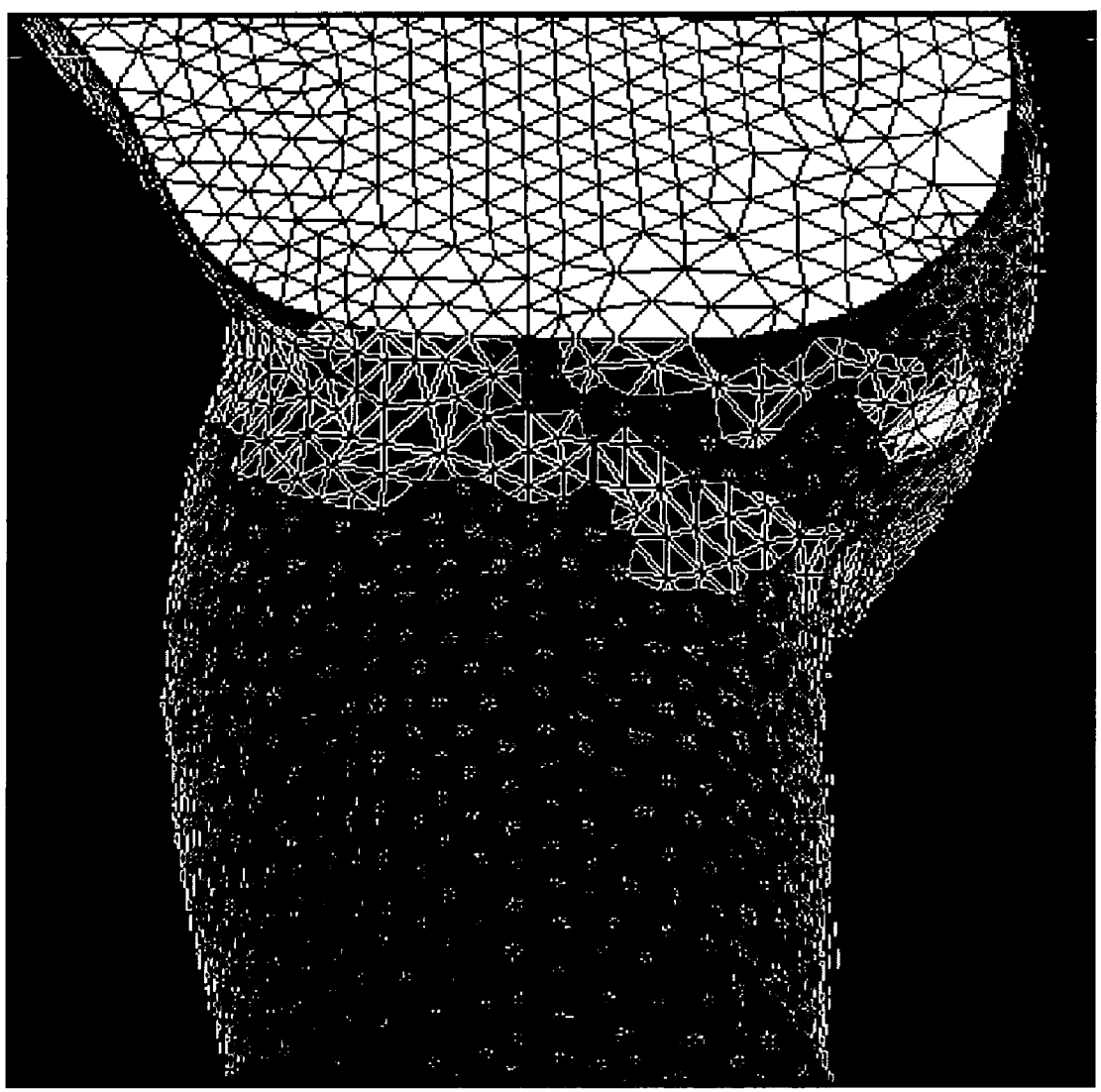
FIG. 31 is a side elevation representation of a contact pressure profile between a diaper and the inner thigh of a wearer as determined using a first simulation method.
Figure 32:
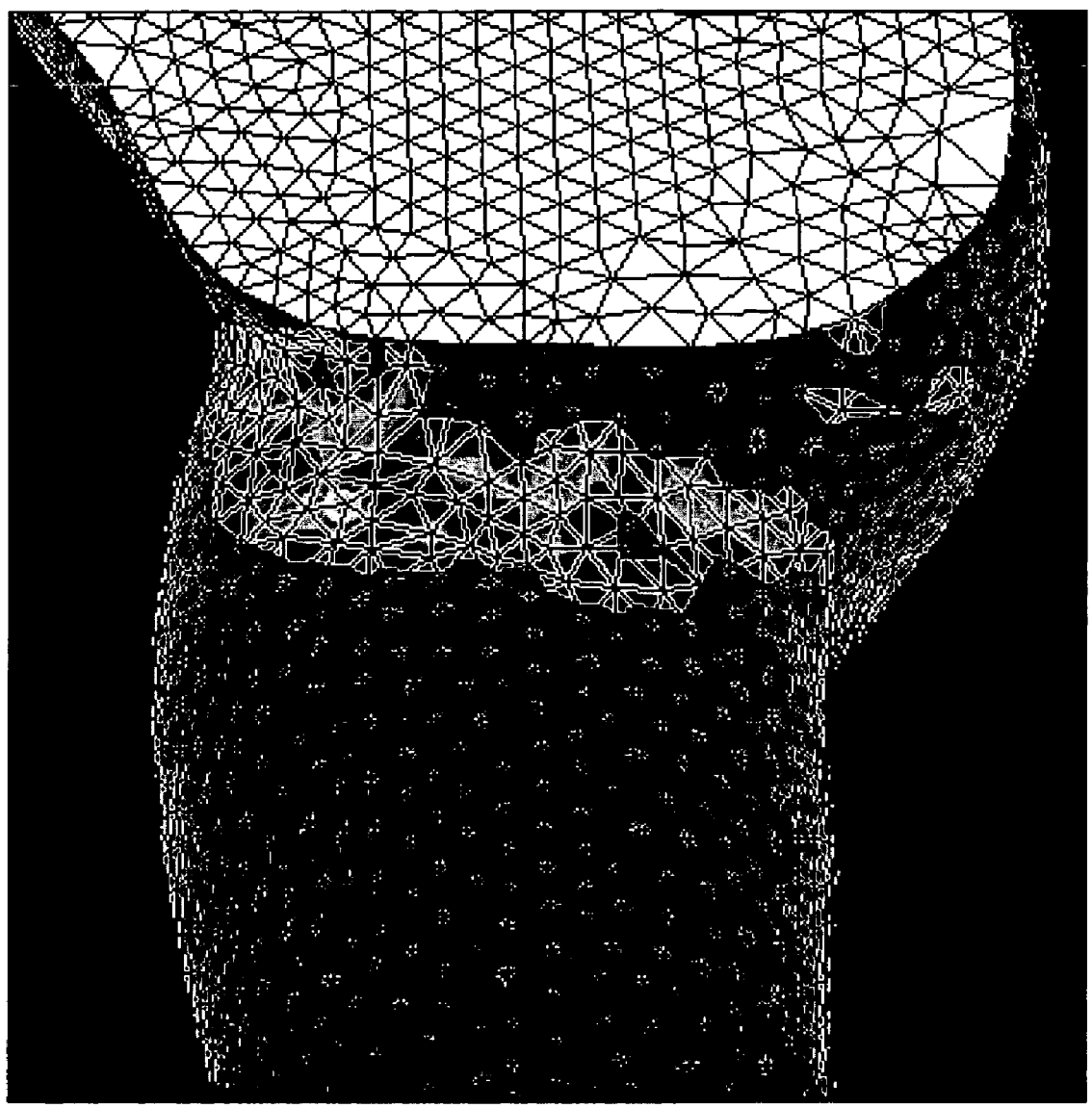
FIG. 32 is a side elevation representation similar to FIG. 30 but determined using a second simulation method.

As an example of the difference between the two simulation methods, FIG. 31 shows a contact pressure map of the code A virtual diaper (zoned absorbent body/bottom-up fill pattern) against the inner thigh of the virtual body (e.g., due to the leg elastics 118, also referred to as leg gaskets, of the virtual product) after the first fluid loading and subsequent series of movements using simulation method 1. FIG. 33 illustrates a similar contact pressure map at the same point in the simulation using simulation method 2.

The droop data obtained using the two different simulation methods can also be compared. For example, the following droop data was obtained during the code A simulation using simulation method 1.

| Point in Simulation | Droop (mm) |
| --- | --- |
| Dry diaper after first movement series | 20.59 |
| After first fluid loading | 23.27 |
| After second movement series | 32.99 |

Using simulation method 2, the droop data for the same code A simulation was as follows:

| Point in Simulation | Droop (mm) |
| --- | --- |
| Dry diaper after first movement series | 25.3 |
| After first fluid loading | 31.6 |
| After second movement series | 44.8 |

Thus, modeling the absorbent body 113 thickness to correspond to a fluid loaded (e.g., swelled) thickness increased the droop resulting from the fluid loading.

Simulation Method 3

The third simulation method was similar to simulation method 1 but modeled the thickness of the absorbent body 113 as varying with the saturation level (e.g., using the temperature field in the same manner as other saturation level dependent parameters being modeled) of the absorbent body. This allowed for a change in thickness to occur upon fluid loading during the simulation.

The method and apparatus described herein has the advantage of being able to model a product being put on as a wearer would put it on, in addition to modeling the product while the product is being worn and used. Also, the method and apparatus described herein provide dynamic modeling of the product in use, as opposed to previous systems that typically provide only static modeling. In addition, the computer-based modeling of virtual products and uses can examine features and results that cannot be seen through physical testing. Finally, the apparatus and method can be used for optimization modeling; a product developer selects a desired product performance, and the model designs a product that will meet that performance.

The invention described herein provides an improved method to virtually evaluate and design products. Virtual development does not have the limitations of resource and material availability, or safety issues associated with human testing. Virtual development allows exploration of concepts not achievable previously using conventional methods. This virtual advantage expedites innovations by allowing new products to get to market faster and with less cost.

While the invention has been described in conjunction with several specific embodiments, it is to be understood that many alternatives, modifications and variations will be apparent to those skilled in the art in light of the foregoing description. Accordingly, this invention is intended to embrace all such alternatives, modifications and variations that fall within the spirit and scope of the appended claims.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

APPENDIX 1...DIAPER EXAMPLE

TABLE OF CONTENTS

DIAPER 1ST EMBODIMENT     46
    diaper.inp Z             46

DIAPER 2ND EMBODIMENT     49
    FILES                    49
        assy4.geom.Z        49
        assy4.sets.Z        53
        assy4.surfaces.Z    56
        assy3.materials     58
        assy3.boundary      61
        assy3.pressure      64
    END FILES                64
    Assy4.inp.Z              65

DIAPER 3RD EMBODIMENT     66

FILES                    66
        LeftLegForward.amp  66
        LeftLegSide.amp     67
        phase7.bcs          68
        phase7.geom         69
        phase7.loads        72
        phase7.materials    73
        phase7.sections     74
        phase7.sets         -76
        phase7.surfaces     77

RightLegForwawrd.amp     80
    RightLegSide.amp         81
    END FILES                81 phase7.inp               82
END                          82

NOTE:  Several periods in a row on one line (e.g.,……..) indicates additional similar lines of code which have been deleted.

```
DIAPER 1ST EMBODIMENT
        diaper.inp.Z

*HEADING
**    UNITS
**    Length = mm
**    Time = Sec
**    Mass = Tonne
**    Force = N
**    Stress = MPa
**
*NODE
        1,         143.272,
107.569,   -1.16582E-13
        2,        -143.763,
127.257,   -1.16582E-13
        3,         138.398,
106.323,   -1.16582E-13
        4,         133.524,
105.077,   -1.16582E-13
        5,         128.635,
103.897,   -1.16582E-13
        6,         123.701,
102.918,   -1.16582E-13
        7,         118.766,
101.94,    -1.16582E-13
        8,         113.832,
100.961,   -1.16582E-13
        9,         108.869,
100.15,    -1.16582E-13
       10,         103.888,
99.4433,   -1.16582E-13
       11,          98.9072,
98.7367,   -1.16582E-13
...........................
...........................
     3338,        -139.543,
50.6953,   -1.62006E-13
     3339,        -144.558,
50.6953,   -1.6262E-13
     3340,        -149.572,
50.6953,   -1.63234E-13
     3341,        -154.586,
50.6953,   -1.63849E-13
     3342,        -159.6,
50.6953,   -1.64463E-13
     3343,        -164.615,
50.6953,   -1.65077E-13
**
**
*ELEMENT, TYPE=S4R,
ELSET=CENTER
      975,         449,         433,
1473,      1474
      976,         450,         449,
1474,      1475
      977,         451,         450,
1475,      1476
      978,         452,         451,
1476,      1477
      979,         453,         452,
1477,      1478
      980,         454,         453,
1478,      1479
      981,         455,         454,
1479,      1480
      982,         456,         455,
1480,      1481
      983,         457,         456,
1481,      1482
      984,         458,         457,
1482,      1483
      985,         459,         458,
1483,      1484
...........................
...........................
....
     2298,        2880,        2916,
2915,      2879
     2299,        2881,        2917,
2916,      2880
     2300,        2876,        2917,
2881,      2875
     2301,        2910,        2917,
2876,      2877
     2302,        2911,        2916,
2917,      2910
     2303,        2912,        2915,
2916,      2911
     2304,        2912,        2913,
2914,      2915
*ELEMENT, TYPE=T3D2,
ELSET=ELASTIC-
     2731,        1753,        3341
     2732,        3341,        3338
     2733,        3338,        3335
     2734,        3335,        3332
     2735,        3332,        3329
...........................
...................
     2772,        3009,        3006
     2773,        3006,        3003
     2774,        3003,        3000
     2775,        3000,        2997
     2776,        1405,        1397
*ELEMENT, TYPE=T3D2,
ELSET=ELASTI_1
     2655,           2,          57
     2656,          57,          54
     2657,          54,          51
     2658,          51,          48
     2659,          48,          45
     2660,          45,          42
```

```
      2661,       42,       39
............................
      2724,      333,      336
      2725,      336,      339
      2726,      339,      342
      2727,      342,      345
      2728,      345,      348
      2729,      348,      351
      2730,      351,      297
*ELEMENT, TYPE=S4R,
ELSET=FLAP
      2305,      449,     3066,
1473,      433
      2306,      450,     3067,
3066,      449
      2307,      451,     3068,
3067,      450
      2308,      452,     3069,
3068,      451
      2309,      453,     3070,
3069,      452
      2310,      454,     3071,
3070,      453
      2311,      455,     3072,
3071,      454
............................
      2648,     3338,     3057,
3056,     3337
      2649,     3339,     3058,
3057,     3338
      2650,     3340,     3059,
3058,     3339
      2651,     3341,     3060,
3059,     3340
      2652,     3342,     3061,
3060,     3341
      2653,     3343,     3062,
3061,     3342
      2654,     3343,     1753,
1401,     3062
*ELEMENT, TYPE=S4R,
ELSET=LEG-ELAS
         1,        3,      118,
61,        1
         2,        4,      117,
118,        3
         3,        5,      116,
117,        4
         4,        6,      115,
116,        5
         5,        7,      114,
115,        6
         6,        8,      113,
114,        7
         7,        9,      112,
113,        8
         8,       10,      111,
112,        9
............................
....
       167,      348,      230,
229,      347
       168,      349,      231,
230,      348
       169,      350,      232,
231,      349
       170,      351,      233,
232,      350
       171,      352,      234,
233,      351
       172,      353,      235,
234,      352
       173,      354,      236,
235,      353
       174,      354,      297,
179,      236
*ELEMENT, TYPE=S4R,
ELSET=SIDE
       175,       37,      968,
969,       38
       176,       36,      967,
968,       37
       177,       35,      966,
967,       36
       178,       34,      965,
966,       35
       179,       33,      701,
965,       34
       180,       32,      702,
701,       33
       181,       31,      703,
702,       32
       182,       30,      704,
703,       31

............................
....
       966,     1320,     1270,
1271,     1319
       967,     1321,     1269,
1270,     1320
       968,     1322,     1268,
1269,     1321
       969,     1322,     1266,
1267,     1268
       970,      812,     1021,
1323,      811
       971,     1023,     1172,
1324,     1022
       972,     1174,     1247,
1325,     1173
*ELEMENT, TYPE=S3R,
ELSET=SIDE
```

```
       973,      8,    725,
724
       974,    350,    744,
743
** leg-elastic
**
*NSET, NSET=LEG-ELAS,
GENERATE
         1,    118,      1
       178,    236,      1
       296,    354,      1
**
** leg-elastic
**
*ELSET, ELSET=LEG-EL_1,
GENERATE
         1,    174,      1
**
** side
**
*NSET, NSET=SIDE, GENERATE
         1,     61,      1
       178,    179,      1
       296,    576,      1
       701,   1325,      1
**
** side
**
*ELSET, ELSET=SIDE_1,
GENERATE
       175,    204,      1
       206,    221,      1
       223,    974,      1
**
** flap
**
*NSET, NSET=FLAP, GENERATE
       433,    433,      1
       448,    517,      1
      1397,   1401,      1
      1471,   1473,      1
      1752,   1753,      1
      2994,   3062,      1
      3066,   3272,      1
      3275,   3343,      1
**
** flap
**
*ELSET, ELSET=FLAP_1,
GENERATE
      2305,   2654,      1
**
** center
**
*NSET, NSET=CENTER, GENERATE
       421,    421,      1
       433,    527,      1
      1397,   1680,      1
      1752,   1918,      1
      1920,   1932,      1
      2038,   2917,      1
**
** center
**
*ELSET, ELSET=CENTER_1,
GENERATE
       975,   2304,      1
**
** elastic-leg
**
*ELSET, ELSET=ELASTI_2,
GENERATE
      2655,   2730,      1
**
** elastic-flap
**
*ELSET, ELSET=ELASTI_3,
GENERATE
      2731,   2776,      1
**
** center
**
*SHELL SECTION,
ELSET=CENTER, MATERIAL=COVER
       0.1574,           5
**     0.0574,           5
**
** elastic-flap
**
*SOLID SECTION,
ELSET=ELASTIC-,
MATERIAL=FLAP-ELA
     0.113131,
**
** elastic-leg
**
*SOLID SECTION,
ELSET=ELASTI_1,
MATERIAL=LEG-ELAS
         0.1,
**
** flap
**
*SHELL SECTION, ELSET=FLAP,
MATERIAL=FLAP
       0.065,             5
**
** leg-elastic
**
*SHELL SECTION, ELSET=LEG-
ELAS, MATERIAL=COVER
       0.0574,             5
**
** side
```

```
  1  **
  2  *SHELL SECTION, ELSET=SIDE,
  3  MATERIAL=COVER
  4        0.0574,          5
  5  **
  6  ** cover
  7  ** Date: 10-Jul-01
  8  Time: 11:48:48
  9  **
 10  *MATERIAL, NAME=COVER
 11  **
 12  *DENSITY
 13      9.32E-10,
 14  **
 15  *ELASTIC, TYPE=ISO
 16        7.549,         0.3
 17  *Damping,Alpha=1.0E+2
 18  **
 19  ** flap
 20  ** Date: 10-Jul-01
 21  Time: 11:48:48
 22  **
 23  *MATERIAL, NAME=FLAP
 24  **
 25  *DENSITY
 26       1.23E-9,
 27  **
 28  *ELASTIC, TYPE=ISO
 29         29.9,          0.3
 30  *Damping,Alpha=1.0E+2
 31  **
 32  ** leg-elastic
 33  ** Date: 10-Jul-01
 34  Time: 11:48:48
 35  **
 36  *MATERIAL, NAME=LEG-ELAS
 37  **
 38  *DENSITY
 39        1.E-9,
 40  **
 41  *ELASTIC, TYPE=ISO
 42           2.,          0.4
 43  *Damping,Alpha=1.0e+4
 44  **
 45  ** flap-elastic
 46  ** Date: 10-Jul-01
 47  Time: 11:48:48
 48  **
 49  *MATERIAL, NAME=FLAP-ELA
 50  **
 51  *DENSITY
 52       1.1E-9,
 53  **
 54  *ELASTIC, TYPE=ISO
 55         2.82,          0.4
 56  *Damping,Alpha=1.0e+4
 57  **
 58  ** centerline
 59  **
 60  *BOUNDARY, OP=NEW
 61       1825, 2,,               0.
 62       1826, 2,,               0.
 63       1827, 2,,               0.
 64       1828, 2,,               0.
 65       1829, 2,,               0.
 66       1830, 2,,               0.
 67  ............................
 68  ....
 69       1914, 2,,               0.
 70       1915, 2,,               0.
 71       1916, 2,,               0.
 72       1917, 2,,               0.
 73       1918, 2,,               0.
 74  **
 75  *BOUNDARY, OP=NEW
 76       1823, 4,,               0.
 77       1824, 4,,               0.
 78       1825, 4,,               0.
 79       1826, 4,,               0.
 80       1827, 4,,               0.
 81       1828, 4,,               0.
 82       1829, 4,,               0.
 83       1830, 4,,               0.
 84  ............................
 85  ....
 86       2045, 3,,               0.
 87       2046, 3,,               0.
 88       2047, 3,,               0.
 89       2048, 3,,               0.
 90       2049, 3,,               0.
 91       2050, 3,,               0.
 92  **
 93  *ELSET, ELSET=PRESSURE,
 94  GENERATE
 95          1,        204,        1
 96        206,        221,        1
 97        223,       2304,        1
 98  **
 99  *Initial
100  Conditions,type=stress
101  elastic-,2.82
102  **elastic-,0.282
103  *Initial
104  Conditions,type=stress
105  elasti_1,2.00
106  **elasti_1,0.200
107  *STEP
108  *dynamic,Explicit
109  ,0.25
110  **
111  *Variable mass
112  scaling,type=below
113  min,dt=2e-5,number
114  interval=2
```

```
 1  *Amplitude,name=pressure
 2  0.0,1.0e-4,100.0,1.0e-4
 3  **
 4  ** pressure
 5  **
 6  *DLOAD,
 7  OP=NEW,amplitude=pressure
 8           1, P,      -0.43666
 9           2, P,      -0.456156
10           3, P,      -0.475681
11           4, P,      -0.495328
12           5, P,      -0.515066
13           6, P,      -0.534804
14           7, P,      -0.554599
15  ..............................
16  ....
17        2300, P,      -0.18278
18        2301, P,      -0.163574
19        2302, P,      -0.162659
20        2303, P,      -0.163195
21        2304, P,      -0.163514
22  **
23  *output,field,number
24  interval=30
25  *Element
26  output,variables=preselect
27  *Node
28  output,variables=preselect
29  **
30  *END STEP
31  ..............................
32  ....
33
34
```

```
DIAPER 2ND EMBODIMENT
              FILES
assy4.geom.Z
**
**    Units
**    Length      mm
**
*NODE
        1,       -163.,
60.,          1.E-5
        2,       -225.,
140.,         1.E-5
        3,       -155.,
140.,         1.E-5
        4,       -220.882,
140.,         1.E-5
        5,       -216.765,
140.,         1.E-5
        6,       -212.647,
140.,         1.E-5
        7,       -208.529,
140.,         1.E-5
        8,       -204.412,
140.,         1.E-5
        9,       -200.294,
140.,         1.E-5
       10,       -196.177,
140.,         1.E-5
       11,       -192.059,
140.,         1.E-5
       12,       -187.941,
140.,         1.E-5
       13,       -183.824,
140.,         1.E-5
       14,       -179.706,
140.,         1.E-5
       15,       -175.588,
140.,         1.E-5
       16,       -171.471,
140.,         1.E-5
       17,       -167.353,
140.,         1.E-5
       18,       -163.235,
140.,         1.E-5
       19,       -159.118,
140.,         1.E-5
       20,       -155.,
178.,         1.E-5
       21,       -155.,
143.8,        1.E-5
       22,       -155.,
147.6,        1.E-5
...............................
....
     2601,       200.889,
56.1228,      1.E-5
     2602,       200.302,
60.0498,      1.E-5
     2603,       200.28,
63.4099,      1.E-5
     2604,       238.,
71.,          1.E-5
     2605,       218.,
71.,          1.E-5
     2606,       222.,
71.,          1.E-5
     2607,       226.,
71.,          1.E-5
     2608,       230.,
71.,          1.E-5
     2609,       234.,
71.,          1.E-5
     2610,       238.,
116.,         1.E-5
     2611,       238.,
75.0909,      1.E-5
     2612,       238.,
79.1818,      1.E-5
     2613,       238.,
83.2727,      1.E-5
     2614,       238.,
87.3636,      1.E-5
     2615,       238.,
91.4545,      1.E-5
     2616,       238.,
95.5454,      1.E-5
     2617,       238.,
99.6364,      1.E-5
     2618,       238.,
103.727,      1.E-5
     2619,       238.,
107.818,      1.E-5
     2620,       238.,
111.909,      1.E-5
     2621,       214.,
116.,         1.E-5
     2622,       234.,
116.,         1.E-5
     2623,       230.,
116.,         1.E-5
     2624,       226.,
116.,         1.E-5
     2625,       222.,
116.,         1.E-5
     2626,       218.,
116.,         1.E-5
     2627,       214.,
111.909,      1.E-5
     2628,       214.,
107.818,      1.E-5
...............................
....
```

```
  1     4557,    -106.315,
  2 89.1919,        1.E-5,
  3     4558,     -112.82,
  4 91.1875,        1.E-5,
  5     4559,     -112.82,
  6 91.1875,        1.E-5,
  7     4560,    -123.683,
  8 93.8327,        1.E-5,
  9     4561,    -123.683,
 10 93.8327,        1.E-5,
 11     4562,    -130.408,
 12 95.2285,        1.E-5,
 13     4563,    -137.134,
 14 96.6243,        1.E-5,
 15     9999,          0.,
 16 0.
 17    10000,    -219.649,
 18 -8.51561,     167.795
 19    10001,      -219.6,
 20 -11.5794,     167.355
 21    10002,    -219.599,
 22 -14.6195,     166.772
 23    10003,    -219.643,
 24 -17.6284,     166.046
 25    10004,    -219.734,
 26 -20.5967,     165.172
 27    10005,     -219.88,
 28 -23.5146,     164.149
 29    10006,    -217.189,
 30 -8.41114,      167.86
 31 ............................
 32 ....
 33    16672,    -159.489,
 34 38.8181,      151.146
 35    16673,    -160.357,
 36 40.7464,      149.863
 37    16674,    -161.228,
 38 42.6357,       148.51
 39    16675,    -162.098,
 40 44.4874,      147.089
 41    16676,    -162.959,
 42 46.3019,      145.602
 43    16677,    -163.802,
 44 48.0777,      144.057
 45    16678,    -164.617,
 46 49.8144,      142.467
 47    16681,    -159.218,
 48 32.7022,      155.281
 49    16682,    -160.041,
 50 34.749,       154.173
 51    16683,    -160.877,
 52 36.7531,      153.006
 53    16684,    -161.725,
 54 38.7176,      151.774
 55    16685,     -162.58,
 56 40.643,       150.473
 57    16686,    -163.439,
 58 42.5295,      149.103
 59    16687,    -164.295,
 60 44.3786,      147.668
 61    16688,    -165.143,
 62 46.1914,      146.169
 63    16689,     -165.97,
 64 47.9667,      144.614
 65    16690,    -166.767,
 66 49.7037,      143.014
 67    16693,    -161.506,
 68 32.5828,      155.916
 69 ............................
 70 ....
 71    26351,    -237.802,    -
 72 23.7646,      163.548
 73    26352,     -240.04,
 74 -23.7627,     163.414
 75    26353,    -242.278,
 76 -23.7598,     163.277
 77    26354,    -244.516,
 78 -23.7593,     163.145
 79    26355,    -246.755,
 80 -23.7644,     163.022
 81    26356,    -248.994,
 82 -23.7784,     162.917
 83    26357,    -251.235,
 84 -23.8047,     162.834
 85 **
 86 ** torso
 87 **
 88 *ELEMENT, TYPE=R3D4,
 89 ELSET=TORSO
 90     6654,   10000,   10001,
 91   10007,   10006
 92     6655,   10001,   10002,
 93   10008,   10007
 94     6656,   10002,   10003,
 95   10009,   10008
 96     6657,   10003,   10004,
 97   10010,   10009
 98     6658,   10004,   10005,
 99   10011,   10010
100     6659,   10006,   10007,
101   10013,   10012
102     6660,   10007,   10008,
103   10014,   10013
104     6661,   10008,   10009,
105   10015,   10014
106     6662,   10009,   10010,
107   10016,   10015
108     6663,   10010,   10011,
109   10017,   10016
110 ............................
111 ....
112    20851,   26335,   26336,
113   26351,   26350
```

```
    20852,   26336,   26337,
26352,   26351
    20853,   26337,   26338,
26353,   26352
    20854,   26338,   26339,
26354,   26353
    20855,   26339,   26340,
26355,   26354
    20856,   26340,   26341,
26356,   26355
    20857,   26341,   26342,
26357,   26356
**
*ELEMENT, TYPE=S4R, ELSET=A
        1,      21,      56,
19,       3
        2,      22,      57,
56,      21
        3,      23,      58,
57,      22
        4,      24,      59,
58,      23
        5,      25,      60,
59,      24
        6,      26,      61,
60,      25
        7,      27,      62,
61,      26
        8,      28,      63,
62,      27
        9,      29,      64,
63,      28
............................
....
      159,     178,     193,
192,     177
      160,     179,     194,
193,     178
      161,     188,     195,
184,     185
      162,     189,     196,
195,     188
      163,     182,     195,
196,     181
      164,     182,     183,
184,     195
      165,     180,     191,
194,     179
      166,     181,     190,
191,     180
      167,     181,     196,
189,     190
*ELEMENT, TYPE=S4R, ELSET=B
      168,     203,     225,
4,       2
      169,     204,     226,
225,     203
      170,     205,     227,
226,     204
      171,     206,     228,
227,     205
      172,     207,     228,
206,     202
      173,     198,     229,
224,     197
      174,     199,     230,
229,     198
      175,     200,     231,
230,     199
............................
....
      247,     270,     283,
284,     269
      248,     271,     282,
283,     270
      249,     272,     273,
282,     271
      250,     275,     276,
277,     274
      251,     275,     265,
266,     276
*ELEMENT, TYPE=S4R, ELSET=C
      252,     224,     309,
289,     197
      253,     223,     310,
309,     224
      254,     222,     311,
310,     223
      255,     221,     342,
311,     222
      256,     220,     341,
342,     221
      257,     219,     340,
341,     220
      258,     218,     312,
340,     219
      259,     217,     313,
312,     218
............................
....
      300,     335,     341,
340,     334
      301,     336,     342,
341,     335
      302,     337,     311,
342,     336
      303,     339,     309,
310,     338
      304,     337,     338,
310,     311
      305,     313,     314,
333,     312
*ELEMENT, TYPE=S4R, ELSET=D
```

```
      306,      368,      380,
367,      365
      307,      369,      381,
380,      368
      308,      370,      382,
381,      369
      309,      371,      383,
382,      370
      310,      372,      384,
383,      371
      311,      373,      385,
384,      372
      312,      374,      386,
385,      373
..............................
....
      425,      477,      480,
444,      445
      426,      478,      481,
480,      477
      427,      459,      460,
461,      479
      428,      480,      464,
443,      444
      429,      481,      463,
464,      480
      430,      481,      461,
462,      463
      431,      481,      478,
479,      461
*ELEMENT, TYPE=S4R, ELSET=E
      432,      483,      508,
345,      343
      433,      484,      509,
508,      483
      434,      485,      510,
509,      484
      435,      486,      511,
510,      485
      436,      487,      512,
511,      486
      437,      488,      513,
512,      487
..............................
....
      515,      564,      579,
554,      555
      516,      574,      573,
566,      567
      517,      575,      572,
573,      574
      518,      576,      571,
572,      575
      519,      577,      570,
571,      576
      520,      578,      569,
570,      577
      521,      579,      568,
569,      578
      522,      579,      564,
565,      568
*ELEMENT, TYPE=S4R, ELSET=F
      523,      592,      614,
590,      580
      524,      593,      615,
614,      592
      525,      594,      616,
615,      593
      526,      595,      617,
616,      594
      527,      596,      618,
617,      595
      528,      597,      619,
618,      596
      529,      598,      620,
619,      597
      530,      599,      621,
620,      598
..............................
....
      658,      713,      732,
731,      712
      659,      714,      733,
732,      713
      660,      724,      733,
714,      715
      661,      730,      729,
722,      723
      662,      726,      733,
724,      725
      663,      727,      732,
733,      726
      664,      728,      731,
732,      727
      665,      728,      729,
730,      731
*ELEMENT, TYPE=S4R, ELSET=G
      666,      735,      756,
604,      591
      667,      736,      757,
756,      735
      668,      737,      758,
757,      736
      669,      738,      759,
758,      737
      670,      739,      760,
759,      738
      671,      741,      760,
739,      734
      672,      742,      761,
760,      741
      673,      743,      762,
761,      742
```

```
        674,       744,       763,
762,       743
        675,       745,       764,
763,       744
.............................
....
        726,       794,       805,
792,       793
        727,       795,       804,
805,       794
        728,       796,       803,
804,       795
        729,       797,       802,
803,       796
        730,       798,       801,
802,       797
        731,       798,       799,
800,       801
*ELEMENT, TYPE=S4R, ELSET=H
        732,       507,       817,
816,       344
        733,       506,       818,
817,       507
        734,       505,       819,
818,       506
        735,       504,       820,
819,       505
        736,       503,       821,
820,       504
        737,       502,       822,
821,       503
        738,       755,       822,
502,       489
        739,       754,       823,
822,       755
.............................
....
        770,       839,       846,
837,       838
        771,       841,       846,
839,       840
        772,       842,       845,
846,       841
        773,       842,       843,
844,       845
*ELEMENT, TYPE=S4R, ELSET=I
       3521,      2636,      3676,
2811,      2562
       3522,      2635,      2947,
3676,      2636
       3523,      2634,      2948,
2947,      2635
       3524,      2633,      2949,
2948,      2634
       3525,      2632,      2950,
2949,      2633
       3526,      2631,      2951,
2950,      2632
.............................
....
       4361,      3642,      3662,
3663,      3641
       4362,      3643,      3661,
3662,      3642
       4363,      3674,      3623,
3664,      3675
       4364,      3674,      3663,
3622,      3623
       4365,      2812,      2811,
3676,      2947
       4366,      3365,      3366,
3097,      3098
       4367,      3646,      3645,
3677,      3647
       4368,      3508,      3486,
3678,      3487
       4369,      3657,      3554,
3555,      3658
       4370,      3672,      3661,
3643,      3644
       4371,      3660,      3616,
3617,      3618
*ELEMENT, TYPE=S4R, ELSET=J
       1631,       848,      1402,
1011,       847
       1632,       849,      1012,
1402,       848
       1633,       850,      1013,
1012,       849
       1634,       851,      1014,
1013,       850
       1635,       852,      1015,
1014,       851
       1636,       853,      1016,
1015,       852
       1637,       854,      1017,
1016,       853
       1638,       855,      1018,
1017,       854
       1639,       856,      1019,
1018,       855
.............................
....
       2100,      1353,      1361,
1362,      1352
       2101,      1354,      1360,
1361,      1353
       2102,      1354,      1355,
1359,      1360
       2103,      1010,      1011,
1402,      1012
       2104,      1310,      1311,
1217,      1218
```

```
    2105,      1092,      1211,
1403,      1091
    2106,      1205,      1206,
1404,      1358
    2107,      1359,      1355,
1405,      1356
*ELEMENT, TYPE=S4R, ELSET=K
    2108,      1508,      1500,
1506,      1530
    2109,      1509,      1508,
1530,      1531
    2110,      1510,      1509,
1531,      1532
    2111,      1511,      1510,
1532,      1533
    2112,      1512,      1511,
1533,      1534
    2113,      1507,      1512,
1534,      1535
    2114,      1513,      1507,
1535,      1536
    2115,      1513,      1536,
1537,      1538
    2116,      1515,      1513,
1538,      1539
    2117,      1516,      1515,
1539,      1540
    2118,      1517,      1516,
1540,      1541
    2119,      1518,      1517,
1541,      1542
    2120,      1519,      1518,
1542,      1543
....................
....
    3240,      2538,      2537,
2556,      2555
    3241,      2539,      2538,
2555,      2554
    3242,      2540,      2539,
2554,      2553
    3243,      2541,      2540,
2553,      2552
    3244,      2542,      2541,
2552,      2551
    3245,      2543,      2542,
2551,      2550
    3246,      2544,      2543,
2550,      2549
    3247,      2544,      2549,
2548,      2545
    3248,      2455,      2454,
2559,      2561
    3249,      2366,      2365,
2451,      2452
    3250,      2486,      2515,
2560,      2487
    3251,      2456,      2455,
2561,      2457
*ELEMENT, TYPE=S4R, ELSET=T
    3468,      2811,      2813,
2567,      2562
    3469,      2812,      2814,
2813,      2811
    3470,      2795,      2815,
2814,      2812
    3471,      2797,      2816,
2815,      2795
    3472,      2798,      2850,
2816,      2797
    3473,      2799,      2818,
2850,      2798
    3474,      2796,      2819,
2818,      2799
    3475,      2801,      2820,
2819,      2796
    3476,      2802,      2821,
2820,      2801
    3477,      2803,      2822,
2821,      2802
    3478,      2800,      2823,
2822,      2803
    3479,      2805,      2824,
2823,      2800
    3480,      2806,      2825,
2824,      2805
....................
....
    3510,      2824,      2847,
2846,      2823
    3511,      2825,      2848,
2847,      2824
    3512,      2842,      2840,
2841,      2817
    3513,      2844,      2838,
2839,      2843
    3514,      2844,      2845,
2837,      2838
    3515,      2847,      2831,
2832,      2837
    3516,      2826,      2827,
2848,      2825
    3517,      2847,      2837,
2845,      2846
    3518,      2842,      2843,
2839,      2840
    3519,      2809,      2810,
2849,      2829
    3520,      2817,      2816,
2850,      2818
*ELEMENT, TYPE=S4R, ELSET=L
    3252,      2568,      2562,
2567,      2574
```

```
    3253,    2569,    2568,
2574,    2575
    3254,    2570,    2569,
2575,    2576
    3255,    2571,    2570,
2576,    2577
    3256,    2572,    2571,
2577,    2578
    3257,    2573,    2572,
2578,    2579
    3258,    1519,    1514,
2573,    2579
    3259,    1507,    1513,
1515,    2580
    3260,    1512,    1507,
2580,    2581
 ..............................
 ....
    3280,    2582,    2581,
2596,    2597
    3281,    2583,    2582,
2597,    2598
    3282,    2584,    2583,
2598,    2599
    3283,    2589,    2585,
2584,    2599
    3284,    2587,    2586,
2595,    2600
    3285,    2596,    2588,
2587,    2600
    3286,    2597,    2596,
2600,    2601
    3287,    2598,    2597,
2601,    2602
    3288,    2599,    2598,
2602,    2603
    3289,    2590,    2589,
2599,    2603
    3290,    2592,    2591,
2590,    2603
    3291,    2593,    2592,
2603,    2602
    3292,    2594,    2593,
2602,    2601
    3293,    2594,    2601,
2600,    2595
*ELEMENT, TYPE=S4R, ELSET=M
    3294,    2605,    2637,
2636,    2562
    3295,    2606,    2638,
2637,    2605
    3296,    2607,    2639,
2638,    2606
    3297,    2608,    2640,
2639,    2607
    3298,    2609,    2641,
2640,    2608
    3299,    2611,    2641,
2609,    2604
    3300,    2622,    2642,
2620,    2610
 ..............................
 ....
    3350,    2678,    2684,
2683,    2677
    3351,    2679,    2685,
2684,    2678
    3352,    2680,    2686,
2685,    2679
    3353,    2664,    2686,
2680,    2663
    3354,    2669,    2686,
2664,    2665
    3355,    2670,    2685,
2686,    2669
    3356,    2671,    2684,
2685,    2670
    3357,    2672,    2683,
2684,    2671
    3358,    2673,    2682,
2683,    2672
    3359,    2673,    2674,
2681,    2682
*ELEMENT, TYPE=S4R, ELSET=N
    3360,    2693,    2699,
2692,    2687
    3361,    2694,    2700,
2699,    2693
    3362,    2695,    2701,
2700,    2694
    3363,    2696,    2702,
2701,    2695
    3364,    2697,    2703,
2702,    2696
    3365,    2698,    2704,
2703,    2697
    3366,    2609,    2704,
2698,    2604
    3367,    2568,    2705,
2605,    2562
    3368,    2569,    2706,
2705,    2568
    3369,    2570,    2707,
2706,    2569
    3370,    2571,    2708,
2707,    2570
 ..............................
 ....
    3400,    2723,    2726,
2727,    2722
    3401,    2723,    2724,
2725,    2726
*ELEMENT, TYPE=S4R, ELSET=O
```

```
    3402,    2730,    2745,
1529,    1406
    3403,    2731,    2746,
2745,    2730
    3404,    2732,    2747,
2746,    2731
    3405,    2733,    2748,
2747,    2732
    3406,    2734,    2749,
2748,    2733
    3407,    2735,    2749,
2734,    2729
    3408,    2736,    2750,
2749,    2735
    3409,    2737,    2751,
2750,    2736
    3410,    2738,    2752,
2751,    2737
............................
....
    3460,    2779,    2794,
2793,    2778
    3461,    2781,    2794,
2779,    2780
    3462,    2783,    2794,
2781,    2782
    3463,    2784,    2793,
2794,    2783
    3464,    2785,    2792,
2793,    2784
    3465,    2786,    2791,
2792,    2785
    3466,    2787,    2790,
2791,    2786
    3467,    2787,    2788,
2789,    2790
*ELEMENT, TYPE=S4R, ELSET=P
    4988,    1508,    1500,
1506,    3853
    4989,    1509,    1508,
3853,    3854
    4990,    1510,    1509,
3854,    3855
    4991,    1511,    1510,
3855,    3856
    4992,    1512,    1511,
3856,    3857
    4993,    3679,    1507,
1512,    3857
    4994,     808,     806,
3765,    3858
    4995,     809,     808,
3858,    3859
    4996,       1,     809,
3859,    3860
    4997,     807,       1,
3860,    3861
    4998,     811,     807,
3861,    3862
    4999,     927,     810,
 811,    3862
    5000,     926,     927,
3862,    3863
............................
....
    5510,    4199,    4198,
4211,    4210
    5511,    4200,    4199,
4210,    4209
    5512,    4201,    4200,
4209,    4208
    5513,    4202,    4201,
4208,    4207
    5514,    4203,    4202,
4207,    4206
    5515,    4203,    4206,
4205,    4204
*ELEMENT, TYPE=S4R, ELSET=Q
    4900,    3765,     806,
 740,    3852
    4901,    3764,    3765,
3852,    3851
    4902,    3763,    3764,
3851,    3850
    4903,    3762,    3763,
3850,    3849
    4904,    3761,    3762,
3849,    3848
    4905,    3760,    3761,
3848,    3847
    4906,    3759,    3760,
3847,    3846
    4907,    3758,    3759,
3846,    3845
    4908,    3757,    3758,
3845,    3844
    4909,    3756,    3757,
3844,    3843
    4910,    3755,    3756,
3843,    3842
............................
....
    4980,    3685,    3686,
3773,    3772
    4981,    3684,    3685,
3772,    3771
    4982,    3683,    3684,
3771,    3770
    4983,    3682,    3683,
3770,    3769
    4984,    3681,    3682,
3769,    3768
    4985,    3680,    3681,
3768,    3767
```

```
        4986,      3679,       3680,
3767,     3766
        4987,      3679,       3766,
1513,     1507
*ELEMENT, TYPE=T3D2, ELSET=R
        5722,      4348,       4349
        5723,      4349,       4350
        5724,      4351,       4352
        5725,      4352,       4353
        5726,      4354,       4355
        5727,      4355,       4356
        5728,      4357,       4358
        5729,      4358,       4359
        5730,      4360,       4361
............................
....
        5860,      4548,       4549
        5861,      4550,       4551
        5862,      4551,       4552
        5863,      4553,       4554
        5864,      4555,       4556
        5865,      4556,       4557
        5866,      4557,       4558
        5867,      4559,       4560
        5868,      4561,       4562
        5869,      4562,       4563
*ELEMENT, TYPE=T3D2, ELSET=S
        5664,      4288,       4289
        5665,      4289,       4290
        5666,      4290,       4291
        5667,      4291,       4292
        5668,      4292,       4293
        5669,      4293,       4294
        5670,      4294,       4295
............................
....
        5715,      4340,       4341
        5716,      4341,       4342
        5717,      4342,       4343
        5718,      4343,       4344
        5719,      4344,       4345
        5720,      4345,       4346
        5721,      4346,       4347
*ELEMENT, TYPE=B31 , ELSET=U
        6447,      2729,       2735
        6448,      2735,       2736
        6449,      2736,       2737
        6450,      2737,       2738
............................
....
        6650,       587,        588
        6651,       588,        589
        6652,       589,        590
        6653,       590,        580
**
```

```
assy4.sets.Z
**
** torso
**
*NSET, NSET=TORSO, GENERATE
     9999,     10311,          1
    10313,     10326,          1
    10342,     10557,          1
    10564,     10668,          1
    10691,     10696,          1
    10698,     10703,          1
    10705,     10710,          1
    10712,     10717,          1
    10719,     10724,          1
    10726,     10731,          1
........................
....
    26209,     26227,          1
    26229,     26247,          1
    26283,     26296,          1
    26299,     26312,          1
    26314,     26327,          1
    26329,     26342,          1
    26344,     26357,          1
**
** torso
**
*ELSET, ELSET=TORSO, GENERATE
     6654,     20857,          1
**
** r
**
*NSET, NSET=R, GENERATE
     4348,      4563,          1
**
** r
**
*ELSET, ELSET=R_1, GENERATE
     5722,      5869,          1
**
** p
**
*NSET, NSET=P, GENERATE
        1,         1,          1
      806,       811,          1
      847,       927,          1
     1500,      1512,          1
     3679,      3765,          1
     3853,      4287,          1
**
** p
**
*ELSET, ELSET=P_1, GENERATE
     4988,      5515,          1
**
** q
**
*NSET, NSET=Q, GENERATE
      740,       740,          1
      806,       806,          1
     1507,      1507,          1
     1513,      1513,          1
     3679,      3852,          1
**
** q
**
*ELSET, ELSET=Q_1, GENERATE
     4900,      4987,          1
**
** s
**
*NSET, NSET=S, GENERATE
     4288,      4347,          1
**
** s
**
*ELSET, ELSET=S_1, GENERATE
     5664,      5721,          1
**
** a
**
*NSET, NSET=A, GENERATE
        1,       196,          1
**
** a
**
*ELSET, ELSET=A_1, GENERATE
        1,       167,          1
**
** b
**
*NSET, NSET=B, GENERATE
        2,        19,          1
      197,       286,          1
**
** b
**
*ELSET, ELSET=B_1, GENERATE
      168,       251,          1
**
** c
**
*NSET, NSET=C, GENERATE
      197,       197,          1
      202,       202,          1
      207,       224,          1
      287,       342,          1
**
** c
**
*ELSET, ELSET=C_1, GENERATE
      252,       305,          1
**
```

```
** d
**
*NSET, NSET=D, GENERATE
     202,      202,      1
     290,      301,      1
     343,      481,      1
**
** d
**
*ELSET, ELSET=D_1, GENERATE
     306,      431,      1
**
** e
**
*NSET, NSET=E, GENERATE
     343,      356,      1
     482,      579,      1
**
** e
**
*ELSET, ELSET=E_1, GENERATE
     432,      522,      1
**
** f
**
*NSET, NSET=F, GENERATE
     482,      482,      1
     489,      501,      1
     580,      733,      1
**
** f
**
*ELSET, ELSET=F_1, GENERATE
     523,      665,      1
**
** g
**
*NSET, NSET=G, GENERATE
     489,      489,      1
     591,      591,      1
     604,      613,      1
     734,      805,      1
**
** g
**
*ELSET, ELSET=G_1, GENERATE
     666,      731,      1
**
** h
**
*NSET, NSET=H, GENERATE
       1,        1,      1
     344,      344,      1
     489,      489,      1
     502,      507,      1
     740,      740,      1
     751,      755,      1
     806,      846,      1
**
** h
**
*ELSET, ELSET=H_1, GENERATE
     732,      773,      1
**
** i
**
*NSET, NSET=I, GENERATE
     197,      197,      1
     287,      289,      1
     293,      293,      1
     302,      308,      1
     344,      344,      1
     357,      364,      1
     810,      810,      1
     812,      816,      1
     847,      927,      1
    2562,     2562,      1
    2610,     2610,      1
    2621,     2636,      1
    2795,     2812,      1
    2851,     3678,      1
**
** i
**
*ELSET, ELSET=I_1, GENERATE
    3521,     4371,      1
**
** j
**
*NSET, NSET=J, GENERATE
     807,      807,      1
     810,      811,      1
     847,     1405,      1
**
** j
**
*ELSET, ELSET=J_1, GENERATE
    1631,     2107,      1
**
** k
**
*NSET, NSET=K, GENERATE
       1,        1,      1
     734,      734,      1
     740,      750,      1
     806,      809,      1
     847,      847,      1
     928,     1011,      1
    1406,     2561,      1
**
** k
**
*ELSET, ELSET=K_1, GENERATE
    2108,     3251,      1
```

```
**
** l
**
*NSET, NSET=L, GENERATE
    1500,    1500,    1
    1507,    1519,    1
    2562,    2603,    1
**
** l
**
*ELSET, ELSET=L_1, GENERATE
    3252,    3293,    1
**
** m
**
*NSET, NSET=M, GENERATE
    2562,    2562,    1
    2604,    2686,    1
**
** m
**
*ELSET, ELSET=M_1, GENERATE
    3294,    3359,    1
**
** n
**
*NSET, NSET=N, GENERATE
    1514,    1514,    1
    2562,    2562,    1
    2568,    2573,    1
    2604,    2609,    1
    2687,    2728,    1
**
** n
**
*ELSET, ELSET=N_1, GENERATE
    3360,    3401,    1
**
** o
**
*NSET, NSET=O, GENERATE
    1406,    1406,    1
    1514,    1514,    1
    1520,    1529,    1
    2687,    2692,    1
    2729,    2794,    1
**
** o
**
*ELSET, ELSET=O_1, GENERATE
    3402,    3467,    1
**
** t
**
*NSET, NSET=T, GENERATE
     847,     847,    1
    1500,    1506,    1
    2562,    2567,    1
    2795,    2850,    1
**
** t
**
*ELSET, ELSET=T_1, GENERATE
    3468,    3520,    1
**
** waistnodes
**
*NSET, NSET=WAISTNOD
    4958,    4961,    4964,
   4967,    4970,    4972,
   4974,    4979,
    4982,    4983,    4988,
    4991,    4994,    4997,
    5000,    5003,
    5006,    5009,    5012,
    5015,    5018,    5021,
    5024,    5027,
    5030,    5033,    5036,
    5039,    5042,    5073,
   5076,    5123,
    5126,    5153,    5155,
    5159,    5162,    5163,
    5168,    5171,
    5172,    5177,    5180,
    5183,    5186,    5189,
    5192,    5195,
    5210,    5213,    5270,
   5273,    5276
**
** u
**
*NSET, NSET=U, GENERATE
       2,       3,    1
      20,      55,    1
     197,     206,    1
     343,     343,    1
     365,     379,    1
     482,     488,    1
     580,     590,    1
    2604,    2604,    1
    2610,    2620,    1
    2687,    2687,    1
    2693,    2698,    1
    2729,    2729,    1
    2735,    2744,    1
    2851,    2946,    1
**
** u
**
*ELSET, ELSET=U_1, GENERATE
    6447,    6653,    1
**
** Pull-RT
**
```

```
*ELSET, ELSET=PULL-RT,
GENERATE
     6588,     6604,          1
**
** Pull-FT
**
*ELSET, ELSET=PULL-FT,
GENERATE
     6478,     6504,          1
**
** Pull-FE
**
*ELSET, ELSET=PULL-FE,
GENERATE
     6447,     6477,          1
**
*ELSET, ELSET=PRESSURE,
GENERATE
        1,      773,          1
     1631,     4371,          1
**
```

```
assy4.surfaces.Z
**
** flap
**
*SURFACE DEFINITION, NAME=M2
     4900, SPOS
     4901, SPOS
     4902, SPOS
     4903, SPOS
     4904, SPOS
     4905, SPOS
     4906, SPOS
     4907, SPOS
     4908, SPOS
     4909, SPOS
     4910, SPOS
.........................
....
     4980, SPOS
     4981, SPOS
     4982, SPOS
     4983, SPOS
     4984, SPOS
     4985, SPOS
     4986, SPOS
     4987, SPOS
*CONTACT NODE SET, NAME=S2
     4288,    4289,    4290,
4291,    4292,    4293,
4294,    4295,
     4296,    4297,    4298,
4299,    4300,    4301,
4302,    4303,
     4304,    4305,    4306,
4307,    4308,    4309,
4310,    4311,
     4312,    4313,    4314,
4315,    4316,    4317,
4318,    4319,
     4320,    4321,    4322,
4323,    4324,    4325,
4326,    4327,
     4328,    4329,    4330,
4331,    4332,    4333,
4334,    4335,
     4336,    4337,    4338,
4339,    4340,    4341,
4342,    4343,
     4344,    4345,    4346,
4347
**
**   TIED Contact between
the flap elastic and the
flap
**
*CONTACT PAIR,
INTERACTION=I2, ADJUST=1.,
TIED
        S2,        M2
*SURFACE INTERACTION,
NAME=I2
**
** leg
**
*SURFACE DEFINITION, NAME=M3
    1634, SPOS
    1635, SPOS
    1636, SPOS
    1637, SPOS
    1638, SPOS
    1639, SPOS
    1640, SPOS
.........................
....
    1950, SPOS
    1951, SPOS
    1952, SPOS
    1953, SPOS
    1954, SPOS
    1955, SPOS
    1956, SPOS
    1957, SPOS
    3595, SPOS
    3596, SPOS
    3597, SPOS
    3598, SPOS
    3599, SPOS
    3600, SPOS
.........................
....
    4360, SPOS
    4361, SPOS
    4362, SPOS
    4363, SPOS
    4364, SPOS
    4367, SPOS
    4368, SPOS
    4370, SPOS
    4371, SPOS
*CONTACT NODE SET, NAME=S3
     4348,    4349,    4350,
4351,    4352,    4353,
4354,    4355,
     4356,    4357,    4358,
4359,    4360,    4361,
4362,    4363,
     4364,    4365,    4366,
4367,    4368,    4369,
4370,    4371,
     4372,    4373,    4374,
4375,    4376,    4377,
4378,    4379,
```

```
    4380,    4381,    4382,
4383,    4384,    4385,
4386,    4387,
    4388,    4389,    4390,
4391,    4392,    4393,
4394,    4395,
    4396,    4397,    4398,
4399,    4400,    4401,
4402,    4403,
    4404,    4405,    4406,
4407,    4408,    4409,
4410,    4411,
    4412,    4413,    4414,
4415,    4416,    4417,
4418,    4419,
    4420,    4421,    4422,
4423,    4424,    4425,
4426,    4427,
    4428,    4429,    4430,
4431,    4432,    4433,
4434,    4435,
    4436,    4437,    4438,
4439,    4440,    4441,
4442,    4443,
    4444,    4445,    4446,
4447,    4448,    4449,
4450,    4451,
    4452,    4453,    4454,
4455,    4456,    4457,
4458,    4459,
    4460,    4461,    4462,
4463,    4464,    4465,
4466,    4467,
    4468,    4469,    4470,
4471,    4472,    4473,
4474,    4475,
    4476,    4477,    4478,
4479,    4480,    4481,
4482,    4483,
    4484,    4485,    4486,
4487,    4488,    4489,
4490,    4491,
    4492,    4493,    4494,
4495,    4496,    4497,
4498,    4499,
    4500,    4501,    4502,
4503,    4504,    4505,
4506,    4507,
    4508,    4509,    4510,
4511,    4512,    4513,
4514,    4515,
    4516,    4517,    4518,
4519,    4520,    4521,
4522,    4523,
    4524,    4525,    4526,
4527,    4528,    4529,
4530,    4531,
    4532,    4533,    4534,
4535,    4536,    4537,
4538,    4539,
    4540,    4541,    4542,
4543,    4544,    4545,
4546,    4547,
    4548,    4549,    4550,
4551,    4552,    4553,
4554,    4555,
    4556,    4557,    4558,
4559,    4560,    4561,
4562,    4563
**
**   TIED Contact between
the leg elastic and the
cover
**
*CONTACT PAIR,
INTERACTION=I3, ADJUST=1.,
TIED
     S3,    M3
*SURFACE INTERACTION,
NAME=I3
**
*RIGID BODY, ELSET=TORSO,
REF NODE=9999
**
*SURFACE DEFINITION,
NAME=torso
TORSO, SPOS
*SURFACE DEFINITION, NAME=S4
     1, SPOS
     2, SPOS
     3, SPOS
     4, SPOS
     5, SPOS
     6, SPOS
     7, SPOS
     8, SPOS
     9, SPOS
    10, SPOS
........................
....
    4370, SPOS
    4371, SPOS
**
**   Contact between the
diaper and the torso
**
*CONTACT PAIR,
INTERACTION=I4
     S4,    torso
**
*SURFACE DEFINITION, NAME=S5
    4900, SPOS
........................
....
```

```
       5510, SPOS                    **
       5511, SPOS
       5512, SPOS
       5513, SPOS
       5514, SPOS
       5515, SPOS
**
**    Contact between the
diaper and the torso
**
*CONTACT PAIR,
INTERACTION=I5
      S5,  Torso
**
** fasten
**
*SURFACE DEFINITION,
NAME=waistband
     2108, sneg
     2109, sneg
     2110, sneg
..........................
....
     4370, sneg
     4371, sneg
*SURFACE DEFINITION,
NAME=velcro
        1, SPOS
        2, SPOS
        3, SPOS
        4, SPOS
        5, SPOS
        6, SPOS
        7, SPOS
        8, SPOS
        9, SPOS
       10, SPOS
..........................
....
      160, SPOS
      161, SPOS
      162, SPOS
      163, SPOS
      164, SPOS
      165, SPOS
      166, SPOS
      167, SPOS
**
**    Contact to simulate
fastening of the velcro
wasit tab
**
*CONTACT PAIR,
INTERACTION=I10, Mechanical
Constraint=Penalty,
Weight=1.0
      velcro, waistband
```

```
assy3.materials
**
**      Material Units
**      Density
        Tonne/mm**3
**      Modulus        MPa
**      Stress         MPa
**
****************************
****************************
************************
**
*MATERIAL, NAME=PAD
*Damping,Alpha=100
*DENSITY
    5.E-10,
*ELASTIC, TYPE=ISO
        1.0,           0.1
****************************
****************************
************************
**
*MATERIAL, NAME=COVER
*Damping,Alpha=100
*DENSITY
    9.32E-10,
*ELASTIC, TYPE=ISO
        7.549,         0.3
****************************
****************************
************************
**
*MATERIAL, NAME=FLAP
*Damping,Alpha=100
*DENSITY
    1.23E-9,
*ELASTIC, TYPE=ISO
        29.9,          0.3
****************************
****************************
************************
**
*MATERIAL, NAME=SPANDEX
*Damping,Alpha=100
*Expansion
1.0
*DENSITY
    1.1E-9,
*Hyperelastic, Neo Hooke, Test Data Input
*Uniaxial Test Data
**   Flap and leg elastic,
**   Stress (MPa),Strain
0.028328533,0.0035
0.056657067,0.0065
0.056657067,0.01
0.056657067,0.013
0.056657067,0.0165
0.0849856,0.0195
0.113314133,0.02300005
0.113314133,0.0265
0.113314133,0.0295
0.141642667,0.033
0.141642667,0.036
0.169974075,0.0395
0.169974075,0.043
0.169974075,0.04600005
0.198302608,0.0495
0.198302608,0.0525
0.198302608,0.056
0.226631141,0.0595
0.226631141,0.0625
0.226631141,0.0655
0.254959675,0.06900005
0.254959675,0.072
0.254959675,0.075
0.283288208,0.07850005
0.283288208,0.082
0.283288208,0.085
0.311616741,0.0885
0.339945275,0.0915
0.311616741,0.095
0.339945275,0.0985
0.339945275,0.10150005
0.339945275,0.105
0.368273808,0.10850005
0.368273808,0.1115
0.368273808,0.1145
0.396602341,0.118
0.396602341,0.1215
0.396602341,0.12450005
0.396602341,0.128
0.424930875,0.131
0.424930875,0.1345
0.45326237,0.1375
0.45326237,0.14100005
0.45326237,0.1445
0.45326237,0.14750005
0.481590903,0.151
0.481590903,0.154
0.481590903,0.1575
0.509919436,0.1605
0.481590903,0.16400005
0.509919436,0.1675
0.509919436,0.17050005
0.53824797,0.174
0.53824797,0.177
0.53824797,0.1805
0.566576503,0.1835
0.566576503,0.18700005
0.566576503,0.19
0.566576503,0.19350005
0.566576503,0.197
0.594905036,0.2
```

```
 1  0.594905036,0.20350005
 2  0.594905036,0.207
 3  0.594905036,0.21000005
 4  0.62323357,0.2135
 5  0.62323357,0.2165
 6  0.62323357,0.22
 7  0.62323357,0.22350005
 8  0.651562103,0.22650005
 9  0.651562103,0.23
10  0.651562103,0.23300005
11  0.651562103,0.236
12  0.679890636,0.2395
13  0.679890636,0.24250005
14  0.679890636,0.246
15  0.679890636,0.24900005
16  0.70821917,0.2525
17  0.70821917,0.256
18  0.736547703,0.25950005
19  0.70821917,0.2625
20  0.736547703,0.266
21  0.736547703,0.269
22  0.736547703,0.2725
23  0.736547703,0.2755
24  0.736547703,0.279
25  0.764879111,0.28200005
26  0.764879111,0.2855
27  0.764879111,0.28850005
28  0.793207644,0.292
29  0.793207644,0.29500005
30  0.764879111,0.2985
31  0.793207644,0.302
32  0.793207644,0.30500005
33  0.793207644,0.3085
34  0.821536178,0.31150005
35  0.821536178,0.315
36  0.821536178,0.31800005
37  0.821536178,0.32150005
38  0.849864711,0.325
39  0.849864711,0.32800005
40  0.849864711,0.3315
41  0.849864711,0.335
42  0.849864711,0.338
43  0.878193244,0.3415
44  0.849864711,0.34450005
45  0.878193244,0.348
46  0.878193244,0.35150005
47  0.878193244,0.3545
48  0.878193244,0.358
49  0.906521778,0.361
50  0.906521778,0.3645
51  0.906521778,0.36750005
52  0.906521778,0.371
53  0.906521778,0.3745
54  0.934850311,0.3775
55  ....................
56  1.727586113,2.9766045
57  1.737161501,2.992923
 58  1.747294761,3.008927
 59  1.756684191,3.025246
 60  1.766631494,3.0415845
 61  1.778902896,3.0619295
 62  1.789222114,3.078268
 63  1.798797502,3.094616
 64  1.809209646,3.110935
 65  1.819249769,3.1272835
 66  1.831056436,3.147589
 67  **************************
 68  **************************
 69  **********************
 70  **
 71  ** Velcro
 72  **
 73  *MATERIAL, NAME=VELCRO
 74  *Damping,Alpha=100
 75  *DENSITY
 76          1.23E-9,
 77  *ELASTIC, TYPE=ISO
 78            29.9,            0.3
 79  **************************
 80  **************************
 81  **********************
 82  **************************
 83  **************************
 84  **********************
 85  **
 86  *Orientation, Name=Global
 87  1,0,0, 0,1,0
 88  3,0
 89  **
 90  **************************
 91  **************************
 92  **********************
 93  **************************
 94  **************************
 95  **********************
 96  **
 97  ** A
 98  **
 99  *SHELL SECTION, ELSET=A,
100  MATERIAL=VELCRO, Controls=hg
101            1.6,            5
102  **
103  ** B
104  **
105  *SHELL SECTION, ELSET=B,
106  MATERIAL=WAIST, Controls=hg
107            0.6,            5
108  **
109  ** C
110  **
111  *SHELL SECTION, ELSET=C,
112  Composite,
113  Orientation=Global,
114  Controls=hg
```

```
  1  0.15, 3, Cover
  2  0.60, 3, Waist
  3  **
  4  ** D
  5  **
  6  *SHELL SECTION, ELSET=D,
  7  Composite,
  8  Orientation=Global,
  9  Controls=hg
 10  0.15, 3, Cover
 11  **
 12  ** E
 13  **
 14  *SHELL SECTION, ELSET=E,
 15  Composite,
 16  Orientation=Global,
 17  Controls=hg
 18  0.15, 3, Cover
 19  0.30, 3, Flap
 20  **
 21  ** F
 22  **
 23  *SHELL SECTION, ELSET=F,
 24  Composite,
 25  Orientation=Global,
 26  Controls=hg
 27  0.15, 3, Cover
 28  **
 29  ** G
 30  **
 31  *SHELL SECTION, ELSET=G,
 32  Composite,
 33  Orientation=Global,
 34  Controls=hg
 35  0.15, 3, Cover
 36  **
 37  ** H
 38  **
 39  *SHELL SECTION, ELSET=H,
 40  Composite,
 41  Orientation=Global,
 42  Controls=hg
 43  0.15, 3, Cover
 44  0.30, 3, Flap
 45  **
 46  ** I
 47  **
 48  *SHELL SECTION, ELSET=I,
 49  Composite,
 50  Orientation=Global,
 51  Controls=hg
 52  0.15, 3, Cover
 53  **
 54  ** J
 55  **
 56  *SHELL SECTION, ELSET=J,
 57  Composite,
 58  Orientation=Global,
 59  Controls=hg
 60  0.15, 3, Cover
 61  **
 62  ** K
 63  **
 64  *SHELL SECTION, ELSET=K,
 65  Composite,
 66  Orientation=Global,
 67  Controls=hg
 68  0.15, 3, Cover
 69  5.00, 3, Pad
 70  **
 71  ** L
 72  **
 73  *SHELL SECTION, ELSET=L,
 74  Composite,
 75  Orientation=Global,
 76  Controls=hg
 77  0.15, 3, Cover
 78  5.00, 3, Pad
 79  0.30, 3, flap
 80  **
 81  ** M
 82  **
 83  *SHELL SECTION, ELSET=M,
 84  Composite,
 85  Orientation=Global,
 86  Controls=hg
 87                              0.15, 3, C
 88  **
 89  ** N
 90  **
 91  *SHELL SECTION, ELSET=N,
 92  Composite,
 93  Orientation=Global,
 94  Controls=hg
 95                              0.15, 3, C
 96                              0.30, 3, 1
 97  **
 98  ** O
 99  **
100  *SHELL SECTION, ELSET=O,
101  Composite,
102  Orientation=Global,
103  Controls=hg
104                              0.15, 3, C
105  **
106  ** P
107  **
108  *SHELL SECTION, ELSET=P,
109  Composite,
110  Orientation=Global,
111  Controls=hg
112                              0.30, 3, 1
113  **
114  ** Q
```

```
**
*SHELL SECTION, ELSET=Q,
Composite,
Orientation=Global,
Controls=hg
                                        0.30, 3, flap
**
** R
**
*SOLID SECTION, ELSET=R,
MATERIAL=SPANDEX
      0.01767,
**
** S
**
*SOLID SECTION, ELSET=S,
MATERIAL=SPANDEX
      0.01767,
**
** T
**
*SHELL SECTION, ELSET=T,
Composite,
Orientation=Global,
Controls=hg
                                        0.15, 3, Cover
                                         5.00, 3, Pad
**
** U
**
*BEAM SECTION, ELSET=U,
SECTION=CIRC,
MATERIAL=Cover, POISSON=0.
        0.1,
               0.,              0.,
1.
**

```

```
 1  assy3.boundary
 2  **
 3  ** Torso
 4  **
 5  *BOUNDARY, OP=NEW
 6        9999, 1,6,          0.
 7  **
 8  ** Sym
 9  **
10  *BOUNDARY, OP=NEW
11       591, 2,,             0.
12       592, 2,,             0.
13       593, 2,,             0.
14       594, 2,,             0.
15       595, 2,,             0.
16       596, 2,,             0.
17       597, 2,,             0.
18       598, 2,,             0.
19       599, 2,,             0.
20       600, 2,,             0.
21       601, 2,,             0.
22       602, 2,,             0.
23       603, 2,,             0.
24       734, 2,,             0.
25       735, 2,,             0.
26       736, 2,,             0.
27       737, 2,,             0.
28       738, 2,,             0.
29       739, 2,,             0.
30      1406, 2,,             0.
31      1407, 2,,             0.
32      1408, 2,,             0.
33      1409, 2,,             0.
34      1410, 2,,             0.
35      1411, 2,,             0.
36      1412, 2,,             0.
37      1413, 2,,             0.
38      1414, 2,,             0.
39      1415, 2,,             0.
40      1416, 2,,             0.
41      1417, 2,,             0.
42      1418, 2,,             0.
43      1419, 2,,             0.
44      1420, 2,,             0.
45      1421, 2,,             0.
46      1422, 2,,             0.
47      1423, 2,,             0.
48      1424, 2,,             0.
49      1425, 2,,             0.
50      1426, 2,,             0.
51      1427, 2,,             0.
52      1428, 2,,             0.
53      1429, 2,,             0.
54      1430, 2,,             0.
55      1431, 2,,             0.
56      1432, 2,,             0.
57      1433, 2,,             0.
58      1434, 2,,             0.
59      1435, 2,,             0.
60      1436, 2,,             0.
61      1437, 2,,             0.
62      1438, 2,,             0.
63      1439, 2,,             0.
64      1440, 2,,             0.
65      1441, 2,,             0.
66      1442, 2,,             0.
67      1443, 2,,             0.
68      1444, 2,,             0.
69      1445, 2,,             0.
70      1446, 2,,             0.
71      1447, 2,,             0.
72      1448, 2,,             0.
73      1449, 2,,             0.
74      1450, 2,,             0.
75      1451, 2,,             0.
76      1452, 2,,             0.
77      1453, 2,,             0.
78      1454, 2,,             0.
79      1455, 2,,             0.
80      1456, 2,,             0.
81      1457, 2,,             0.
82      1458, 2,,             0.
83      1459, 2,,             0.
84      1460, 2,,             0.
85      1461, 2,,             0.
86      1462, 2,,             0.
87      1463, 2,,             0.
88      1464, 2,,             0.
89      1465, 2,,             0.
90      1466, 2,,             0.
91      1467, 2,,             0.
92      1468, 2,,             0.
93      1469, 2,,             0.
94      1470, 2,,             0.
95      1471, 2,,             0.
96      1472, 2,,             0.
97      1473, 2,,             0.
98      1474, 2,,             0.
99      1475, 2,,             0.
100     1476, 2,,             0.
101     1477, 2,,             0.
102     1478, 2,,             0.
103     1479, 2,,             0.
104     1480, 2,,             0.
105     1481, 2,,             0.
106     1482, 2,,             0.
107     1483, 2,,             0.
108     1484, 2,,             0.
109     1485, 2,,             0.
110     1486, 2,,             0.
111     1487, 2,,             0.
112     1488, 2,,             0.
113     1489, 2,,             0.
114     1490, 2,,             0.
```

```
  1       1491, 2,,         0.    58    1426, 4,,      0.
  2       1492, 2,,         0.    59    1427, 4,,      0.
  3       1493, 2,,         0.    60    1428, 4,,      0.
  4       1494, 2,,         0.    61    1429, 4,,      0.
  5       1495, 2,,         0.    62    1430, 4,,      0.
  6       1496, 2,,         0.    63    1431, 4,,      0.
  7       1497, 2,,         0.    64    1432, 4,,      0.
  8       1498, 2,,         0.    65    1433, 4,,      0.
  9       1499, 2,,         0.    66    1434, 4,,      0.
 10       2729, 2,,         0.    67    1435, 4,,      0.
 11       2730, 2,,         0.    68    1436, 4,,      0.
 12       2731, 2,,         0.    69    1437, 4,,      0.
 13       2732, 2,,         0.    70    1438, 4,,      0.
 14       2733, 2,,         0.    71    1439, 4,,      0.
 15       2734, 2,,         0.    72    1440, 4,,      0.
 16  **                           73    1441, 4,,      0.
 17  *BOUNDARY, OP=NEW             74    1442, 4,,      0.
 18        580, 4,,         0.    75    1443, 4,,      0.
 19        591, 4,,         0.    76    1444, 4,,      0.
 20        592, 4,,         0.    77    1445, 4,,      0.
 21        593, 4,,         0.    78    1446, 4,,      0.
 22        594, 4,,         0.    79    1447, 4,,      0.
 23        595, 4,,         0.    80    1448, 4,,      0.
 24        596, 4,,         0.    81    1449, 4,,      0.
 25        597, 4,,         0.    82.   1450, 4,,      0.
 26        598, 4,,         0.    83    1451, 4,,      0.
 27        599, 4,,         0.    84    1452, 4,,      0.
 28        600, 4,,         0.    85    1453, 4,,      0.
 29        601, 4,,         0.    86    1454, 4,,      0.
 30        602, 4,,         0.    87    1455, 4,,      0.
 31        603, 4,,         0.    88    1456, 4,,      0.
 32        734, 4,,         0.    89    1457, 4,,      0.
 33        735, 4,,         0.    90    1458, 4,,      0.
 34        736, 4,,         0.    91    1459, 4,,      0.
 35        737, 4,,         0.    92    1460, 4,,      0.
 36        738, 4,,         0.    93    1461, 4,,      0.
 37        739, 4,,         0.    94    1462, 4,,      0.
 38       1406, 4,,         0.    95    1463, 4,,      0.
 39       1407, 4,,         0.    96    1464, 4,,      0.
 40       1408, 4,,         0.    97    1465, 4,,      0.
 41       1409, 4,,         0.    98    1466, 4,,      0.
 42       1410, 4,,         0.    99    1467, 4,,      0.
 43       1411, 4,,         0.   100    1468, 4,,      0.
 44       1412, 4,,         0.   101    1469, 4,,      0.
 45       1413, 4,,         0.   102    1470, 4,,      0.
 46       1414, 4,,         0.   103    1471, 4,,      0.
 47       1415, 4,,         0.   104    1472, 4,,      0.
 48       1416, 4,,         0.   105    1473, 4,,      0.
 49       1417, 4,,         0.   106    1474, 4,,      0.
 50       1418, 4,,         0.   107    1475, 4,,      0.
 51       1419, 4,,         0.   108    1476, 4,,      0.
 52       1420, 4,,         0.   109    1477, 4,,      0.
 53       1421, 4,,         0.   110    1478, 4,,      0.
 54       1422, 4,,         0.   111    1479, 4,,      0.
 55       1423, 4,,         0.   112    1480, 4,,      0.
 56       1424, 4,,         0.   113    1481, 4,,      0.
 57       1425, 4,,         0.   114    1482, 4,,      0.
```

```
 1      1483, 4,,              0.          58      588, 1,,              0.
 2      1484, 4,,              0.          59      589, 1,,              0.
 3      1485, 4,,              0.          60      590, 1,,              0.
 4      1486, 4,,              0.          61 **
 5      1487, 4,,              0.          62
 6      1488, 4,,              0.
 7      1489, 4,,              0.
 8      1490, 4,,              0.
 9      1491, 4,,              0.
10      1492, 4,,              0.
11      1493, 4,,              0.
12      1494, 4,,              0.
13      1495, 4,,              0.
14      1496, 4,,              0.
15      1497, 4,,              0.
16      1498, 4,,              0.
17      1499, 4,,              0.
18      2729, 4,,              0.
19      2730, 4,,              0.
20      2731, 4,,              0.
21      2732, 4,,              0.
22      2733, 4,,              0.
23      2734, 4,,              0.
24 **
25 ** HoldRear
26 **
27 *BOUNDARY, OP=NEW
28       343, 1,,              0.
29       365, 1,,              0.
30       368, 1,,              0.
31       369, 1,,              0.
32       370, 1,,              0.
33       371, 1,,              0.
34       372, 1,,              0.
35       373, 1,,              0.
36       374, 1,,              0.
37       375, 1,,              0.
38       376, 1,,              0.
39       377, 1,,              0.
40       378, 1,,              0.
41       379, 1,,              0.
42       482, 1,,              0.
43       483, 1,,              0.
44       484, 1,,              0.
45       485, 1,,              0.
46       486, 1,,              0.
47       487, 1,,              0.
48       488, 1,,              0.
49       580, 1,,              0.
50       580, 2,,              0.
51       581, 1,,              0.
52       582, 1,,              0.
53       583, 1,,              0.
54       584, 1,,              0.
55       585, 1,,              0.
56       586, 1,,              0.
57       587, 1,,              0.
```

```
 1  assy3.pressure
 2  **
 3  **     Pressure added to
 4  balloon out the diaper
 5  slightly
 6  **
 7  *DLOAD, Amp=pressure
 8  PRESSURE, P,           -1.
 9  **
10  **     Pressure applied to the
11  velcro to ensure a secure
12  fastening.
13  **
14  *DsLOAD, Amp=velcro
15  velcro, P,              1.
16  **
17
18  END FILES
19
```

```
 1
 2              Assy4.inp.Z
 3  *HEADING
 4  **
 5  **    UNITS
 6  **    Length = mm
 7  **    Time   = Sec
 8  **    Mass   = Tonne
 9  **    Force  = N
10  **    Stress = MPa
11  **
12  *Include,input=/u/u7/dbarnes
13  /projects/kcc/assy4/files/as
14  sy4.geom
15  *Include,input=/u/u7/dbarnes
16  /projects/kcc/assy4/files/as
17  sy4.sets
18  *Include,input=/u/u7/dbarnes
19  /projects/kcc/assy3/files/as
20  sy3.materials
21  *Include,input=/u/u7/dbarnes
22  /projects/kcc/assy3/files/as
23  sy3.boundary
24  **
25  *Section Controls, Name=hg,
26  Hourglass=enhanced, Second
27  order Accuracy=yes
28  **
29  *STEP
30  *dynamic,Explicit
31  ,1.2
32  **
33  *Variable mass
34  scaling,type=below
35  min,dt=3e-5,number
36  interval=2
37  **
38  *Amplitude,name=Pull-FE-
39  X,time=total time
40  0.0,-0.033,      0.4,-0.033,
41        1.0,-0.033,    1.05,0.0
42  *Amplitude,name=Pull-FE-
43  Z,time=total time
44  0.0, 0.05,       0.2, 0.0,
45        1.0, 0.0,      1.05,0.0
46  **
47  *Amplitude,name=Pull-FT-
48  Y,time=total time
49  0.0, 0.10,       0.6, 0.0,
50        1.0,-0.01,     1.05,0.0
51  *Amplitude,name=Pull-FT-
52  Z,time=total time
53  0.0, 0.05,       0.8,-0.0775,
54        1.0,-0.0775,   1.05,0.0
55  **
56  *Amplitude,name=Pull-RT-
57  Y,time=total time
58  0.0, 0.114,      0.8, 0.0,
59        1.0,-0.1,      1.05,0.0
60  *Amplitude,name=Pull-RT-
61  Z,time=total time
62  0.0, 0.00,       0.6, 0.0,
63        0.8,0.114,     1.0,
64  0.114,
65  1.05,0.0
66  **
67  *Amplitude,name=velcro,time=
68  total time
69  0.0,0.0,    0.8,0.0,    1.0,-
70  0.003759, 1.05,0.0
71  **
72  *Amplitude,name=pressure,tim
73  e=total time
74  0.0,1.0e-5, 1,1.0e-5,
75        1.05,0.0
76  **
77  *Amplitude,name=temps,time=t
78  otal time
79  0.0,0.0, 0.1,-0.5, 1.2,-0.5
80  **
81  *Temperature,amp=temps
82  R,1.0
83  S,1.0
84  **
85  *DLOAD,amp=Pull-FE-X
86  Pull-FE,px,1.0
87  *DLOAD,amp=Pull-FE-Z
88  Pull-FE,pz,1.0
89  **
90  *DLOAD,amp=Pull-FT-Y
91  Pull-FT,py,1.0
92  *DLOAD,amp=Pull-FT-Z
93  Pull-FT,pz,1.0
94  **
95  *DLOAD,amp=Pull-RT-Y
96  Pull-RT,py,1.0
97  *DLOAD,amp=Pull-RT-Z
98  Pull-RT,pz,1.0
99  **
100 *Include,input=/u/u7/dbarnes
101 /projects/kcc/assy4/files/as
102 sy4.surfaces
103 *Include,input=/u/u7/dbarnes
104 /projects/kcc/assy3/files/as
105 sy3.pressure
106 **
107 *SURFACE INTERACTION,
108 NAME=I4
109 *Surface Behavior, Pressure-
110 Overclosure=Exponential
111 3.0,0.01
112 *FRICTION
```

```
0.2
**
*SURFACE INTERACTION,
NAME=I5
*Surface Behavior, Pressure-Overclosure=Exponential
3.0,0.01
*FRICTION
0.2
**
*SURFACE INTERACTION,
NAME=I10
*FRICTION, ROUGH
*SURFACE BEHAVIOR, NO SEPARATION
**
**
*output,history,time interval=0.01
*Energy Output
Allae,Allse,Allke
**
*output,field,number interval=40
*Contact Output
CStress
***Element output,variables=preselect
*Node output
U,
**
*END STEP
```

DIAPER 3RD EMBODIMENT
         FILES
LeftLegForward.amp
*Amplitude,
Name=LeftLegForward
0.0,0.0,  0.1,+0.0,
1.2,+0.0,  1.6,0.0,
2., 0.0233427, 2.00092,
0.0233389, 2.00182,
0.0200001, 2.00272,
0.0183288
2.00361, 0.0183249, 2.00451,
0.0166536, 2.00541,
0.0149823, 2.00631, 0.013311
2.0072, 0.0133071, 2.0081,
0.0116358, 2.009,
0.00996446, 2.0099,
0.00829314
2.0108, 0.00828929, 2.0117,
0.00661797, 2.01259,
0.00661413, 2.01349,
0.0049428
2.01439, 0.00327148,
2.01528, 0.00160016,
2.01618, 0.00159631,
2.01708, -7.50075e-05
........................
....
2.75219, 0.075146, 2.75309,
0.0734747, 2.75399,
0.0718034, 2.75489,
0.0684646
2.75578, 0.0667932, 2.75668,
0.0651219, 2.75758,
0.0617831, 2.75848,
0.0601118
2.75938, 0.0584405, 2.76028,
0.0584366, 2.76117,
0.0567653, 2.76207,
0.0534265
2.76297, 0.0517552, 2.76387,
0.0484164, 2.76477,
0.0484126, 2.76566,
0.0450738
2.76656, 0.0434024, 2.76746,
0.0417311, 2.76836,
0.0400598, 2.76925,
0.0383885
2.77015, 0.0367171, 2.77105,
0.0350458, 2.77195,
0.0333745, 2.77285,
0.0333707
2.77374, 0.0316993, 2.77464,
0.030028, 2.77554,
0.0283567, 2.77644,
0.0266854
2.77733, 0.0250141, 2.78,
0.0233427

```
 1  LeftLegSide.amp
 2  *Amplitude, Name=LeftLegSide
 3  0.0,0.0,  0.10,-1.0, 1.2,-
 4  1.0,  1.6,0.0,
 5  2., 0.0386557, 2.0017,
 6  0.0386459, 2.00262,
 7  0.0386362, 2.00352,
 8  0.0386265
 9  2.00443, 0.0386167, 2.00534,
10  0.0369262, 2.00624,
11  0.0369164, 2.00715,
12  0.0369067
13  2.00805, 0.036897, 2.00896,
14  0.0352064, 2.00987,
15  0.0335159, 2.01077,
16  0.0335061
17
```

```
 1  phase7.bcs
 2  **
 3  ** TorsoFix
 4  **
 5  *BOUNDARY, OP=NEW
 6  TORSOFIX, 1,,            0.
 7  TORSOFIX, 2,,            0.
 8  TORSOFIX, 3,,            0.
 9  TORSOFIX, 4,,            0.
10  TORSOFIX, 5,,            0.
11  TORSOFIX, 6,,            0.
12  **
13  ** DiaperHoldRear
14  **
15  *BOUNDARY, OP=NEW
16  DIAPERHO, 1,,            0.
17  **
18  ** TorsoLeftLeg
19  **
20  *BOUNDARY, OP=NEW
21  LegLeft, 1,4,            0.0
22  *BOUNDARY, OP=NEW,
23  AMP=LeftLegForward
24  LegLeft, 5,,            -0.8
25  *BOUNDARY, OP=NEW,
26  AMP=LeftLegSide
27  LegLeft, 6,,            -0.8
28  **
29  ** TorsoRightLeg
30  **
31  *BOUNDARY, OP=NEW
32  LegRight, 1,4,           0.0
33  *BOUNDARY, OP=NEW,
34  AMP=RightLegForward
35  LegRight, 5,,           -0.8
36  *BOUNDARY, OP=NEW,
37  AMP=RightLegSide
38  LegRight, 6,,           +0.8
39  **
40
```

```
phase7.geom
*NODE
       1,        -163.,    60.,           1.E-5
       2,        -225.,   140.,           1.E-5
       3,        -155.,   140.,           1.E-5
       4,     -220.882,   140.,           1.E-5
       5,     -216.765,   140.,           1.E-5
       6,     -212.647,   140.,           1.E-5
       7,     -208.529,   140.,           1.E-5
       8,     -204.412,   140.,           1.E-5
       9,     -200.294,   140.,           1.E-5
      10,     -196.177,   140.,           1.E-5
      11,     -192.059,   140.,           1.E-5
      12,     -187.941,   140.,           1.E-5
      13,     -183.824,   140.,           1.E-5
      14,     -179.706,   140.,           1.E-5
      15,     -175.588,   140.,           1.E-5
      16,     -171.471,   140.,           1.E-5
      17,     -167.353,   140.,           1.E-5
      18,     -163.235,   140.,           1.E-5
      19,     -159.118,   140.,           1.E-5
      20,        -155.,   178.,           1.E-5
................
....
    9990,     -20.0826, -67.0301,   8.69517E-6
    9991,     -24.0525, -67.0301,   8.67011E-6
    9992,     -28.0224, -67.0301,   8.64505E-6
    9993,     -31.9924, -67.0301,      8.62E-6
    9994,     -35.9456, -66.4539,    8.506E-6
    9995,     -39.9322,  -66.71,    8.52042E-6
    9996,     -43.9021, -67.0301,   8.54482E-6
    9997,     -47.8721, -67.0301,   8.51977E-6
    9998,      -51.842, -67.0301,   8.49471E-6
    9999,     -55.8119, -67.0301,   8.46965E-6
   10000,     -59.7992, -67.2884,   8.48441E-6
   10001,     -63.7517, -66.6329,   8.35815E-6
   10002,     -67.7217, -67.0301,   8.39448E-6
   10003,     -71.6916, -67.0301,   8.36942E-6
   10004,     -75.5781, -67.4793,   8.41432E-6
   10005,     -79.5255, -67.6547,   8.41651E-6
   10006,     -83.4518, -67.5762,   8.37959E-6
   10007,     -87.6463, -65.6917,   8.06189E-6
   10008,     -91.5527,  -66.527,   8.16632E-6
   10009,     -95.4631, -66.6841,   8.16592E-6
   10010,     -99.4811, -67.0301,   8.19402E-6
................
....
   11790,      230.22, -63.3577,          1.E-5
   11791,     226.196, -63.1641,          1.E-5
   11792,     225.946, -59.2163,          1.E-5
   11793,      225.97, -55.4731,          1.E-5
   11794,      225.92, -51.6959,          1.E-5
   11819,        238.,     -4.,           1.E-5
   11820,        238.,     -8.,           1.E-5
................
....
   13230,     -73.3985, -113.588,   2.20544E-6
   13231,     -86.4376, -118.835,   1.36833E-6
   13232,     -82.0912, -117.086,   1.64737E-6
   13233,      -90.615, -120.418,   1.11663E-6
**
```

```
**
*ELEMENT, TYPE=S4R, ELSET=A
      1,     21,     56,
 19,      3
      2,     22,     57,
 56,     21
      3,     23,     58,
 57,     22
      4,     24,     59,
 58,     23
      5,     25,     60,
 59,     24
      6,     26,     61,
 60,     25
      7,     27,     62,
 61,     26
      8,     28,     63,
 62,     27
      9,     29,     64,
 63,     28
     10,     31,     64,
 29,     20
............................
....
    160,    179,    194,
193,    178
    161,    188,    195,
184,    185
    162,    189,    196,
195,    188
    163,    182,    195,
196,    181
    164,    182,    183,
184,    195
    165,    180,    191,
194,    179
    166,    181,    190,
191,    180
    167,    181,    196,
189,    190
  18041,   7875,   7857,
7873,   7910
  18042,   7876,   7875,
7910,   7911
  18043,   7877,   7876,
7911,   7912
  18044,   7878,   7877,
7912,   7913
  18045,   7879,   7878,
7913,   7914
  18046,   7880,   7879,
7914,   7915
  18047,   7881,   7880,
7915,   7916
  18048,   7882,   7881,
7916,   7917
  18049,   7883,   7882,
7917,   7918
  18050,   7885,   7874,
7883,   7918
............................
....
  18200,   8033,   8032,
8047,   8048
  18201,   8042,   8039,
8038,   8049
  18202,   8043,   8042,
8049,   8050
  18203,   8036,   8035,
8050,   8049
  18204,   8036,   8049,
8038,   8037
  18205,   8034,   8033,
8048,   8045
  18206,   8035,   8034,
8045,   8044
  18207,   8035,   8044,
8043,   8050
*ELEMENT, TYPE=S4R, ELSET=B
       168,    203,    225,
  4,      2
       169,    204,    226,
225,    203
       170,    205,    227,
226,    204
............................
....
       250,    275,    276,
277,    274
       251,    275,    265,
266,    276
  18208,   8075,   7856,
7858,   8097
  18209,   8076,   8075,
8097,   8098
  18210,   8077,   8076,
8098,   8099
............................
....
  18290,   8147,   8146,
8149,   8148
  18291,   8147,   8148,
8138,   8137
*ELEMENT, TYPE=S4R, ELSET=C
       252,    224,    309,
289,    197
       253,    223,    310,
309,    224
       254,    222,    311,
310,    223
       255,    221,    342,
311,    222
```

```
      256,      220,     341,       306,      368,     380,
342,     221                   367,     365
      257,      219,     340,       307,      369,     381,
341,     220                  380,     368
      258,      218,     312,       308,      370,     382,
340,     219                  381,     369
      259,      217,     313,       309,      371,     383,
312,     218                  382,     370
      260,      216,     314,       310,      372,     384,
313,     217                  383,     371
............................  ............................
....                          ....
      300,      335,     341,       430,      481,     461,
340,     334                  462,     463
      301,      336,     342,       431,      481,     478,
341,     335                  479,     461
      302,      337,     311,    18346,     8273,    8270,
342,     336                  8272,    8285
      303,      339,     309,    18347,     8274,    8273,
310,     338                  8285,    8286
      304,      337,     338,    18348,     8275,    8274,
310,     311                  8286,    8287
      305,      313,     314,    18349,     8276,    8275,
333,     312                  8287,    8288
   18292,     8096,    8069,    18350,     8277,    8276,
8181,    8201                  8288,    8289
   18293,     8095,    8096,   ............................
8201,    8202                  ....
   18294,     8094,    8095,    18470,     8386,    8368,
8202,    8203                  8367,    8366
   18295,     8093,    8094,    18471,     8386,    8366,
8203,    8234                  8384,    8383
   18296,     8092,    8093,   *ELEMENT, TYPE=S4R, ELSET=E
8234,    8233                        432,      483,     508,
   18297,     8091,    8092,   345,     343
8233,    8232                        433,      484,     509,
   18298,     8090,    8091,   508,     483
8232,    8204                        434,      485,     510,
   18299,     8089,    8090,   509,     484
8204,    8205                        435,      486,     511,
   18300,     8088,    8089,   510,     485
8205,    8206                        436,      487,     512,
............................  511,     486
....                                 437,      488,     513,
   18340,     8227,    8226,   512,     487
8232,    8233                        438,      490,     513,
   18341,     8228,    8227,   488,     482
8233,    8234                        439,      502,     514,
   18342,     8229,    8228,   501,     489
8234,    8203                        440,      503,     515,
   18343,     8231,    8230,   514,     502
8202,    8201                 ............................
   18344,     8229,    8203,   ....
8202,    8230                        519,      577,     570,
   18345,     8205,    8204,   571,     576
8225,    8206                        520,      578,     569,
*ELEMENT, TYPE=S4R, ELSET=D    570,     577
```

```
      521,       579,       568,
569,       578
      522,       579,       564,
565,       568
    18472,      8402,      8248,
8250,      8427
    18473,      8403,      8402,
8427,      8428
    18474,      8404,      8403,
8428,      8429
    18475,      8405,      8404,
8429,      8430
    18476,      8406,      8405,
8430,      8431
    18477,      8407,      8406,
8431,      8432
    18478,      8409,      8401,
8407,      8432
    18479,      8421,      8408,
8420,      8433
    18480,      8422,      8421,
8433,      8434
............................
....
    18560,      8497,      8496,
8489,      8488
    18561,      8498,      8497,
8488,      8487
    18562,      8498,      8487,
8484,      8483
*ELEMENT, TYPE=S4R, ELSET=F
      523,       592,       614,
590,       580
      524,       593,       615,
614,       592
      525,       594,       616,
615,       593
      526,       595,       617,
616,       594
      527,       596,       618,
617,       595
      528,       597,       619,
618,       596
      529,       598,       620,
619,       597
      530,       599,       621,
620,       598
............................
....
    21430,     11786,     11785,
11793,     11794
    21431,     11778,     11777,
11786,     11794
    21432,     11787,     11779,
11778,     11794
    21433,     11788,     11787,
11794,     11793
    21434,     11789,     11788,
11793,     11792
    21435,     11789,     11792,
11791,     11790
*ELEMENT, TYPE=S4R, ELSET=O
     2545,      2730,      2745,
1529,      1406
     2546,      2731,      2746,
2745,      2730
     2547,      2732,      2747,
2746,      2731
     2548,      2733,      2748,
2747,      2732
     2549,      2734,      2749,
2748,      2733
     2550,      2735,      2749,
2734,      2729
............................
....
    21500,     11871,     11870,
11875,     11874
    21501,     11871,     11874,
11873,     11872
*ELEMENT, TYPE=S4R, ELSET=P
     3603,      1508,      1500,
1506,      3853
     3604,      1509,      1508,
3853,      3854
     3605,      1510,      1509,
3854,      3855
     3606,      1511,      1510,
3855,      3856
     3607,      1512,      1511,
3856,      3857
     3608,      3679,      1507,
1512,      3857
     3609,       808,       806,
3765,      3858
     3610,       809,       808,
3858,      3859
............................
....
    22020,     12409,     12428,
12429,     12408
    22021,     12410,     12427,
12428,     12409
    22022,     12411,     12426,
12427,     12410
    22023,     12412,     12425,
12426,     12411
    22024,     12413,     12424,
12425,     12412
    22025,     12414,     12423,
12424,     12413
    22026,     12415,     12422,
12423,     12414
```

```
    22027,    12416,    12421,
12422,    12415
    22028,    12417,    12420,
12421,    12416
    22029,    12417,    12418,
12419,    12420
*ELEMENT, TYPE=S4R, ELSET=Q
     3515,     3765,      806,
740,     3852
     3516,     3764,     3765,
3852,     3851
     3517,     3763,     3764,
3851,     3850
     3518,     3762,     3763,
3850,     3849
     3519,     3761,     3762,
3849,     3848
     3520,     3760,     3761,
3848,     3847
    . . . . . . . . . . . . . . . . . . . . . . . . . . . .
. . . .
    22110,    11986,    12599,
12600,    11987
    22111,    11985,    12598,
12599,    11986
    22112,    11984,    12597,
12598,    11985
    22113,    11983,    12596,
12597,    11984
    22114,    11982,    12595,
12596,    11983
    22115,    11981,    12594,
12595,    11982
    22116,    11980,    12593,
12594,    11981
    22117,    11980,    10544,
12505,    12593
*ELEMENT, TYPE=T3D2, ELSET=R
     4189,     4348,     4349
     4190,     4349,     4350
    . . . . . . . . . . . . . . . . . . . . . . . . . . . .
. . . .
    22260,    12888,    12887
    22261,    12889,    12888
    22262,    12890,    12889
    22263,    12892,    12891
    22264,    12894,    12893
    22265,    12895,    12894
*ELEMENT, TYPE=T3D2, ELSET=S
     4131,     4288,     4289
     4132,     4289,     4290
     4133,     4290,     4291
     4134,     4291,     4292
     4135,     4292,     4293
     4136,     4293,     4294
     4137,     4294,     4295
     4138,     4295,     4296
     4139,     4296,     4297
     4140,     4297,     4298
    . . . . . . . . . . . . . . . . . . . . . . . . . . . .
. . . .
    22320,    12952,    12951
    22321,    12953,    12952
    22322,    12954,    12953
    22323,    12955,    12954
*ELEMENT, TYPE=B31 , ELSET=U
     4337,     2729,     2735
     4338,     2735,     2736
     4339,     2736,     2737
     4340,     2737,     2738
    . . . . . . . . . . . . . . . . . . . . . . . . . . . .
. . . .
    22580,     8521,     8520
    22581,     8522,     8521
    22582,     8523,     8522
    22583,      580,     8523
*ELEMENT, TYPE=C3D4,
ELSET=MUSCLE
     4546,     5555,     5503,
4626,     4872
     4547,     5555,     5754,
4626,     5503
     4548,     5503,     5164,
4626,     4872
     4549,     5754,     5164,
4626,     5503
     4550,     5503,     4875,
5164,     4872
    . . . . . . . . . . . . . . . . . . . . . . . . . . . .
. . . .
    18020,     6504,     6517,
7421,     6516
    18021,     7473,     7476,
7472,     7093
    18022,     7124,     6517,
6505,     6480
    18023,     7324,     7509,
7334,     7331
    18024,     7208,     6931,
7306,     6930
*MPC
pin,     4564,     4565
pin,     4566,     4567
**
*Element,type=b31,elset=bone
s
200001 ,     4564,     4569
200002 ,     4566,     4569
200003 ,     5449,     4569
200004 ,     5450,     4569
200005 ,     5451,     4569
200006 ,     5461,     4569
200007 ,     5462,     4569
200008 ,     5463,     4569
```

```
 1  200009 ,      4626,      4565
 2  200010 ,      5446,      4565
 3  200011 ,      5447,      4565
 4  200012 ,      5448,      4565
 5  200013 ,      4568,      4567
 6  200014 ,      5452,      4567
 7  200015 ,      5453,      4567
 8  200016 ,      5454,      4567
 9  **
10  ** MPC_ID=1
11  **
12  *MPC
13  BEAM ,       4564,      4569
14  BEAM ,       4566,      4569
15  BEAM ,       5449,      4569
16  BEAM ,       5450,      4569
17  BEAM ,       5451,      4569
18  BEAM ,       5461,      4569
19  BEAM ,       5462,      4569
20  BEAM ,       5463,      4569
21  **
22  ** MPC_ID=2
23  **
24  *MPC
25  BEAM ,       4626,      4565
26  BEAM ,       5446,      4565
27  BEAM ,       5447,      4565
28  BEAM ,       5448,      4565
29  **
30  ** MPC_ID=3
31  **
32  *MPC
33  BEAM ,       4568,      4567
34  BEAM ,       5452,      4567
35  BEAM ,       5453,      4567
36  BEAM ,       5454,      4567
37  **
38
```

```
phase7.loads
*Temperature,amp=temps
R,1.0
S,1.0
**
*DLOAD,amp=Pull-FE-X
Pull-FE,px,8.0e0
*DLOAD,amp=Pull-FE-Z
Pull-FE,pz,8.0e0
**
*DLOAD,amp=Pull-FT-Y
Pull-LFT,py,4.0e0
*DLOAD,amp=Pull-FT-Z
Pull-LFT,pz,4.0e0
*DLOAD,amp=Pull-FT-Y
Pull-RFT,py,-4.0e0
*DLOAD,amp=Pull-FT-Z
Pull-RFT,pz,4.0e0
**
*DLOAD,amp=Pull-RT-Y
Pull-LRT,py,4.0e0
*DLOAD,amp=Pull-RT-Z
Pull-LRT,pz,4.0e0
*DLOAD,amp=Pull-RT-Y
Pull-RRT,py,-4.0e0
*DLOAD,amp=Pull-RT-Z
Pull-RRT,pz,4.0e0
**
**    Pressure applied to the
velcro to ensure a secure
fastening.
**
*DsLOAD, Amp=velcro
LVelcro, P,     4.0e0
RVelcro, P,     4.0e0
**

```

```
 1  phase7.materials
 2  **
 3  **     Material Units
 4  **     Density
 5            Tonne/mm**3
 6  **     Modulus        MPa
 7  **     Stress         MPa
 8  ***************************
 9  ***************************
10  ***************************
11  *
12  **
13  ** Absorbent Layer
14  **
15  *MATERIAL, NAME=PAD
16  *Damping,Alpha=100
17  *DENSITY
18       5.E-10,
19  *ELASTIC, TYPE=ISO
20         1.0,           0.1
21  ***************************
22  ***************************
23  ***************************
24  *
25  **
26  ** Cover Layer
27  **
28  *MATERIAL, NAME=COVER
29  *Damping,Alpha=100
30  *DENSITY
31       9.32E-10,
32  *ELASTIC, TYPE=ISO
33         7.549,         0.3
34  ***************************
35  ***************************
36  ***************************
37  *
38  **
39  ** Flap
40  **
41  *MATERIAL, NAME=FLAP
42  *Damping,Alpha=100
43  *DENSITY
44       1.23E-9,
45  *ELASTIC, TYPE=ISO
46         29.9,          0.3
47  ***************************
48  ***************************
49  ***************************
50  *
51  **
52  ** Spandex
53  **
54  *MATERIAL, NAME=SPANDEX
55  *Damping,Alpha=100
56  *Expansion
57  1.0
58  *DENSITY
59       1.1E-9,
60  *Hyperelastic, Neo Hooke,
61  Test Data Input
62  *Uniaxial Test Data
63  **  Flap and leg elastic
64  **  Stress (MPa),Strain
65  0.028328533,0.0035
66  0.056657067,0.0065
67  0.056657067,0.01
68  ........................
69  ....
70  6.402312386,2.6085002
71  6.430640919,2.61150025
72  6.458969452,2.6150002
73  6.487297986,2.6185002
74  ***************************
75  ***************************
76  ***************************
77  *
78  **
79  ** Waist Tab Elastic
80  **
81  *MATERIAL, NAME=WAIST
82  *Damping,Alpha=100
83  *DENSITY
84       1.1E-9,
85  *Hyperelastic, Neo Hooke,
86  Test Data Input
87  *Uniaxial Test Data
88  **  Diaper ears (fasteners)
89  **  Stress (MPa),Strain
90  0.003406294,0.000059
91  0.003406294,0.000138
92  0.003415502,0.000315
93  ........................
94  ....
95  1.756684191,3.025246
96  1.766631494,3.0415845
97  1.778902896,3.0619295
98  1.789222114,3.078268
99  1.798797502,3.094616
100 1.809209646,3.110935
101 1.819249769,3.1272835
102 1.831056436,3.147589
103 ***************************
104 ***************************
105 ***************************
106 *
107 **
108 ** Velcro
109 **
110 **
111 *MATERIAL, NAME=VELCRO
112 *Damping,Alpha=100
113 *DENSITY
114       1.23E-9,
```

```
 1  *ELASTIC, TYPE=ISO
 2          29.9,                0.3
 3  **
 4  ** Steel-MPa
 5  ** Date: 06-Apr-99
 6  Time: 22:45:54
 7  **
 8  *MATERIAL, NAME=STEEL
 9  **
10  *DENSITY
11        7.8E-9,
12  **
13  *ELASTIC, TYPE=ISO
14       2.07E+5,                0.292
15  **
16  ** muscle
17  ** Date: 31-Oct-01
18  Time: 10:01:38
19  **
20  *MATERIAL, NAME=MUSCLE
21  **
22  *Damping, Alpha=1000
23  **
24  *DENSITY
25         1.E-9,
26  **
27  *ELASTIC, TYPE=ISO
28           0.5,                 0.3
29  **
30  ****
31
```

```
phase7.sections
***************************
***************************
***************************
*
**
*Orientation, Name=Global
1,0,0, 0,1,0
3,0
**
***************************
***************************
***************************
*
*Section Controls, Name=hg,
Hourglass=enhanced, Second
order Accuracy=yes
***************************
***************************
***************************
*
**
** A
**
*SHELL SECTION, ELSET=A,
MATERIAL=VELCRO, Controls=hg
         1.6,        5
**
** B
**
*SHELL SECTION, ELSET=B,
MATERIAL=WAIST, Controls=hg
         0.6,        5
**
** C
**
*SHELL SECTION, ELSET=C,
Composite,
Orientation=Global,
Controls=hg
     0.15, 3, Cover
     0.60, 3, Waist
**
** D
**
*SHELL SECTION, ELSET=D,
Composite,
Orientation=Global,
Controls=hg
     0.15, 3, Cover
**
** E
**
*SHELL SECTION, ELSET=E,
Composite,
Orientation=Global,
Controls=hg
     0.15, 3, Cover
     0.30, 3, Flap
**
** F
**
*SHELL SECTION, ELSET=F,
Composite,
Orientation=Global,
Controls=hg
     0.15, 3, Cover
**
** G
**
*SHELL SECTION, ELSET=G,
Composite,
Orientation=Global,
Controls=hg
     0.15, 3, Cover
**
** H
**
*SHELL SECTION, ELSET=H,
Composite,
Orientation=Global,
Controls=hg
     0.15, 3, Cover
     0.30, 3, Flap
**
** I
**
*SHELL SECTION, ELSET=I,
Composite,
Orientation=Global,
Controls=hg
     0.15, 3, Cover
**
** J
**
*SHELL SECTION, ELSET=J,
Composite,
Orientation=Global,
Controls=hg
     0.15, 3, Cover
**
** K
**
*SHELL SECTION, ELSET=K,
Composite,
Orientation=Global,
Controls=hg
     0.15, 3, Cover
     5.00, 3, Pad
**
** L
**
*SHELL SECTION, ELSET=L,
Composite,
```

```
Orientation=Global,
Controls=hg
    0.15, 3, Cover
    5.00, 3, Pad
    0.30, 3, flap
**
** M
**
*SHELL SECTION, ELSET=M,
Composite,
Orientation=Global,
Controls=hg
    0.15, 3, Cover
**
** N
**
*SHELL SECTION, ELSET=N,
Composite,
Orientation=Global,
Controls=hg
    0.15, 3, Cover
    0.30, 3, flap
**
** O
**
*SHELL SECTION, ELSET=O,
Composite,
Orientation=Global,
Controls=hg
    0.15, 3, Cover
**
** P
**
*SHELL SECTION, ELSET=P,
Composite,
Orientation=Global,
Controls=hg
    0.30, 3, flap
**
** Q
**
*SHELL SECTION, ELSET=Q,
Composite,
Orientation=Global,
Controls=hg
    0.30, 3, flap
**
** R
**
*SOLID SECTION, ELSET=R,
MATERIAL=SPANDEX
    0.01767,
**
** S
**
*SOLID SECTION, ELSET=S,
MATERIAL=SPANDEX
    0.01767,
**
** T
**
*SHELL SECTION, ELSET=T,
Composite,
Orientation=Global,
Controls=hg
    0.15, 3, Cover
    5.00, 3, Pad
**
** U
**
*BEAM SECTION, ELSET=U,
SECTION=CIRC,
MATERIAL=Cover, POISSON=0.
    1.0,
        0.,        0.,
1.
**
*BEAM SECTION, ELSET=bones,
SECTION=CIRC,
MATERIAL=cover, POISSON=0.
    100,
        0.,        0.,
1.
**
**
** muscle
**
*SOLID SECTION,
ELSET=MUSCLE,
MATERIAL=MUSCLE
        1.,
**
```

```
phase7.sets
**
** torso
**
*NSET, NSET=TORSO, GENERATE
     4564,      4564,       1
     4566,      4566,       1
     4568,      7855,       1
**
** r
**
*NSET, NSET=R, GENERATE
     4348,      4563,       1
    12680,     12895,       1
**
** s
**
*NSET, NSET=S, GENERATE
     4288,      4347,       1
    12896,     12955,       1
**
*NSET, NSET=DIAPERHO,
GENERATE
      343,       343,       1
      365,       365,       1
      368,       379,       1
      482,       488,       1
      580,       590,       1
     8248,      8248,       1
     8270,      8270,       1
     8273,      8284,       1
     8401,      8407,       1
     8514,      8523,       1
    13074,     13075,       1
    13078,     13096,       1
    13098,     13107,       1
*NSET, NSET=TORSOFIX
     4569,
*NSET, NSET=LEGLEFT
     4565,
*NSET, NSET=LEGRIGHT
     4567,
**
** Pull-FE
**
*ELSET, ELSET=PULL-FE,
GENERATE
     4337,      4367,       1
    22377,     22407,       1
**
** torso
**
*ELSET, ELSET=TORSO,
GENERATE
     4546,     18024,       1
**
** Pull-LFT
**
*ELSET, ELSET=PULL-LFT,
GENERATE
     4368,      4394,       1
**
** Pull-RFT
**
*ELSET, ELSET=PULL-RFT,
GENERATE
    22408,     22434,       1
**
** Pull-LRT
**
*ELSET, ELSET=PULL-LRT,
GENERATE
     4478,      4494,       1
**
** Pull-RRT
**
*ELSET, ELSET=PULL-RRT,
GENERATE
    22518,     22534,       1
**
** Leg-Right
**
***NSET, NSET=LEG-RIGH
**      4568,      5452,
5453,      5454
**
** Leg-Left
**
***NSET, NSET=LEG-LEFT
**      4626,      5446,
5447,      5448
```

```
phase7.surfaces
**
** TorsoDiaper
**
*SURFACE DEFINITION,
NAME=cover
       1, SPOS
       2, SPOS
       3, SPOS
       4, SPOS
       5, SPOS
       6, SPOS
       7, SPOS
       8, SPOS
       9, SPOS
      10, SPOS
.............................
....
   22370, SPOS
   22371, SPOS
   22372, SPOS
   22373, SPOS
   22374, SPOS
   22375, SPOS
   22376, SPOS
*SURFACE DEFINITION,
NAME=torso
    4548, S3
    4550, S3
    4557, S4
    4559, S2
    4565, S4
    4577, S3
    4579, S4
    4627, S2
    4647, S4
    4672, S1
    4675, S1
    4677, S3
    4680, S1
.............................
....
   18002, S3
   18006, S3
   18009, S3
   18011, S3
   18017, S3
   18018, S3
   18020, S2
   18022, S3
**
*CONTACT PAIR,
INTERACTION=I33
     torso,     cover
*SURFACE INTERACTION,
NAME=I33
*FRICTION
0.35,
**
** TorsoFlapLeft
**
*SURFACE DEFINITION,
NAME=LFlap
    3515, SPOS
    3516, SPOS
    3517, SPOS
    3518, SPOS
    3519, SPOS
    3520, SPOS
.............................
....
     160, SPOS
     161, SPOS
     162, SPOS
     163, SPOS
     164, SPOS
     165, SPOS
     166, SPOS
     167, SPOS
*SURFACE DEFINITION,
NAME=CoverVelcro
     774, Sneg
     775, Sneg
     776, Sneg
     777, Sneg
     778, Sneg
     779, Sneg
     931, Sneg
     932, Sneg
     933, Sneg
     934, Sneg
     935, Sneg
     936, Sneg
     937, Sneg
     938, Sneg
     939, Sneg
     940, Sneg
.............................
....
   22370, Sneg
   22371, Sneg
   22372, Sneg
   22373, Sneg
   22374, Sneg
   22375, Sneg
   22376, Sneg
**
*CONTACT PAIR,
INTERACTION=I36, Mechanical
Constraint=Penalty
     CoverVelcro,
LVelcro
*SURFACE INTERACTION,
NAME=I36
```

```
*FRICTION, ROUGH
*SURFACE BEHAVIOR, NO
SEPARATION
**
** VelcroRight
**
*SURFACE DEFINITION,
NAME=RVelcro
    18041, SPOS
    18042, SPOS
    18043, SPOS
    18044, SPOS
    18045, SPOS
    18046, SPOS
    18047, SPOS
    18048, SPOS
    18049, SPOS
    18050, SPOS
........................
....
    18200, SPOS
    18201, SPOS
    18202, SPOS
    18203, SPOS
    18204, SPOS
    18205, SPOS
    18206, SPOS
    18207, SPOS
**
*CONTACT PAIR,
INTERACTION=I37, Mechanical
Constraint=Penalty
    CoverVelcro,
RVelcro
*SURFACE INTERACTION,
NAME=I37
*FRICTION, ROUGH
*SURFACE BEHAVIOR, NO
SEPARATION
**
** FlapLeft
**
*CONTACT NODE SET, NAME=S38
    4288,    4289,    4290,
4291,    4292,    4293,
4294,    4295,
    4296,    4297,    4298,
4299,    4300,    4301,
4302,    4303,
    4304,    4305,    4306,
4307,    4308,    4309,
4310,    4311,
    4312,    4313,    4314,
4315,    4316,    4317,
4318,    4319,
    4320,    4321,    4322,
4323,    4324,    4325,
4326,    4327,
    4328,    4329,    4330,
4331,    4332,    4333,
4334,    4335,
    4336,    4337,    4338,
4339,    4340,    4341,
4342,    4343,
    4344,    4345,    4346,
4347
**
*CONTACT PAIR,
INTERACTION=I38, ADJUST=1.,
TIED
    S38,    LFlap
*SURFACE INTERACTION,
NAME=I38
**
** FlapRight
**
*CONTACT NODE SET, NAME=S39
    12896,   12897,   12898,
12899,   12900,   12901,
12902,   12903,
    12904,   12905,   12906,
12907,   12908,   12909,
12910,   12911,
    12912,   12913,   12914,
12915,   12916,   12917,
12918,   12919,
    12920,   12921,   12922,
12923,   12924,   12925,
12926,   12927,
    12928,   12929,   12930,
12931,   12932,   12933,
12934,   12935,
    12936,   12937,   12938,
12939,   12940,   12941,
12942,   12943,
    12944,   12945,   12946,
12947,   12948,   12949,
12950,   12951,
    12952,   12953,   12954,
12955
**
*CONTACT PAIR,
INTERACTION=I39, ADJUST=1.,
TIED
    S39,    RFlap
*SURFACE INTERACTION,
NAME=I39
**
** LegElasticLeft
**
*SURFACE DEFINITION,
NAME=M40
```

```
        774, SPOS
        775, SPOS
        776, SPOS
        777, SPOS
        778, SPOS
        779, SPOS
        780, SPOS
..........................
....
       3510, SPOS
       3511, SPOS
       3512, SPOS
       3513, SPOS
       3514, SPOS
*CONTACT NODE SET, NAME=S40
      4348,      4349,      4350,
4351,      4352,      4353,
4354,      4355,
      4356,      4357,      4358,
4359,      4360,      4361,
4362,      4363,
      4364,      4365,      4366,
4367,      4368,      4369,
4370,      4371,
      4372,      4373,      4374,
4375,      4376,      4377,
4378,      4379,
      4380,      4381,      4382,
4383,      4384,      4385,
4386,      4387,
      4388,      4389,      4390,
4391,      4392,      4393,
4394,      4395,
      4396,      4397,      4398,
4399,      4400,      4401,
4402,      4403,
      4404,      4405,      4406,
4407,      4408,      4409,
4410,      4411,
      4412,      4413,      4414,
4415,      4416,      4417,
4418,      4419,
      4420,      4421,      4422,
4423,      4424,      4425,
4426,      4427,
      4428,      4429,      4430,
4431,      4432,      4433,
4434,      4435,
      4436,      4437,      4438,
4439,      4440,      4441,
4442,      4443,
      4444,      4445,      4446,
4447,      4448,      4449,
4450,      4451,
      4452,      4453,      4454,
4455,      4456,      4457,
4458,      4459,
      4460,      4461,      4462,
4463,      4464,      4465,
4466,      4467,
      4468,      4469,      4470,
4471,      4472,      4473,
4474,      4475,
      4476,      4477,      4478,
4479,      4480,      4481,
4482,      4483,
      4484,      4485,      4486,
4487,      4488,      4489,
4490,      4491,
      4492,      4493,      4494,
4495,      4496,      4497,
4498,      4499,
      4500,      4501,      4502,
4503,      4504,      4505,
4506,      4507,
      4508,      4509,      4510,
4511,      4512,      4513,
4514,      4515,
      4516,      4517,      4518,
4519,      4520,      4521,
4522,      4523,
      4524,      4525,      4526,
4527,      4528,      4529,
4530,      4531,
      4532,      4533,      4534,
4535,      4536,      4537,
4538,      4539,
      4540,      4541,      4542,
4543,      4544,      4545,
4546,      4547,
      4548,      4549,      4550,
4551,      4552,      4553,
4554,      4555,
      4556,      4557,      4558,
4559,      4560,      4561,
4562,      4563
**
*CONTACT PAIR,
INTERACTION=I40, ADJUST=1.,
TIED
      S40,      M40
*SURFACE INTERACTION,
NAME=I40
**
** LegElasticRight
**
*SURFACE DEFINITION,
NAME=M41
      18814, SPOS
      18815, SPOS
      18816, SPOS
      18817, SPOS
      18818, SPOS
      18819, SPOS
```

```
    18820, SPOS
........................
....
    3510, SPOS
    3511, SPOS
    3512, SPOS
    3513, SPOS
    3514, SPOS
*CONTACT NODE SET, NAME=S40
    4348,    4349,    4350,
4351,    4352,    4353,
4354,    4355,
    4356,    4357,    4358,
4359,    4360,    4361,
4362,    4363,
    4364,    4365,    4366,
4367,    4368,    4369,
4370,    4371,
    4372,    4373,    4374,
4375,    4376,    4377,
4378,    4379,
    4380,    4381,    4382,
4383,    4384,    4385,
4386,    4387,
    4388,    4389,    4390,
4391,    4392,    4393,
4394,    4395,
    4396,    4397,    4398,
4399,    4400,    4401,
4402,    4403,
    4404,    4405,    4406,
4407,    4408,    4409,
4410,    4411,
    4412,    4413,    4414,
4415,    4416,    4417,
4418,    4419,
    4420,    4421,    4422,
4423,    4424,    4425,
4426,    4427,
    4428,    4429,    4430,
4431,    4432,    4433,
4434,    4435,
    4436,    4437,    4438,
4439,    4440,    4441,
4442,    4443,
    4444,    4445,    4446,
4447,    4448,    4449,
4450,    4451,
    4452,    4453,    4454,
4455,    4456,    4457,
4458,    4459,
    4460,    4461,    4462,
4463,    4464,    4465,
4466,    4467,
    4468,    4469,    4470,
4471,    4472,    4473,
4474,    4475,
    4476,    4477,    4478,
4479,    4480,    4481,
4482,    4483,
    4484,    4485,    4486,
4487,    4488,    4489,
4490,    4491,
    4492,    4493,    4494,
4495,    4496,    4497,
4498,    4499,
    4500,    4501,    4502,
4503,    4504,    4505,
4506,    4507,
    4508,    4509,    4510,
4511,    4512,    4513,
4514,    4515,
    4516,    4517,    4518,
4519,    4520,    4521,
4522,    4523,
    4524,    4525,    4526,
4527,    4528,    4529,
4530,    4531,
    4532,    4533,    4534,
4535,    4536,    4537,
4538,    4539,
    4540,    4541,    4542,
4543,    4544,    4545,
4546,    4547,
    4548,    4549,    4550,
4551,    4552,    4553,
4554,    4555,
    4556,    4557,    4558,
4559,    4560,    4561,
4562,    4563
**
*CONTACT PAIR,
INTERACTION=I40, ADJUST=1.,
TIED
    S40,    M40
*SURFACE INTERACTION,
NAME=I40
**
** LegElasticRight
**
*SURFACE DEFINITION,
NAME=M41
    18814, SPOS
    18815, SPOS
    18816, SPOS
    18817, SPOS
    18818, SPOS
    18819, SPOS
    18820, SPOS
........................
....
    20140, SPOS
    20141, SPOS
*CONTACT NODE SET, NAME=S41
```

```
     12680,     12681,     12682,
12683,     12684,     12685,
12686,     12687,
     12688,     12689,     12690,
12691,     12692,     12693,
12694,     12695,
     12696,     12697,     12698,
12699,     12700,     12701,
12702,     12703,
     12704,     12705,     12706,
12707,     12708,     12709,
12710,     12711,
     12712,     12713,     12714,
12715,     12716,     12717,
12718,     12719,
     12720,     12721,     12722,
12723,     12724,     12725,
12726,     12727,
     12728,     12729,     12730,
12731,     12732,     12733,
12734,     12735,
     12736,     12737,     12738,
12739,     12740,     12741,
12742,     12743,
     12744,     12745,     12746,
12747,     12748,     12749,
12750,     12751,
     12752,     12753,     12754,
12755,     12756,     12757,
12758,     12759,
     12760,     12761,     12762,
12763,     12764,     12765,
12766,     12767,
     12768,     12769,     12770,
12771,     12772,     12773,
12774,     12775,
12776,     12777,     12778,
12779,     12780,     12781,
12782,     12783,
     12784,     12785,     12786,
12787,     12788,     12789,
12790,     12791,
     12792,     12793,     12794,
12795,     12796,     12797,
12798,     12799,
     12800,     12801,     12802,
12803,     12804,     12805,
12806,     12807,
     12808,     12809,     12810,
12811,     12812,     12813,
12814,     12815,
     12816,     12817,     12818,
12819,     12820,     12821,
12822,     12823,
     12824,     12825,     12826,
12827,     12828,     12829,
12830,     12831,
     12832,     12833,     12834,
12835,     12836,     12837,
12838,     12839,
     12840,     12841,     12842,
12843,     12844,     12845,
12846,     12847,
     12848,     12849,     12850,
12851,     12852,     12853,
12854,     12855,
     12856,     12857,     12858,
12859,     12860,     12861,
12862,     12863,
     12864,     12865,     12866,
12867,     12868,     12869,
12870,     12871,
     12872,     12873,     12874,
12875,     12876,     12877,
12878,     12879,
     12880,     12881,     12882,
12883,     12884,     12885,
12886,     12887,
     12888,     12889,     12890,
12891,     12892,     12893,
12894,     12895
**
*CONTACT PAIR,
INTERACTION=I41, ADJUST=1.,
TIED
     S41,     M41
*SURFACE INTERACTION,
NAME=I41
**
```

```
 1  RightLegForward.amp
 2  *Amplitude,
 3  Name=RightLegForward
 4  0.0,0.0,   0.1,+0.0,
 5  1.2,+0.0,   1.6,0.0,
 6  2., 0.738695, 2.00092,
 7  0.737024, 2.00182, 0.735353,
 8  2.00272, 0.733681
 9  2.00361, 0.73201, 2.00451,
10  0.730339, 2.00541, 0.728667,
11  2.00631, 0.726996
12  2.0072, 0.725325, 2.0081,
13  0.725321, 2.009, 0.725317,
14  2.0099, 0.723646
15  2.0108, 0.721974, 2.0117,
16  0.720303, 2.01259, 0.718632,
17  2.01349, 0.715293
18  2.01439, 0.715289, 2.01528,
19  0.71195, 2.01618, 0.711946,
20  2.01708, 0.710275
21  2.01798, 0.706936, 2.01888,
22  0.706933, 2.01977, 0.703594,
23  2.02067, 0.701922
24
```

```
RightLegSide.amp
*Amplitude, Name=RightLegSide
0.0,0.0,   0.10,-1.0, 1.2,-
1.0,   1.6,0.0,
2., 0.0210023, 2.0017,
0.0226734, 2.00262,
0.0260252, 2.00352,
0.0260155
2.00443, 0.0276866, 2.00534,
0.0293577, 2.00624,
0.0293479, 2.00715, 0.031019
2.00805, 0.0310093, 2.00896,
0.0309995, 2.00987,
0.0326706, 2.01077,
0.0326608
2.01167, 0.0326511, 2.01258,
0.0343222, 2.01349,
0.0343124, 2.0144, 0.0359835
2.01531, 0.0376546, 2.01621,
0.0376448, 2.01712,
0.0393159, 2.01802,
0.0393062
2.01893, 0.0392964, 2.01984,
0.0409675, 2.02074,
0.0409578, 2.02165,
0.0426288
2.02255, 0.0426191, 2.02346,
0.0442902, 2.02437,
0.0459613, 2.02528,
0.0476323
2.02618, 0.0476226, 2.02709,
0.0492937, 2.028, 0.0509647,
2.0289, 0.050955
2.02981, 0.0526261, 2.03072,
0.0542971, 2.03163,
0.0542874, 2.03254,
0.0559585

END FILES
```

```
1              phase7.inp
2  *HEADING
3  *PREPRINT,MODEL=YES,HISTORY=
4  YES
5  **
6  **      UNITS
7  **      Length = mm
8  **      Time = Sec
9  **      Mass = Tonne
10 **      Force = N
11 **      Stress = MPa
12 **
13 *Include,input=files/phase7.
14 geom
15 *Include,input=files/phase7.
16 sets
17 *Include,input=files/phase7.
18 sections
19 *Include,input=files/phase7.
20 materials
21 *NMAP, Type=Rectangular,
22 NSET=Torso
23 -12.0, 0.0, 0.0
24
25 **
26 *STEP
27 *dynamic,Explicit
28 ,3.0
29 **
30 *Include,input=files/phase7.
31 surfaces
32 *Include,input=files/phase7.
33 loads
34 *Include,input=files/phase7.
35 bcs
36 **
37 *Variable Mass
38 Scaling,Type=Below
39 Min,dt=1.0e-4, Number
40 Interval=120, Elset=a
41 *Variable Mass
42 Scaling,Type=Below
43 Min,dt=1.0e-4, Number
44 Interval=120, Elset=b
45 *Variable Mass
46 Scaling,Type=Below
47 Min,dt=1.0e-4, Number
48 Interval=120, Elset=c
49 *Variable Mass
50 Scaling,Type=Below
51 Min,dt=1.0e-4, Number
52 Interval=120, Elset=d
53 *Variable Mass
54 Scaling,Type=Below
55 Min,dt=1.0e-4, Number
56 Interval=120, Elset=e
57 *Variable Mass
58 Scaling,Type=Below
59 Min,dt=1.0e-4, Number
60 Interval=120, Elset=f
61 *Variable Mass
62 Scaling,Type=Below
63 Min,dt=1.0e-4, Number
64 Interval=120, Elset=g
65 *Variable Mass
66 Scaling,Type=Below
67 Min,dt=1.0e-4, Number
68 Interval=120, Elset=h
69 *Variable Mass
70 Scaling,Type=Below
71 Min,dt=1.0e-4, Number
72 Interval=120, Elset=i
73 *Variable Mass
74 Scaling,Type=Below
75 Min,dt=1.0e-4, Number
76 Interval=120, Elset=j
77 *Variable Mass
78 Scaling,Type=Below
79 Min,dt=1.0e-4, Number
80 Interval=120, Elset=k
81 *Variable Mass
82 Scaling,Type=Below
83 Min,dt=1.0e-4, Number
84 Interval=120, Elset=l
85 *Variable Mass
86 Scaling,Type=Below
87 Min,dt=1.0e-4, Number
88 Interval=120, Elset=m
89 *Variable Mass
90 Scaling,Type=Below
91 Min,dt=1.0e-4, Number
92 Interval=120, Elset=n
93 *Variable Mass
94 Scaling,Type=Below
95 Min,dt=1.0e-4, Number
96 Interval=120, Elset=o
97 *Variable Mass
98 Scaling,Type=Below
99 Min,dt=1.0e-4, Number
100 Interval=120, Elset=p
101 *Variable Mass
102 Scaling,Type=Below
103 Min,dt=1.0e-4, Number
104 Interval=120, Elset=q
105 *Variable Mass
106 Scaling,Type=Below
107 Min,dt=1.0e-4, Number
108 Interval=120, Elset=R
109 *Variable Mass
110 Scaling,Type=Below
111 Min,dt=1.0e-4, Number
112 Interval=120, Elset=s
```

```
*Variable Mass
Scaling,Type=Below
Min,dt=1.0e-4, Number
Interval=120, Elset=t
*Variable Mass
Scaling,Type=Below
Min,dt=1.0e-4, Number
Interval=120, Elset=u
*Variable Mass
Scaling,Type=Below
Min,dt=1.0e-4, Number
Interval=120, Elset=Bones
*Variable Mass
Scaling,Type=Below
Min,dt=3.0e-5, Number
Interval=120, Elset=Muscle
**
............................
............................
............................
............................
............................
**   Control torso Movement
............................
............................
............................
............................
........................
*Include,input=files/RightLe
gForward.amp
*Include,input=files/RightLe
gSide.amp
*Include,input=files/LeftLeg
Forward.amp
*Include,input=files/LeftLeg
Side.amp
............................
............................
............................
............................
........................
**   Control Diaper Movement
............................
............................
............................
............................
........................
*Amplitude,name=Pull-FE-X
0.0,-0.033,    0.4,-0.033,
     1.0,-0.05,    1.05,0.0
*Amplitude,name=Pull-FE-Z
0.0, 0.01,    0.2, 0.0,
     1.0, 0.0, 1.05,0.0
**0.0, 0.05,    0.2, 0.0,
     1.0, 0.0, 1.05,0.0
**
*Amplitude,name=Pull-FT-Y
0.0, 0.10,    0.6, 0.0,
     1.0,-0.01,    1.05,0.0
*Amplitude,name=Pull-FT-Z
0.0, 0.05,    0.8,-0.0775,
     1.0,-0.0775,    1.05,-
0.0775,
1.2,0.0
**
*Amplitude,name=Pull-RT-Y
0.0, 0.114,    0.8, 0.05,
     1.0,-0.1, 1.05,0.0
*Amplitude,name=Pull-RT-Z
0.0, 0.00,    0.4, 0.114,
     0.8,0.114,    1.0,
0.114,
1.05,0.114,  1.2,0.0
............................
............................
............................
............................
............................
**   Fasten Velcro Tab
............................
............................
............................
............................
........................
*Amplitude,name=velcro
0.0,0.0,  0.8,0.0,  1.0,-
0.008,    1.05,-0.004,
1.2,0.0
**
............................
............................
............................
............................
............................
**   Shrink Elastic
............................
............................
............................
............................
........................
*Amplitude,name=temps
0.0,0.0, 0.1,-0.5, 3.0,-0.5
**
***output,history,time
interval=0.01
***Energy Output
**Allae,allke,allse
**
*output,field,number
interval=120
*Contact Output
Cstress,
***Element
output,variables=preselect
```

```
1  *Node output
2  U,
3  **
4  *END STEP
5
6  END
```

APPENDIX 2   FEMPAD EXAMPLE

TABLE OF CONTENTS femPadExample.inp ................................ ................. ............. . ..................
     84 s75-torso-stand-open.inp ................................................................ . ....... .............
     91 torso-spread-09.inp         ............. . ............................... ....................... . ............ . ................
     96 panty-partial-membrane-conformal-spread-coarse.inp
. . ............................ 97 panty-partial-membrane-conformal-spread-coarse-push.inp
100 deformed-product-mod2.inp......... . ..... ..................................... ... 101

End   ............ . ..................................... ................ . ..................................... . .....................
104

NOTE: Several periods in a row on one line (e.g.,…….)
indicates additonal similar lines of code which have been
deleted.

```
femPadExample.inp
*HEADING
S75 Torso Model
**
*** # this input file is read by ABAQUS, it includes (imports
the contents of) other files
*** # that contain detailed finite element model definition.
By storing detailed model
*** # definition information in other files, the main file
(this one) is more abbreviated
*** # and potentially easier to read by humans.  Storing
detailed sub-model definitions in
*** # separate files helps to make the model more modular in
design, allowing reuse of some
*** # sub-model modules in other models.
**
*restart,write,overlay
**
*** # import the wearer element definitions:
*include,input=s75-torso-stand-open.elem
**
*** # import the wearer node definitions:
*include,input=torso-spread-09.node
**
*** # import the panty finite element definitions (nodes &
elements):
*include,input=panty-partial-membrane-conformal-spread-
coarse.inp
**
*** # import the rigid pad pusher finite element definitions
(nodes & elements):
*include,input=pad-pusher.inp
**
*** # import the product finite element definitions (nodes &
elements):
*include,input=deformed-product-mod2.inp
**
*** # nmap command transforms the coordinate system of the
nodes specified
*** # to properly locate the sub-model within the global
reference frame
**
*nmap,nset=product,type=rectangular
0.,0.,-27.

**
*nmap,nset=panty-part,type=rectangular
0.,0.,-20.

**
*nmap,nset=pad-pusher,type=rectangular
0.,0.,-20.
```

```
 1   **
 2   *** # element sets (elsets) are defined to make model
 3   manipulation more efficient
 4   *elset,elset=body
 5   skin,foam
 6   **
 7   *elset,elset=product
 8   shaping, distribution
 9   **
10   *elset,elset=panty
11   panty-part
12   **
13   *elset,elset=scalable
14   product,panty,body,pad-pusher
15   **
16   ********
17   **
18   *SOLID SECTION, ELSET=FOAM,  MATERIAL=FOAM
19   **
20   *MEMBRANE SECTION, ELSET=SKIN ,  MATERIAL=SKIN
21    1.00000E-4,
22   **
23   *SOLID SECTION,ELSET=LYCRA,MATERIAL=LYCRA
24    1.0
25   **
26   *membrane SECTION,ELSET=panty,MATERIAL=PANTY
27    .1,
28   **
29   *membrane SECTION,ELSET=pad-pusher,MATERIAL=PANTY
30    .1,
31   **
32   *SOLID SECTION,ELSET=shaping,MATERIAL=SHAPING
33   **
34   *SOLID SECTION,ELSET=distribution,MATERIAL=distrib
35   **
36   ********
37   *** # Material Property Definitions
38   ********
39   **
40   *material,name=foam
41   *hyperelastic
42   ** data from KCC E=6 so C10=E/6 C01=0 Neo-Hookian
43   ** K0=2/D1 and G0=2(C10+C01) yield K/G=1(D1*(C10+C01))
44   ** then D=1/((K/G)*(C10+C01))
45   ** using explicit default of K/G=20 or v=.475 then D=.05
46   ** assume K/G=100 or v=.495 then D=.01
47   1.0, 0.0, 0.05
48   *DENSITY
49    1.000E-09,
50   **
51   *material,name=skin
52   *hyperelastic
53   1.0, 0.0, 0.05
54   *DENSITY
55    1.000E-09,
56   **
57   *MATERIAL,NAME=lycra
```

```
 1   *elastic
 2   100., .3
 3   *DENSITY
 4    0.100E-09,
 5   **
 6   *MATERIAL,NAME=PANTY
 7   *hyperelastic
 8   1.0, 0.0, 0.05
 9   *DENSITY
10    0.100E-09,
11   **
12   *MATERIAL,NAME=TRANSFER
13   *ELASTIC,TYPE=ISOTROPIC
14    5.87,.1
15   *DENSITY
16    0.080E-09,
17   *EXPANSION,TYPE=ISO,ZERO=21.85
18    1.170E-05,
19   *PLASTIC
20    2.480E+05,
21   **
22   *MATERIAL,NAME=BAFFLE
23   *ELASTIC,TYPE=ISOTROPIC
24    73.6, .3
25   *DENSITY
26    0.90E-09,
27   *EXPANSION,TYPE=ISO,ZERO=21.85
28    1.170E-05,
29   *PLASTIC
30    0.76,   0.0
31    1.24,   0.0041
32    2.54,   0.017
33    3.46,   0.041
34    3.94,   0.069
35    4.31,   0.11
36    5.10,   0.22
37   **
38   *MATERIAL,NAME=COVER
39   *ELASTIC,TYPE=ISOTROPIC
40    4.84, .1
41   *DENSITY
42    0.080E-09,
43   *EXPANSION,TYPE=ISO,ZERO=21.85
44    1.170E-05,
45   *PLASTIC
46    2.480E+05,
47   **
48   *MATERIAL,NAME=DISTRIB
49   *ELASTIC,TYPE=ISOTROPIC
50    16.8, .1
51   *DENSITY
52    0.140E-09,
53   *EXPANSION,TYPE=ISO,ZERO=21.85
54    1.170E-05,
55   *PLASTIC
56    0.24,   0.0
57    0.31,   0.0073
```

```
 1      0.62,  0.014
 2      0.78,  0.041
 3    **
 4    *MATERIAL,NAME=SHAPING
 5    *ELASTIC,TYPE=ISOTROPIC
 6      2.79, .1
 7    *DENSITY
 8      0.080E-09,
 9    *EXPANSION,TYPE=ISO,ZERO=21.85
10      1.170E-05,
11    *PLASTIC
12      0.051,  0.0
13      0.097,  0.0036
14      0.17,   0.015
15      0.21,   0.030
16      0.24,   0.058
17    **
18    *rigid body,elset=pelvis,ref node=999997
19    *rigid body,elset=rt-femur,ref node=999998
20    *rigid body,elset=lt-femur,ref node=999999
21    **
22    *ELEMENT,TYPE=MASS,ELSET=MASS0001
23      999987,     999997
24      999988,     999998
25      999989,     999999
26    **
27    *MASS,ELSET=MASS0001
28      1.000E-6,
29    **
30    *ELEMENT,TYPE=ROTARYI,ELSET=ROT00001
31      999977,     999997
32      999978,     999998
33      999979,     999999
34    **
35    *ROTARY INERTIA,ELSET=ROT00001,ORIENTATION=O0000001
36      2.000E-35, 2.000E-35,-1.000E-35
37    *ORIENTATION,NAME=O0000001,SYSTEM=RECTANGULAR
38      0.707E+00,-0.707E+00, 0.000E+00, 0.408E+00, 0.408E+00,-
39    0.816E+00
40          3, 0.0000E+00
41    **
42    **   PRODUCT
43    **
44    *** # Surface defintions -- used for contact interactions
45    *surface,type=elements,name=PRODUCT
46    X000002,    s1
47    X000003,    s1
48    X000004,    s2
49    X000005,    s2
50    X000006,    s3
51    X000007,    s3
52    X000008,    s4
53    X000009,    s5
54    X000010,    s5
55    X000011,    s6
56    **
57    **   PANTY
```

```
*surface,type=elements,name=PANTY,nothick
panty,spos
**
**   PAD-PUSHER
*surface,type=elements,name=PAD-PUSHER,nothick
pad-pusher,spos
**
**   SKIN
*surface,type=elements,name=PANTY-SKIN-IF,nothick
PANTY-SKIN-IF,sneg
**
**   SKINPADIF
*surface,type=elements,name=SKINPADIF,nothick
SKINPADIF,sneg
**
*** # Use Model history instructions -- use history is broken
into logical
*** # stages called "steps" -- each step has a particular
goal toward applying
*** # the product to the wearer and then further deforming
the product with
*** # wearer motion.
**
*** # Step Definitions
**
** Step 1 - Pull Up Panty & Close Legs
**
*step,nlgeom=yes
Step 1 - Pull Up Panty & Close Legs
*dynamic,explicit
, 25.0
**
*DIAGNOSTICS, CONTACT=DETAIL
*fixed mass scaling,elset=scalable,dt=1.e-4,type=uniform
**
*contact pair,interaction=slide,weight=0.0
PRODUCT,SKINPADIF
*contact pair,interaction=slick,mechanicalconstraint=penalty
PANTY,PANTY-SKIN-IF
*contact pair,interaction=sticky,weight=0.0
PRODUCT,PANTY
*contact pair,interaction=sticky,weight=0.0
PRODUCT,PAD-PUSHER
**
*contact pair,interaction=slick
PRODUCT,PRODUCT
**
*SURFACE INTERACTION,NAME=slick
*FRICTION
.1,
*SURFACE INTERACTION,NAME=slide
*FRICTION
.2,
*SURFACE INTERACTION,NAME=sticky
*FRICTION
1.0,
**
```

K-C 19,707

```
1    *amplitude,definition=smoothstep,name=waist,time=totaltime
2    0.0,0.0, 10.0,0.0, 19.0,1.0, 30.0,1.0
3    **
4    *amplitude,definition=smoothstep,name=pull,time=totaltime
5    0.0,0.0, 10.0,0.5, 19.0,1.0, 30.0,1.0
6    **
7    *amplitude,definition=smoothstep,name=push,time=totaltime
8    0.0,0.0, 18.0,1.0, 20.0,0.0, 30.0,0.0
9    **
10   *amplitude,definition=smoothstep,name=close,time=totaltime
11   0.0,0.0, 20.0,0.0, 29.0,1.0, 30.0,1.0
12   **
13   *boundary,amplitude=close
14   **
15   ** pelvis
16   **
17   999997,1,6,0.0
18   **
19   ** rt-femur
20   **
21   999998,1,1,0.0
22   999998,2,2,0.0
23   999998,3,3,0.0
24   999998,6,6,0.0
25   **
26   ** lt-femur
27   **
28   999999,1,1,0.0
29   999999,2,2,0.0
30   999999,3,3,0.0
31   999999,6,6,0.0
32   **
33   ** femur swing
34   ** hold at -45 degrees from cast (standing)
35   **
36   ** rt-femur
37   999998,4,4,0.0
38   ** lt-femur
39   999999,4,4,0.0
40   **
41   ** femur close
42   ** start at +9 degrees open from cast, then close to -21 (30
43   degrees total)
44   **
45   ** rt-femur
46   999998,5,5,-0.5236
47   ** lt-femur
48   999999,5,5, 0.5236
49   **
50   *boundary,amplitude=waist
51   **
52   ** Close Up Panty
53   **
54   panty-waist-rear,1,1,0.0
55   panty-waist-rear,2,2,-29.0
56   **
57   panty-waist-front,1,1,0.0
```

```
 1    panty-waist-front,2,2,29.0
 2    **
 3    ** Push Up Pad
 4    **
 5    *boundary,amplitude=push
 6    **
 7    pad-pusher,1,2,0.0
 8    pad-pusher,3,3,31.0
 9    **
10    ** Pull Up Panty
11    **
12    *boundary,amplitude=pull
13    **
14    panty-waist-rear,3,3,44.0
15    **
16    panty-waist-front,3,3,44.0
17    **
18    *output,field,variable=preselect,number interval=100
19    **
20    *end step
21
22
```

```
1   s75-torso-stand-open.inp
2   **%
3   ==================================================================
4   **%
5   **%
6   **%            I-DEAS 8 ABAQUS STANDARD TRANSLATOR
7   **%                     FOR ABAQUS VERSION 5.8
8   **%
9   **%         MODEL FILE: /u/dar/fs2/p99630/partial.mf1
10  **%         INPUT FILE: s75-torso-stand-open.inp
11  **%           EXPORTED: AT 11:26:38 ON 16-Mar-01
12  **%               PART: Full Torso - 5 steps - seated pad
13  **%                FEM: Fem1
14  **%
15  **%              UNITS: MM-mm (milli-newton)
16  **%                     ... LENGTH : MM
17  **%                     ... TIME   : sec
18  **%                     ... MASS   : kilogram (kg)
19  **%                     ... FORCE  : milli-newton
20  **%                     ... TEMPERATURE : deg Celsius
21  **%
22  **%      SUBSET EXPORT: OFF
23  **%
24  **%      NODE ZERO TOLERANCE: OFF
25  **%
26
27  **%
28  **%
29  ==================================================================
30  **%
31  **%
32  **ELEMENT, TYPE=C3D4, ELSET=foam
33    810001, 812274, 800635, 811538, 811818
34    810002, 812520, 810314, 810159, 812502
35    810003, 801612, 811460, 812698, 811458
36    810004, 812603, 811450, 811395, 812691
37    810005, 812464, 800575, 811286, 811351
38   ............................................
39    885984, 850652, 861348, 862539, 861011
40    885985, 862101, 862342, 862730, 853102
41    885986, 851207, 862146, 851201, 851211
42    885987, 851665, 861459, 851664, 851667
43    885988, 852576, 861921, 852577, 852583
44  **
45  *ELEMENT, TYPE=M3D3, ELSET=skin
46    800001, 801815, 801813, 801812
47    800003, 800998, 801002, 801003
48    800004, 802044, 802038, 802037
49    800005, 800441, 801813, 800440
50    800006, 802223, 802224, 802220
51   ...........................
52    856223, 851054, 851064, 851053
53    856225, 850507, 850509, 850508
54    856227, 851384, 851174, 851385
55    856229, 851779, 851783, 851784
56    856230, 851784, 851778, 851779
```

```
**
*ELEMENT, TYPE=R3D3, ELSET=pelvis
 900010, 802514, 802517, 802515
 900026, 802668, 802649, 802657
 900030, 802823, 802838, 802839
 900054, 802838, 802837, 802639
 900059, 802517, 802516, 802515
............................................
 911879, 852637, 852840, 852841
 911881, 852796, 852781, 852782
 911941, 852646, 850204, 852836
 911966, 852520, 852783, 852782
 911976, 852811, 852812, 852827
*ELEMENT, TYPE=R3D3, ELSET=rt-femur
 906014, 852539, 852544, 852546
 906047, 852691, 852687, 853049
 906066, 852868, 852911, 852867
 906070, 852563, 852571, 852564
 906071, 852858, 852857, 852614
............................................
 911926, 852560, 852562, 852559
 911942, 853065, 853022, 853066
 911967, 852537, 852541, 852869
 911972, 852694, 852695, 852691
 911984, 852583, 852576, 852577
*ELEMENT, TYPE=R3D3, ELSET=lt-femur
 900022, 802544, 802539, 802546
 900055, 802687, 802691, 803049
 900074, 802911, 802868, 802867
 900078, 802571, 802563, 802564
 900079, 802857, 802858, 802614
............................................
 905950, 803022, 803065, 803066
 905975, 802541, 802537, 802869
 905980, 802695, 802694, 802691
 905992, 802576, 802583, 802577
**
*NSET,NSET=PELVIS
   800055,   800056,   800063,   800064,   800068,   800069,
 800081,  800098,  800099,  800108,  800109
   800110,   800114,   800125,   800126,   800127,   800132,
 800133,  800136,  800147,  800154,  800155
   800157,   800204,   800220,   802473,   802474,   802475,
 802476,  802477,  802478,  802479,  802480
............................................
 852822,  852823,  852824
   852825,   852826,   852827,   852828,   852829,   852830,
 852831,  852832,  852833,  852835,  852836
   852837,   852838,   852839,   852840,   852841,   852842,
 852843,  852844,  852845,  852846,  852847
   852848,  852849
*NSET,NSET=RT-FEMUR
   850294,   850295,   850299,   850303,   850307,   850311,
 852467,  852468,  852525,  852526,  852527
   852528,   852529,   852530,   852531,   852532,   852533,
 852534,  852535,  852536,  852537,  852538
```

```
    852539,   852540,   852541,   852542,   852543,   852544,
852545,   852546,   852547,   852548,   852549
    852550,   852551,   852552,   852553,
..................................
835535,   862354,   863321
    870828,   870875,   871613,   872137,   872802,   872857,
872868,   873899,   874032,   874083,   874528
    876115,   876721,   877126,   877188,   877199,   877926,
879121,   879261,   880020,   880076,   884548
....................................
853039,   853040,   853041
    853042,   853043,   853044,   853045,   853046,   853047,
853048,   853049,   853050,   853051,   853052
    853053,   853054,   853055,   853056,   853057,   853058,
853059,   853060,   853061,   853062,   853063
    853064,   853065,   853066,   853067,   853068,   853069,
853070,   853071,   853072,   853073
*NSET,NSET=LT-FEMUR
    800294,   800295,   800299,   800303,   800307,   800311,
802467,   802468,   802525,   802526,   802527
    802528,   802529,   802530,   802531,   802532,   802533,
802534,   802535,   802536,   802537,   802538
    802539,   802540,   802541,   802542,   802543,   802544,
802545,   802546,   802547,   802548,   802549
    802550,   802551,   802552,   802553,   802554
..................................
803039,   803040,   803041
    803042,   803043,   803044,   803045,   803046,   803047,
803048,   803049,   803050,   803051,   803052
    803053,   803054,   803055,   803056,   803057,   803058,
803059,   803060,   803061,   803062,   803063
    803064,   803065,   803066,   803067,   803068,   803069,
803070,   803071,   803072,   803073
*ELSET,ELSET=SKINPADIF
    800001,   800003,   800005,   800010,   800011,   800012,
800013,   800021,   800034,   800042,   800045
    800047,   800049,   800052,   800057,   800060,   800063,
800064,   800075,   800082,   800087,   800101
    800103,   800105,   800106,   800109,   800111,   800112,
800113,   800114,   800115,   800118,   800120
    800121,   800136,   800139,   800140,
..................................
856069,   856070,   856076
    856080,   856081,   856084,   856095,   856096,   856100,
856107,   856112,   856113,   856117,   856119
    856120,   856123,   856128,   856138,   856139,   856145,
856146,   856150,   856152,   856159,   856161
    856163,   856165,   856166,   856179,   856180,   856210,
856216,   856220,   856225,   856229,   856230
*ELSET,ELSET=PANTY-SKIN-IF
    800001,   800003,   800004,   800005,   800010,   800011,
800012,   800013,   800021,   800026,   800030
    800031,   800032,   800034,   800041,   800042,   800043,
800045,   800047,   800049,   800051,   800052
    800057,   800058,   800060,   800063,   800064,   800065,
800075,   800082,   800087,   800092,   800097
```

```
       800100,    800101,    800103,    800105,    800106,    800109,
    800111,    800112,    800113,    800114,    800115
    ............................
    856084,    856095,    856096
       856098,    856100,    856106,    856107,    856108,    856112,
    856113,    856116,    856117,    856119,    856120
       856123,    856128,    856138,    856139,    856143,    856144,
    856145,    856146,    856150,    856152,    856155
       856159,    856161,    856162,    856163,    856165,    856166,
    856167,    856169,    856171,    856179,    856180
       856184,    856186,    856210,    856216,    856220,    856225,
    856229,    856230
    *ELSET,ELSET=VP000002
       800001,    800003,    800004,    800005,    800006,    800008,
    800009,    800010,    800011,    800012,    800013
       800014,    800017,    800018,    800021,    800022,    800026,
    800027,    800028,    800029,    800030,    800031
       800032,    800033,    800034,    800036,    800039,    800040,
    800041,    800042,    800043,    800044,    800045
    ............................
       856134,    856135,    856138,    856139,    856143,    856144,
    856145,    856146,    856147,    856150,    856151
       856152,    856153,    856155,    856157,    856159,    856160,
    856161,    856162,    856163,    856165,    856166
       856167,    856169,    856171,    856175,    856177,    856179,
    856180,    856181,    856183,    856184,    856186
       856187,    856190,    856196,    856197,    856198,    856199,
    856200,    856203,    856204,    856206,    856208
       856209,    856210,    856213,    856216,    856217,    856218,
    856220,    856223,    856225,    856227,    856229
       856230,
    *ELSET,ELSET=VP000003
       813497,    823044,    823090,    823224,    823434,    823749,
    823787,    823836,    823975,    824166,    824271
       824650,    824686,    824690,    824798,    825157,    825170,
    825172,    825201,    825203,    825343,    825395
       825396,    825411,    825636,    825694,    826237,    826435,
    826884,    827884,    828308,    828315,    828440
       828472,    828475,    828649,    830491,    833388,    863497,
    873044,    873090,    873224,    873434,    873749
       873787,    873836,    873975,    874166,    874271,    874650,
    874686,    874690,    874798,    875157,    875170
       875172,    875201,    875203,    875343,    875395,    875396,
    875411,    875636,    875694,    876237,    876435
       876884,    877884,    878308,    878315,    878440,    878472,
    878475,    878649,    880491,    883388
    *ELSET,ELSET=VP000004
       823143,    823382,    823585,    823614,    825734,    825742,
    825855,    826743,    827169,    827605,    827712
       828112,    828572,    829069,    830170,    873143,    873382,
    873585,    873614,    875734,    875742,    875855
       876743,    877169,    877605,    877712,    878112,    878572,
    879069,    880170
    *ELSET,ELSET=VP000005
       810041,    810328,    810686,    813768,    817478,    821044,
    822227,    822478,    822858,    823049,    823058
```

```
      823079,    823080,    823354,    823511,   823553,   823580,
823582,   823633,   823653,   823675,   823704
      823772,    823779,    823799,    823800,   823856,   823885,
824008,   824112,   824121,   824170,   824208
..................................
      873444,    873446,    873632,    873765,   873990,   874122,
874250,   874682,   874785,   874815,   874832
      874993,    875159,    875185,    875189,   875194,   875204,
875358,   875552,   875593,   875631,   875744
      875748,    875823,    875834,    876208,   876723,   876752,
876759,   876761,   876763,   876766,   876883
      877223,    877282,    877284,    877600,   877713,   877772,
877895,   878316,   878429,   878530,   878690
      878757,    878913,    879533,    881249,   882057
*ELSET,ELSET=VP000006
      821522,    822998,    823042,    823050,   823054,   823152,
823199,   823444,   823446,   823632,   823765
      823990,    824122,    824250,    824682,   824785,   824815,
824832,   824993,   825159,   825185,   825189
      825194,    825204,    825358,    825552,   825593,   825631,
825744,   825748,   825823,   825834,   826208
      826723,    826752,    826759,    826761,   826763,   826766,
826883,   827223,   827282,   827284,   827600
....................................
      877703,    877730,    877829,    877871,   877909,   877929,
877949,   877953,   877962,   877971,   878162
      878179,    878277,    878303,    878311,   878360,   878372,
878418,   878430,   878435,   878485,   878499
      878537,    878741,    878879,    878960,   879126,   879299,
879328,   879456,   879540,   879583,   879749
      879817,    879822,    879857,    879884,   879972,   880019,
880159,   880202,   880246,   880318,   880424
      880827,    880938,    881181,    881473,   881953,   882435,
882840,   883223,   883356,   884244,   884482
      884735,    884737,    885089,    885671,   885883
*ELSET,ELSET=VP000007
      822621,    824116,    824797,    825116,   825778,   826115,
828319,   828525,   829912,   830482,   830594
      830633,    872621,    874116,    874797,   875116,   875778,
876115,   878319,   878525,   879912,   880482
      880594,    880633
*ELSET,ELSET=VP000008
      810438,    822970,    823279,    824289,   826525,   826987,
830613,   860438,   872970,   873279,   874289
      876525,    876987,    880613
*ELSET,ELSET=VP000009
      810007,    810070,    810189,    810521,   810718,   810724,
810893,   811321,   812406,   813502,   819990
      822192,    822627,    822689,    822808,   822857,   822904,
823240,   823252,   823337,   823534,   823562
      823695,    823861,    823902,    824083,   824164,   824185,
824198,   824333,   824428,   824479,   824805
      825014,    825085,    825103,    825162,   825247,   825495,
825496,   826149,   826279,   826633,   826740
      826788,    827053,    827062,    827092,   827116,   827188,
827193,   827296,   827369,   827540,   828012
```

```
    828026,   828456,   828618,   828635,   829060,   829100,
829479,   829850,   830005,   830326,   830360
    832572,   833009,   833097,   833269,   833456,   833825,
834667,   834762,   835535,   862354,   863321
    870828,   870875,   871613,   872137,   872802,   872857,
872868,   873899,   874032,   874083,   874528
    876115,   876721,   877126,   877188,   877199,   877926,
879121,   879261,   880020,   880076,   884548
*ELSET,ELSET=VP000010
    812354,   813321,   820828,   820875,   821613,   822137,
822802,   822857,   822868,   823899,   824032
    824083,   824528,   826115,   826721,   827126,   827188,
827199,   827926,   829121,   829261,   830020
    830076,   834548,   860007,   860070,   860189,   860521,
860718,   860724,   860893,   861321,   862406
    863502,   869990,   872192,   872627,   872689,   872808,
872857,   872904,   873240,   873252,   873337
    873534,   873562,   873695,   873861,   873902,   874083,
874164,   874185,   874198,   874333,   874428
    874479,   874805,   875014,   875085,   875103,   875162,
875247,   875495,   875496,   876149,   876279
    876633,   876740,   876788,   877053,   877062,   877092,
877116,   877188,   877193,   877296,   877369
    877540,   878012,   878026,   878456,   878618,   878635,
879060,   879100,   879479,   879850,   880005
    880326,   880360,   882572,   883009,   883097,   883269,
883456,   883825,   884667,   884762,   885535
```

```
1   torso-spread-09.inp
2   **%
3   ================================================================
4   **%
5   **%            I-DEAS 8 ABAQUS STANDARD TRANSLATOR
6   **%                   FOR ABAQUS VERSION 5.8
7   **%
8   **%         MODEL FILE: /u/dar/fs2/p99630/partial.mf1
9   **%         INPUT FILE: /u/dar/fs2/p99630/torso-spread-
10  09.inp
11  **%           EXPORTED: AT 18:03:33 ON 20-Mar-01
12  **%               PART: Part1
13  **%                FEM: Fem1
14  **%
15  **%              UNITS: MM-mm (milli-newton)
16  **%                  ... LENGTH : MM
17  **%                  ... TIME   : sec
18  **%                  ... MASS   : kilogram (kg)
19  **%                  ... FORCE  : milli-newton
20  **%                  ... TEMPERATURE : deg Celsius
21  **%
22  **%     SUBSET EXPORT: OFF
23  **%
24  **%     NODE ZERO TOLERANCE: OFF
25  **%
26  **%
27  ================================================================
28  **%
29  **%
30  *NODE, NSET=torso
31       800001,-6.5779771E-07,-1.0107611E+02, 2.6729970E+02
32       800002,-7.4259121E-07,-1.0099827E+02, 2.8271690E+02
33       800003,-9.2915681E-07,-1.0070500E+02, 2.9799782E+02
34       800004, 1.4019280E-08, 6.2796824E+01, 3.0048155E+02
35       800005,-9.1722038E-09, 5.8766293E+01, 2.8642106E+02
36       800006,-1.5437370E-08, 5.6664992E+01, 2.7180621E+02
37   ...............................................
38       812875, 4.4153182E+01, 2.1023533E+00,-2.6229301E+01
39       812876, 3.6107786E+01,-2.9436223E+01,-9.7953729E-02
40       850160,-2.0069427E+01,-1.0193921E+02, 2.9795181E+02
41       850161,-3.5816844E+01,-9.9696628E+01, 2.9803994E+02
42       850162,-5.0035286E+01,-9.4344819E+01, 2.9807327E+02
43       850163,-6.1078414E+01,-8.7683636E+01, 2.9818489E+02
44       850164,-7.2545925E+01,-8.0918260E+01, 2.9818307E+02
45       850165,-8.6178056E+01,-7.2025444E+01, 2.9824707E+02
46   ...............................................
47       862872,-7.5277412E+01,-4.2007950E+01,-1.8369158E+01
48       862873,-7.5849728E+01, 4.7846327E+01,-1.7786336E+01
49       862874,-1.3968878E+02,-4.9371917E+01, 2.0772505E+01
50       862875,-4.4153182E+01, 2.1023533E+00,-2.6229301E+01
51       862876,-3.6107786E+01,-2.9436223E+01,-9.7953729E-02
52  *node,nset=pel-ref
53       999997, 0.0000000E+00,-4.0759025E+00, 9.3156995E+01
54  *node,nset=fem-refs
55       999998,-8.6929602E+01,-4.0759025E+00, 9.3156995E+01
56       999999, 8.6929602E+01,-4.0759025E+00, 9.3156995E+01
57
```

```
1   panty-partial-membrane-conformal-spread-coarse.inp
2   **%
3   ================================================================
4   **%
5   **%                I-DEAS 8 ABAQUS STANDARD TRANSLATOR
6   **%                       FOR ABAQUS VERSION 5.8
7   **%
8   **%           MODEL FILE: /u/dar/fs2/p99630/partial.mf1
9   **%           INPUT FILE: /u/dar/fs2/p99630/panty-partial-
10  membrane-conformal-spread-coarse.inp
11  **%              EXPORTED: AT 19:28:29 ON 22-Mar-01
12  **%                  PART: Part2
13  **%                   FEM: Fem1
14  **%
15  **%                 UNITS: MM-mm (milli-newton)
16  **%                       ... LENGTH : MM
17  **%                       ... TIME   : sec
18  **%                       ... MASS   : kilogram (kg)
19  **%                       ... FORCE  : milli-newton
20  **%                       ... TEMPERATURE : deg Celsius
21  **%
22  **%      SUBSET EXPORT: OFF
23  **%
24  **%      NODE ZERO TOLERANCE: OFF
25  **%
26  **%
27  ================================================================
28  **%
29  **%
30  *NODE, NSET=panty-part
31        740004, 2.6190451E+01,-4.1675785E+01,-1.4559489E+01
32        740006, 2.7595584E+01, 8.4062732E+01,-2.2838557E+01
33        740007, 1.1636619E+01,-5.8970101E+01, 4.1984343E+00
34        740008, 2.1201023E+01,-6.4534773E+01, 9.3895539E+00
35        740009, 2.9068360E+01,-7.1290136E+01, 1.6376956E+01
36        740010, 3.6561715E+01,-7.8710793E+01, 2.4244325E+01
37   .................
38        751091,-7.1804490E+01, 1.2046414E+02, 1.7805130E+02
39        751092,-7.7337617E+01, 1.1940818E+02, 1.7824766E+02
40        751093,-7.8183401E+01, 1.2056727E+02, 1.7294614E+02
41        751094,-9.4519660E+01, 1.1779975E+02, 1.7830911E+02
42        751095,-8.7700290E+01, 1.1812640E+02, 1.7831431E+02
43  **
44  *ELEMENT, TYPE=T3D2, ELSET=lycra
45   760034, 740151, 740149
46   770038, 750143, 750141
47   760036, 740147, 740145
48   760037, 740145, 740143
49   760035, 740149, 740147
50   ...............................
51   760008, 740313, 740322
52   760005, 740344, 740345
53   760054, 740941, 740940
54   760007, 740346, 740313
55   760006, 740345, 740346
56  **
```

```
*ELEMENT, TYPE=M3D3, ELSET=panty-part
 740001, 740007, 740219, 740096
 740002, 740096, 740219, 740052
 740008, 740051, 740212, 740004
 740011, 740008, 740207, 740007
 ...........................................
 758058, 750615, 750133, 750661
 758059, 750616, 750615, 750661
 758060, 750756, 750755, 750615
 758061, 750616, 750756, 750615
**
*NSET,NSET=PANTY-WAIST-REAR
    740053,    741030,    741073,    741074,    741081,    741082,
 741087,    741088,    741089,    741090,    741091
    741092,    741094,    741095,    751030,    751073,    751074,
 751081,    751082,    751087,    751088,    751089
    751090,    751091,    751092,    751094,    751095
*NSET,NSET=PANTY-WAIST-FRONT
    740110,    740302,    740374,    740407,    740424,    740425,
 740426,    740427,    740455,    740456,    740531
    740535,    740537,    740544,    740545,    740546,    750302,
 750374,    750407,    750424,    750425,    750426
    750427,    750455,    750456,    750531,    750535,    750537,
 750544,    750545,    750546
*NSET,NSET=PANTY-DCN
    740092,
*NSET,NSET=PANTY-RT-LEG
    750004,    750006,    750014,    750132,    750133,    750135,
 750137,    750139,    750141,    750143,    750145
    750147,    750149,    750151,    750153,    750155,    750157,
 750159,    750161,    750163,    750165,    750184
    750185,    750192,    750197,    750202,    750211,    750212,
 750217,    750221,    750229,    750236,    750239
    750303,    750313,    750322,    750324,    750325,    750327,
 750331,    750332,    750340,    750344,    750345
    750346,    750363,    750374,    750776,    750780,    750789,
 750791,    750792,    750794,    750846,    750847
    750866,    750885,    750931,    750938,    750939,    750940,
 750941,    751025,    751027,    751028,    751094
*NSET,NSET=PANTY-LT-LEG
    740004,    740006,    740014,    740132,    740133,    740135,
 740137,    740139,    740141,    740143,    740145
    740147,    740149,    740151,    740153,    740155,    740157,
 740159,    740161,    740163,    740165,    740184
    740185,    740192,    740197,    740202,    740211,    740212,
 740217,    740221,    740229,    740236,    740239
    740303,    740313,    740322,    740324,    740325,    740327,
 740331,    740332,    740340,    740344,    740345
    740346,    740363,    740374,    740776,    740780,    740789,
 740791,    740792,    740794,    740846,    740847
    740866,    740885,    740931,    740938,    740939,    740940,
 740941,    741025,    741027,    741028,    741094
*NSET,NSET=XSYMM-PANTY
    740053,    740054,    740055,    740056,    740057,    740058,
 740059,    740060,    740061,    740064,    740065
    740066,    740067,    740068,    740069,    740070,    740071,
 740072,    740089,    740090,    740091,    740092
```

```
    740093,   740094,   740095,   740096,   740097,   740098,
740099, 740100, 740101, 740102, 740103
    740104,   740105,   740106,   740107,   740108,   740109,
740110
*ELSET,ELSET=PANTY-RT-LEG
    770001,   770002,   770003,   770004,   770005,   770006,
770007, 770008, 770009, 770010, 770011
    770012,   770013,   770014,   770015,   770016,   770017,
770018, 770019, 770020, 770021, 770022
    770023,   770024,   770025,   770026,   770027,   770028,
770029, 770030, 770031, 770032, 770033
    770034,   770035,   770036,   770037,   770038,   770039,
770040, 770041, 770042, 770043, 770044
    770045,   770046,   770047,   770048,   770049,   770050,
770051, 770052, 770053, 770054, 770055
    770056,   770057,   770058,   770059,   770060,   770061,
770062, 770063, 770064, 770065
*ELSET,ELSET=PANTY-LT-LEG
    760001,   760002,   760003,   760004,   760005,   760006,
760007, 760008, 760009, 760010, 760011
    760012,   760013,   760014,   760015,   760016,   760017,
760018, 760019, 760020, 760021, 760022
    760023,   760024,   760025,   760026,   760027,   760028,
760029, 760030, 760031, 760032, 760033
    760034,   760035,   760036,   760037,   760038,   760039,
760040, 760041, 760042, 760043, 760044
    760045,   760046,   760047,   760048,   760049,   760050,
760051, 760052, 760053, 760054, 760055
    760056,   760057,   760058,   760059,   760060,   760061,
760062, 760063, 760064, 760065
```

```
panty-partial-membrane-conformal-spread-coarse-push.inp
**%
================================================================
**%
**%              I-DEAS 8 ABAQUS STANDARD TRANSLATOR
**%                      FOR ABAQUS VERSION 5.8
**%
**%            MODEL FILE: /u/dar/fs2/p99630/partial.mf1
**%            INPUT FILE: /u/dar/fs2/p99630/panty-partial-
membrane-conformal-spread-coarse-push.inp
**%            EXPORTED: AT 16:44:02 ON 28-Mar-01
**%                  PART: Panty-partial-conformal-standing-
coarse
**%                  FEM: Fem1
**%
**%                UNITS: MM-mm (milli-newton)
**%                      ... LENGTH : MM
**%                      ... TIME   : sec
**%                      ... MASS   : kilogram (kg)
**%                      ... FORCE  : milli-newton
**%                      ... TEMPERATURE : deg Celsius
**%
**%      SUBSET EXPORT: OFF
**%
**%      NODE ZERO TOLERANCE: OFF
**%
**%
================================================================
**%
**%
*NODE, NSET=pad-pusher
      780001,  2.6190450E+01,-4.1675780E+01,-1.3559490E+01
      780002,  2.7595580E+01, 8.4062750E+01,-2.1838560E+01
      780003,  1.1636620E+01,-5.8970100E+01, 5.1984350E+00
      780004,  2.1201020E+01,-6.4534780E+01, 1.0389560E+01
      780005,  2.9068360E+01,-7.1290140E+01, 1.7376960E+01
      780006,  3.6561720E+01,-7.8710790E+01, 2.5244330E+01
      780007,  1.9742300E+01,-4.4262460E+01,-6.4584500E+00
................................
      780241,-3.0288630E+01, 9.5030620E+01,-1.9656360E+01
      780242,-3.1368520E+01, 1.1817140E+02,-6.5147640E+00
      780243,-8.5226820E+00, 1.1632100E+02, 9.7427340E+00
      780244,-1.6370000E+01, 1.1820870E+02, 3.5604950E+00
*ELEMENT, TYPE=M3D3, ELSET=pad-pusher
 780001,  780003,  780063,  780023
 780002,  780023,  780063,  780008
 780003,  780007,  780060,  780001
 780004,  780004,  780058,  780003
 780005,  780058,  780063,  780003
.........................................
 780399,  780190,  780233,  780141
 780400,  780190,  780141,  780142
 780401,  780190,  780142,  780204
 780402,  780191,  780190,  780204
 780403,  780234,  780233,  780190
 780404,  780191,  780234,  780190
```

```
 1  deformed-product-mod2.inp
 2  **%
 3  **%==============================================================
 4  **%
 5  **%            I-DEAS 8 ABAQUS STANDARD TRANSLATOR
 6  **%                   FOR ABAQUS VERSION 5.8
 7  **%
 8  **%         MODEL FILE: /u/dar/fs2/p99630/partial.mf1
 9  **%         INPUT FILE: /u/dar/fs2/p99630/deformed-product-
10  mod2.inp
11  **%           EXPORTED: AT 17:32:50 ON 30-Mar-01
12  **%               PART: Deformed-2layer-product-modified
13  **%                FEM: Fem2
14  **%
15  **%              UNITS: MM-mm (milli-newton)
16  **%                      ... LENGTH : MM
17  **%                      ... TIME   : sec
18  **%                      ... MASS   : kilogram (kg)
19  **%                      ... FORCE  : milli-newton
20  **%                      ... TEMPERATURE : deg Celsius
21  **%
22  **%      SUBSET EXPORT: OFF
23  **%
24  **%      NODE ZERO TOLERANCE: OFF
25  **%
26  **%
27  **%==============================================================
28  **%
29  **%
30  *NODE, NSET=product
31         30001,-3.4487802E+01,  6.8883717E+01,-4.4105511E+00
32         30002,-3.0007512E+01,  3.8483710E+01,-6.7437290E+00
33         30003,-3.0031287E+01,  1.7333930E-01,-6.3940083E-01
34         30004,-2.4048079E+01,  6.7824498E-02,-9.9434975E-01
35         30005,-2.3937481E+01,  7.7896531E+01,-1.7323619E+00
36         30006,-3.1790039E-06,  1.0043778E+02,  7.3885206E+00
37         30007,-7.4375087E-07,  1.0569289E+02,  1.2086141E+01
38  ............................
39        115040,  1.5641820E+01,-5.1718454E+01,  3.0090672E+01
40        115041,  1.3718556E+01,-5.0556136E+01,  2.9144523E+01
41        115042,  1.4075688E+01,-5.1844215E+01,  3.0180101E+01
42        115043,  1.2828171E+01,-5.1989349E+01,  3.0288984E+01
43  *ELEMENT, TYPE=C3D6, ELSET=shaping
44      48001,   30761,   30207,   30770,   40761,   40207,   40770
45      48002,   30761,   30208,   30207,   40761,   40208,   40207
46      48003,   32113,   32122,   30207,   42113,   42122,   40207
47      48004,   32113,   30207,   30208,   42113,   40207,   40208
48  ............................
49      68024,   52981,   54650,   52982,   62981,   64650,   62982
50      68031,   54836,   52957,   54845,   64836,   62957,   64845
51      68032,   54836,   52958,   52957,   64836,   62958,   62957
52      68033,   53505,   53514,   52957,   63505,   63514,   62957
53      68034,   53505,   52957,   52958,   63505,   62957,   62958
54  *ELEMENT, TYPE=C3D6, ELSET=distribution
55      98001,   60761,   60207,   60770,   90761,   90207,   90770
56      98002,   62113,   62122,   60207,   92113,   92122,   90207
57      98011,   61927,   60232,   61930,   91927
```

```
       ............
       118012, 100575, 100578, 100232, 110575, 110578, 110232
       118021, 103319, 102982, 103322, 113319, 112982, 113322
       118022, 104650, 104653, 102982, 114650, 114653, 112982
       118031, 104836, 102957, 104845, 114836, 112957, 114845
       118032, 103505, 103514, 102957, 113505, 113514, 112957
*ELEMENT, TYPE=C3D8R, ELSET=shaping
   40001,   30001,   30016,   30463,   30460,   40001,   40016,
 40463,   40460
   40002,   30138,   30001,   30460,   30469,   40138,   40001,
 40460,   40469
   40003,   30029,   30002,   30397,   30402,   40029,   40002,
 40397,   40402
   40004,   30002,   30030,   30405,   30397,   40002,
       ............
   64940,   55157,   55158,   55163,   55162,   65157,   65158,
 65163,   65162
   64941,   55166,   55164,   55158,   55157,   65166,   65164,
 65158,   65157
   64942,   55158,   55159,   55161,   55163,   65158,   65159,
 65161,   65163
   64943,   55164,   55165,   55159,   55158,   65164,   65165,
 65159,   65158
   64944,   55163,   55161,   55160,   55162,   65163,   65161,
 65160,   65162
*ELEMENT, TYPE=C3D8R, ELSET=distribution
   90279,   60008,   60139,   60902,   60788,   90008,   90139,
 90902,   90788
   90280,   60246,   60008,   60788,   60805,   90246,   90008,
 90788,   90805
   90281,   60176,   60009,   60185,   60567,   90176,   90009,
 90185,   90567
   90282,   60578,   60177,   60010,   60232,   90578,   90177,
 90010,   90232
   90283,   60233,   60812,   60186,   60011,   90233,   90812,
 90186,   90011
       ...................
  114759, 105042, 105041, 105035, 105043, 115042, 115041,
 115035, 115043
  114760, 105036, 105040, 105042, 105037, 115036, 115040,
 115042, 115037
  114761, 105037, 105042, 105043, 105038, 115037, 115042,
 115043, 115038
  114762, 105040, 105039, 105041, 105042, 115040, 115039,
 115041, 115042
**
*NSET,NSET=PULL-FRONT
    42771,   42869,   44254,   52771,   52869,   54254
*NSET,NSET=PULL-REAR
    40007,   40110,   41516,   50007,   50110,   51516
**
*ELSET,ELSET=TOPSHAPE
    60001,   60002,   60003,   60004,   60005,   60006,
  60007,   60008,   60009,   60010,   60011
    60012,   60013,   60014,   60015,   60016,   60017,
  60018,   60019,   60020,   60021,   60022
```

```
       60023,    60024,    60025,    60026,    60027,    60028,
  60029,    60030,    60031,    60032,    60033
       60034,    60035,    60036,    60037,    60038,    60039,
  60040,    60041,    60042,    60043,    60044
............................
      114740,   114741,   114742,   114743,   114744,   114745,
 114746,   114747,   114748,   114749,   114750
      114751,   114752,   114753,   114754,   114755,   114756,
 114757,   114758,   114759,   114760,   114761
      114762,   118001,   118002,   118011,   118012,   118021,
 118022,   118031,   118032
**
*ELSET,ELSET=X000002
48001,48002,48003,48004,48011,48012,48013,48014,48021,48022,4
8023,48024
48031,48032,48033,48034
*ELSET,ELSET=X000003
40001,40002,40003,40004,40005,40006,40007,40008,40009,40010,4
0011,40012
40013,40014,40015,40016,40017,40018,40019,40020,40021,40022,4
0023,40024
40025,40026,40027,40028,40029,40030,40031,40032,40033,40034,4
0035,40036
40037,40038,40039,40040,40041,40042,40043,40044,40045,40046,4
0047,40048
..................................
44893,44894,44895,44896,44897,44898,44899,44900,44901,44902,4
4903,44904
44905,44906,44907,44908,44909,44910,44911,44912,44913,44914,4
4915,44916
44917,44918,44919,44920,44921,44922,44923,44924,44925,44926,4
4927,44928
44929,44930,44931,44932,44933,44934,44935,44936,44937,44938,4
4939,44940
44941,44942,44943,44944
*ELSET,ELSET=X000004
68002,68004,68012,68014,68022,68024,68032,68034,118001,118002
,118011,118012
118021,118022,118031,118032
*ELSET,ELSET=X000005
60001,60002,60003,60004,60005,60006,60007,60008,60009,60010,6
0011,60012
60013,60014,60015,60016,60017,60018,60019,60020,60021,60022,6
0023,60024
60025,60026,60027,60028,60029,60030,60031,60032,60033,60034,6
0035,60036
60037,60038,60039,60040,60041,60042,60043,60044,60045,60046,6
0047,60048
60049,60050,60051,60052,60053,60054,60055,60056,60057,60058,6
0059,60060
60061,60062,60063,60064,60065,60066,60067,60068,60069,60070,6
0071,60072
60073,60074,60075,60076,60077,60078,60079,60080,60081,60082,6
0083,60084
60085,60086,60087,60088,60089,60090,60091,60092,60093,60094,6
0095,60096
```

```
60097,60098,60099,60100,60101,60102,60103,60104,60105,60106,6
0107,60108
..........................
114707,114708,114709,114710,114711,114712,114713,114714,11471
5,114716,114717
114718,114719,114720,114721,114722,114723,114724,114725,11472
6,114727,114728
114729,114730,114731,114732,114733,114734,114735,114736,11473
7,114738,114739
114740,114741,114742,114743,114744,114745,114746,114747,11474
8,114749,114750
114751,114752,114753,114754,114755,114756,114757,114758,11475
9,114760,114761
114762,
*ELSET,ELSET=X000006
98001,98011,98021,98031,108001,108011,108021,108031,118001,11
8011,118021
118031,
*ELSET,ELSET=X000007
40001,40002,40003,40004,40005,40011,40012,40013,40014,40015,4
0016,40017
40018,40019,40020,40021,40022,40023,40024,40025,40026,40027,4
0028,40029
40030,40031,40032,40033,40034,40035,40036,40037,40038,40039,4
0040,40115
40116,40119,40120,40121,40122,40123,40124,40125,40126,40127,4
0128,40129
.................................
110310,110311,110312,110313,110314,110315,110316,110317,11031
8,110319,
110320
110381,110382,110383,110384,110385,110386,110387,114284,11428
5,114286,
114289
114290,114291,114292,114293,114294,114295,114296,114297,11429
8,114299,
114300
114301,114302,114303,114304,114305,114306,114307,114308,11430
9,114310,
114311
114312,114313,114314,114315,114316,114317,114318,114319,11432
0,114321,
114322
114323,114324,114325,114386,114387,114388,114389,114390,11439
1,114392
*ELSET,ELSET=X000008
41336,41337,41338,41339,41340,41346,41347,41348,41349,41350,4
1351,41352
41353,41354,41355,41356,41357,41358,41359,41360,41361,41362,4
1363,41364
41365,41366,41367,41368,41369,41370,41371,41372,41373,41374,4
1375,41450
41451,41454,41455,41456,41457,41458,41459,41460,41461,41462,4
1463,41464
42671,42672,42673,42674,42675,42681,42682,42683,42684,42685,4
2686,42687
```

```
42688,42689,42690,42691,42692,42693,42694,42695,42696,42697,4
2698,42699
........................................
111634,111635,111636,111637,111638,111639,111640,111641,11164
2,111643,
111644
111645,111646,111647,111648,111649,111650,111651,111652,11165
3,111654,
111655
111716,111717,111718,111719,111720,111721,111722,112949,11295
0,112951,
112954
112955,112956,112957,112958,112959,112960,112961,112962,11296
3,112964,
112965
112966,112967,112968,112969,112970,112971,112972,112973,11297
4,112975,
112976
112977,112978,112979,112980,112981,112982,112983,112984,11298
5,112986,
112987
112988,112989,112990,113051,113052,113053,113054,113055,11305
6,113057
*ELSET,ELSET=X000009
98002,98012,98022,98032,108002,108012,108022,108032,118002,11
8012,118022
118032,
*ELSET,ELSET=X000010
41345,41436,41437,41438,41439,41440,41441,41442,41443,41444,4
1445,41446
41447,41448,41449,41452,42680,42771,42772,42773,42774,42775,4
2776,42777
42778,42779,42780,42781,42782,42783,42784,42787,51345,51436,5
1437,51438
51439,51440,51441,51442,51443,51444,51445,51446,51447,51448,5
1449,51452
52680,52771,52772,52773,52774,52775,52776,52777,52778,52779,5
2780,52781
52782,52783,52784,52787,61345,61436,61437,61438,61439,61440,6
1441,61442
61443,61444,61445,61446,61447,61448,61449,61452,62680,62771,6
2772,62773
62774,62775,62776,62777,62778,62779,62780,62781,62782,62783,6
2784,62787
90388,90389,90419,90420,90428,90436,90444,90452,90460,90468,9
0476,90484
90492,90500,90508,90516,90524,90532,90540,90548,90556,90564,9
0572,91618
91710,91711,91712,91713,91714,91715,92953,93045,93046,93047,9
3048,93049
93050,94393,94394,94424,94425,94433,94441,94449,94457,94465,9
4473,94481
94489,94497,94505,94513,94521,94529,94537,94545,94553,94561,9
4569,94577
100388,100389,100419,100420,100428,100436,100444,100452,10046
0,100468,
100476
```

```
100484,100492,100500,100508,100516,100524,100532,100540,10054
8,100556,
100564
100572,101618,101710,101711,101712,101713,101714,101715,10295
3,103045,
103046
103047,103048,103049,103050,104393,104394,104424,104425,10443
3,104441,
104449
104457,104465,104473,104481,104489,104497,104505,104513,10452
1,104529,
104537
104545,104553,104561,104569,104577,110388,110389,110419,11042
0,110428,
110436
110444,110452,110460,110468,110476,110484,110492,110500,11050
8,110516,
110524
110532,110540,110548,110556,110564,110572,111618,111710,11171
1,111712,
111713
111714,111715,112953,113045,113046,113047,113048,113049,11305
0,114393,
114394
114424,114425,114433,114441,114449,114457,114465,114473,11448
1,114489,
114497
114505,114513,114521,114529,114537,114545,114553,114561,11456
9,114577
*ELSET,ELSET=X000011
40010,40101,40102,40103,40104,40105,40106,40107,40108,40109,4
0110,40111
40112,40113,40114,40117,44015,44106,44107,44108,44109,44110,4
4111,44112
44113,44114,44115,44116,44117,44118,44119,44122,50010,50101,5
0102,50103
50104,50105,50106,50107,50108,50109,50110,50111,50112,50113,5
0114,50117
..............................................
111811,111819,111827,111835,111843,111851,111859,111867,11187
5,111883,
111891
111899,111907,113058,113059,113089,113090,113098,113106,11311
4,113122,
113130
113138,113146,113154,113162,113170,113178,113186,113194,11320
2,113210,
113218
113226,113234,113242,114288,114380,114381,114382,114383,11438
4,114385

END
```

```
APPENDIX 3  FLUID LOADING EXAMPLE
**DIAPER - FLUID ADDITION EMBODIMENT - Method 2
*HEADING
**    UNITS
**    Length = mm
**    Time = msec
**    Mass = grams
**    Force = N
**    Stress = MPa
**
** Note - only portions of input file relating to fluid
addition changes are included herein.  Refer to Appendix 1
for a standard dry file including node definition, element
difinition, contact examples, etc.
...
...
** Definition of wet thicknesses
** Region: (L1-9:Picked), (Controls:EC-1)
*Elset, elset=_I4, internal
   441,  442,  443,  444,  445,...
   ..., 3496
** Section: L1-9
*Shell Section, elset=_I4, Composite, Controls=EC-1,
Offset=0.456175
2.29,,abs_r2
0.22,,cover
** Region: (L1-8:Picked), (Controls:EC-1)
*Elset, elset=_I5, internal
   646,  647,  648,  649,  650,...
   ..., 3761
** Section: L1-8
*Shell Section, elset=_I5, Composite, Controls=EC-1,
Offset=0.491143
12.2,,abs_r1
0.22,,cover
** Region: (L1-4:Picked), (Controls:EC-1)
*Elset, elset=_I12, internal, generate
 2597,  2656,    1
** Section: L1-4
*Shell Section, elset=_I12, Composite, Controls=EC-1,
Offset=0.310811
2.29,,abs_r2
0.22,,cover
0.45,,pub
** Region: (L1-3:Picked), (Controls:EC-1)
*Elset, elset=_I13, internal, generate
 2657,  2812,    1
** Section: L1-3
*Shell Section, elset=_I13, Composite, Controls=EC-1,
Offset=0.310811
2.29,,abs_r2
0.22,,cover
0.45,,pub
** Region: (L1-7:Picked), (Controls:EC-1)
*Elset, elset=_I15, internal, generate
 3762,  3785,    1
```

```
** Section: L1-7
*Shell Section, elset=_I15, Composite, Controls=EC-1,
Offset=0.456488
12.20,,abs_r1
0.22,,cover
0.45,,pub
...
...
*End Instance
**
...
...
**
** Definition of absorbent properties at varying saturations
**
...
...
*Material, name=abs_r1
*Damping, alpha=0.02
*Density
 0.00024,
*Hyperfoam, n=3
   -0.006939,    21.4172,   0.0077043,       25., 0.00025899,
 -4.91048,          0.,           0.
         0.,          0.
   -0.0428417,   22.6612,   0.0443775,       25., 0.00082775,
 -1.2478,           0.,           0.
         0.,          1.
   -0.016068,    20.2784,   0.017417,        25., 0.00068687,
 -1.94632,          0.,           0.
         0.,          2.
   -0.017421,    22.0776,   0.018581,        25., 0.00040253,
 -3.60798,          0.,           0.
         0.,          3.
   -0.019916,    22.1649,   0.02113,         25., 0.00045415,
 -3.225,            0.,           0.
         0.,          4.
*Material, name=abs_r2
*Damping, alpha=0.02
*Density
 0.00024,
*Hyperfoam, n=3
   -0.006939,    21.4172,   0.0077043,       25., 0.00025899,
 -4.91048,          0.,           0.
         0.,          0.
   -0.016319,    22.5173,   0.017329,        25., 0.0003326,
 -4.17455,          0.,           0.
         0.,          4.
   -0.017712,    21.6224,   0.018958,        25., 0.00048611,
 -3.02368,          0.,           0.
         0.,          5.
   -0.016331,    21.0054,   0.017625,        25., 0.00055065,
 -2.64196,          0.,           0.
         0.,          6.
   -0.016385,    20.1398,   0.017719,        25., 0.00075518,
 -1.6208,           0.,           0.
         0.,          7.
```

```
      ...
115   ...
      **
      ** Initial Condition - Temperature specifying dry state
      **
      ** Name: Sat_abs_props_r1   Type: Temperature
120   *Initial Conditions, type=TEMPERATURE
      absorbent-r1, 0.
      ** Name: Sat_abs_props_r2   Type: Temperature
      *Initial Conditions, type=TEMPERATURE
      absorbent-r2, 0.
125   ** ----------------------------------------------------------
      ------
      **
      ...
      ...
130   **
      ** STEP: Move to sitting - dry
      **
      *Step, name=Step-7-sit1
      move to sitting
135   *Dynamic, Explicit
      , 1000.
      *Bulk Viscosity
      0.06, 1.2
      **
140   ** BOUNDARY CONDITIONS - sitting movement
      **
      ** Name: abduction Type: Connector displacement
      ** Applies To: hip-joint
      *Connector Motion, amplitude=ramp-to-one
145   _abduction_CnSet_, 4, 0.524
      _abduction_CnSet_, 5, 1.35
      _abduction_CnSet_, 6
      **
      ** LOADS - initial gravity level
150   **
      ** Name: Diaper_grav   Type: Gravity
      *Dload, op=NEW, amplitude=ramp-to-one
      wholediaper, GRAV, 0.00981, 1., 0., 0.
      **
155   ** FIELDS - dry absorbent properties
      **
      ** Name: Sat_abs_props_r1   Type: Temperature
      *Temperature, amplitude=hold_const
      absorbent-r1, 0.
160   ** Name: Sat_abs_props_r2   Type: Temperature
      *Temperature, amplitude=hold_const
      absorbent-r2, 0.
      **
      ** OUTPUT REQUESTS
165   **
      *Restart, write, number interval=1, time marks=NO
      **
      ** FIELD OUTPUT: F-Output-1
      **
170   *Output, field, variable=PRESELECT
```

```
**
** HISTORY OUTPUT: H-Output-1
**
*Output, history, variable=PRESELECT
*End Step
** ------------------------------------------------------------------
**
** STEP: Move to standing - dry
**
*Step, name=Step-8-stand1
move to standing
*Dynamic, Explicit
, 1000.
*Bulk Viscosity
0.06, 1.2
**
** BOUNDARY CONDITIONS - movement of torso
**
** Name: abduction Type: Connector displacement
** Applies To: hip-joint
*Connector Motion, amplitude=ramp-to-zero
_abduction_CnSet_, 4, 0.524
_abduction_CnSet_, 5, 1.35
_abduction_CnSet_, 6
**
** LOADS - initial gravity level
**
** Name: Diaper_grav   Type: Gravity
*Dload, op=NEW, amplitude=hold_const
wholediaper, GRAV, 0.00981, 1., 0., 0.
**
** FIELDS - dry absorbent properties
**
** Name: Sat_abs_props_r1   Type: Temperature
*Temperature, amplitude=hold_const
absorbent-r1, 0.
** Name: Sat_abs_props_r2   Type: Temperature
*Temperature, amplitude=hold_const
**
** OUTPUT REQUESTS
**
*Restart, write, number interval=1, time marks=NO
**
** FIELD OUTPUT: F-Output-1
**
*Output, field, variable=PRESELECT
**
** HISTORY OUTPUT: H-Output-1
**
*Output, history, variable=PRESELECT
*End Step
** ------------------------------------------------------------------
**
** STEP: Addition of fluid
**
```

```
*Step, name=Step-9-fluid1
*Dynamic, Explicit
, 1000.
*Bulk Viscosity
0.06, 1.2
**
** LOADS - initial gravity and gravity due to fluid loading
**
** Name: Diaper_grav   Type: Gravity
*Dload, op=NEW, amplitude=hold_const
wholediaper, GRAV, 0.00981, 1., 0., 0.
** Name: Saturation_Load_R1   Type: Gravity
*Dload, op=NEW, amplitude=ramp-to-one
absorbent-r1, GRAV, 0.02534, 1., 0., 0.
**
** FIELDS - changing absorbent properties in region one
**
** Name: Sat_abs_props_r1   Type: Temperature
*Temperature, amplitude=ramp-to-one
absorbent-r1, 1.
** Name: Sat_abs_props_r2   Type: Temperature
*Temperature, amplitude=hold_const
absorbent-r2, 0.
**
** OUTPUT REQUESTS
**
*Restart, write, number interval=1, time marks=NO
**
** FIELD OUTPUT: F-Output-1
**
*Output, field
*Node Output
U, V, A, RF
*Element Output
S, E, PE, PEEQ, LE, TEMP, FV
*Contact Output
CSTRESS, CFORCE
**
** HISTORY OUTPUT: H-Output-1
**
*Output, history, variable=PRESELECT
*End Step
** ----------------------------------------------------------------
** Repeated motion steps in wet condition
** ----------------------------------------------------------------
**
**
** STEP: Relaxation Step
**
*Step, name=Step-12-relax
relax
*Dynamic, Explicit
, 1000.
*Bulk Viscosity
0.06, 1.2
```

```
**
** LOADS - initial gravity and gravity due to fluid loading
**
** Name: Diaper_grav   Type: Gravity
*Dload, op=NEW, amplitude=hold_const
wholediaper, GRAV, 0.00981, 1., 0., 0.
** Name: Saturation_Load_R1   Type: Gravity
*Dload, op=NEW, amplitude=hold_const
absorbent-r1, GRAV, 0.02534, 1., 0., 0.
**
** FIELDS - wet absorbent properties in region one
**
** Name: Sat_abs_props_r1   Type: Temperature
*Temperature, amplitude=hold_const
absorbent-r1, 1.
** Name: Sat_abs_props_r2   Type: Temperature
*Temperature, amplitude=hold_const
absorbent-r2, 0.
** Name: contract-elastic   Type: Temperature
*Temperature, amplitude=ramp-temp
leg_flap_elatic, -0.5
** Name: contract-waist-elas   Type: Temperature
*Temperature, amplitude=ramp-temp
waist_elastics, -0.35238
**
** OUTPUT REQUESTS
**
*Restart, write, number interval=1, time marks=NO
**
** FIELD OUTPUT: F-Output-1
**
*Output, field, variable=PRESELECT
**
** HISTORY OUTPUT: H-Output-1
**
*Output, history, variable=PRESELECT
*End Step
```

What is claimed is:

1. A method of evaluating a product worn on a body, the method comprising the steps of:
    creating a computer based product sub-model of the product, at least one parameter of the product sub-model being variable as a function of fluid loading of the product;
    creating a computer based interaction model comprising at least in part instructions corresponding to varying the fluid loading of the product over time;
    combining the product sub-model and the interaction model in a use model which, when run, simulates interaction of components of the product model, wherein said at least one parameter of the product sub-model varies during the simulation as a function of said instructions corresponding to fluid loading of the product over time; and
    evaluating the use model to determine the performance of at least one product feature of the product in response to said varying the fluid loading of the product over time.

2. The method set forth in claim 1 wherein the use model simulates interaction of components of the product model to produce a first representation of said at least one product feature of the product corresponding to a generally dry condition of the product and to further produce a second representation of said at least one product feature of the product corresponding to a fluid loaded condition of said product.

3. The method set forth in claim 1 wherein the use model simulates interaction of components of the product model to produce a first representation of said at least one product feature of the product corresponding to a first fluid loaded condition of the product and to further produce a second representation of said at least one product feature of the product corresponding to a second fluid loaded condition of said product different from said first fluid loaded condition.

4. The method set forth in claim 1 wherein the at least one parameter of the product sub-model that is variable as a function of fluid loading of the product is selected from the group comprising stress-strain relationships of the product, thickness of the product and weight of the product.

5. The method set forth in claim 1 further comprising creating a computer based environmental sub-model, the interaction model further comprising instructions defining how the environment sub-model interacts with the product sub-model, the combining step comprising combining the product sub-model, the environmental sub-model and the interaction model.

6. The method set forth in claim 5 wherein at least one parameter of the environmental sub-model is variable as a function of fluid loading of the product, the combining step comprising combining the product sub-model, the environmental sub-model and the interaction model to simulate interaction of components of the product model upon varying said at least one parameter of the product sub-model and said at least one parameter of the environmental sub-model as a function of said fluid loading instructions.

7. The method set forth in claim 1 wherein the at least one product feature is selected from the group consisting of product deformation, product droop, product stresses, product force vectors, product curvature, product contact shear, and product contact pressure.

8. The method set forth in claim 1 wherein the step of creating the use model comprises modeling an elapse of time during which the product is loaded with a fluid.

9. The method set forth in claim 1 wherein the body sub-model is selected to be representative of a wearer of the product.

10. The method set forth in claim 9 wherein the body sub-model is based on at least one of demographic and anthropometric data.

11. The method set forth in claim 1 wherein the product is an article of clothing.

12. The method set forth in claim 1 wherein the product is an absorbent product.

13. The method set forth in claim 12 wherein the product is a diaper.

14. The method set forth in claim 1 further comprising modifying the product sub-model in response to the determined performance of said at least one product feature in a fluid loaded condition of the product and then reperforming the combining step and the evaluating step.

15. The method set forth in claim 14 further comprising repeating the steps of modifying the product sub-model in response to the determined performance of said at least one product feature in the fluid loaded condition of the product and reperforming the combining and evaluating steps until the performance of said at least one product feature meets a determined level.

16. The method set forth in claim 1 wherein the interaction model further comprises at least one field variable, the step of creating a computer based product sub-model of the product in which at least one parameter of the product sub-model is variable as a function of fluid loading of the product comprises linking in said product sub-model said at least one parameter to said field variable, the fluid loading instructions of the interaction model comprising instructions to vary said field parameter over an elapsed simulation period to thereby simulate fluid loading of the product.

17. The method set forth in claim 16 wherein the field variable corresponds to a fluid saturation level of the product.

18. A method of evaluating a product worn on a body, the method comprising the steps of:
    creating a computer based body sub-model of at least a portion of the body on which the product is positioned;
    creating a computer based product sub-model of the product, at least one parameter of the product sub-model being variable as a function of fluid loading of the product;
    creating a computer based interaction model comprising instructions defining how the body sub-model and the product sub-model interact and further comprising instructions corresponding to varying the fluid loading of the product over time;
    combining the body sub-model, the product sub-model and the interaction model in a use model which, when run, simulates interaction between the body sub-model and the product sub-model in response to the instructions varying the fluid loading of the product during the simulation; and
    evaluating the use model to determine the performance of at least one product feature of the product in response to said varying the fluid loading of the product over time.

19. The method set forth in claim 18 wherein the use model simulates interaction between the body sub-model and the product sub-model to produce a first representation of said at least one product feature of the product corresponding to a generally dry condition of the product and to further produce a second representation of said at least one product feature of the product corresponding to a fluid loaded condition of said product.

20. The method set forth in claim 18 wherein the use model simulates interaction between the body sub-model and the product sub-model to produce a first representation of said at least one product feature of the product corresponding to a first fluid loaded condition of the product and to further produce a second representation of said at least one product feature of the product corresponding to a second fluid loaded condition of said product different from said first fluid loaded condition.

21. The method set forth in claim 18 wherein the at least one product feature is selected from the group consisting of product deformation, product droop, product stresses, product force vectors, product curvature, product contact shear, contact pressure of the product against the body, surface area of coverage of the product on the body, conformance of the product to the body surface area and gaps between the product and body surfaces.

22. The method set forth in claim 18 further comprising creating a computer based environmental sub-model, the interaction model further comprising instructions defining how the environment sub-model interacts with at least one of the body sub-model and the product sub-model, the combining step comprising combining the body sub-model, the product sub-model, the environmental sub-model and the interaction model.

23. The method set forth in claim 22 wherein at least one parameter of the environmental sub-model is variable as a function of fluid loading of the product, the combining step comprising combining the body sub-model, the product sub-model, the environmental sub-model and the interaction model to simulate interaction between the body sub-model and the product sub-model upon varying said at least one parameter of the product sub-model and said at least one parameter of the environmental sub-model as a function of said fluid loading.

24. The method set forth in claim 18 wherein the interaction model further comprises instructions for simulating movement of the body, the use model determining the interaction between the body sub-model and the product sub-model during simulated movement of the body.

25. The method set forth in claim 24 wherein the interaction model comprises instructions for simulating movement of the body following fluid loading of the product.

26. The method set forth in claim 25 wherein the interaction model further comprises instructions for simulating movement of the body prior to fluid loading of the product.

27. The method set forth in claim 18 wherein the interaction model comprises instructions for simulating a plurality of sequential fluid loadings of the product.

28. The method set forth in claim 18 wherein the at least one parameter of the product sub-model that is variable as a function of fluid loading of the product is selected from the group comprising stress-strain relationships of the product, thickness of the product and weight of the product.

29. The method set forth in claim 18 further comprising modifying at least one of the body sub-model and the product sub-model in response to the determined performance of said at least one product feature in a fluid loaded condition of the product and then reperforming the combining step and evaluating step.

30. The method set forth in claim 29 further comprising repeating the steps of modifying the body sub-model and/or the product sub-model in response to the determined performance of said at least one product feature in the fluid loaded condition of the product and reperforming the combining and evaluating steps until the performance of said at least one product feature meets a determined level.

31. The method set forth in claim 18 wherein the interaction model further comprises at least one field variable, the step of creating a computer based product sub-model of the product in which at least one parameter of the product sub-model is variable as a function of fluid loading of the product comprises linking in said product sub-model said at least one parameter to said field variable, the fluid loading instructions of the interaction model comprising instructions to vary said field parameter over an elapsed simulation period to thereby simulate fluid loading of the product.

32. The method set forth in claim 31 wherein the field variable corresponds to a fluid saturation level of the product.

33. The method set forth in claim 18 wherein the body sub-model is selected to be representative of a wearer of the product.

34. The method set forth in claim 33 wherein the body sub-model is based on at least one of demographic and anthropometric data.

35. The method set forth in claim 33 wherein the body sub-model is selected to be representative of a first wearer of the product, the method further comprising modifying the body sub-model to be representative of a second wearer of the product wherein the second wearer is of a different size than the first wearer, reperforming the combining step and evaluating step, and comparing at least one performance feature of the product on the first wearer to said at least one feature of the product on the second wearer.

36. The method set forth in claim 35 wherein said at least one performance feature of the product is selected from the group consisting of product deformation, product droop, product stresses, product force vectors, product curvature, product contact shear, contact pressure of the product against the body, surface area of coverage of the product on the body, conformance of the product to the body surface area and gaps between the product and body surfaces.

37. A method of evaluating a product worn on a body, the method comprising the steps of:
   creating a computer based body sub-model of at least a portion of the body on which the product is positioned
   creating a computer based product sub-model of the product, said product sub-model comprising at least one of product material data and product geometry data;
   creating a computer based interaction model comprising instructions defining how the body sub-model and the product sub-model interact, and a field variable, at least one parameter of said at least one of the product material data and the product geometry data of the product sub-model being variable as a function of said field variable, said interaction model further comprising instructions for varying said field variable as a function of elapsed simulation time to thereby vary said at least one parameter;
   combining the body sub-model, the product sub-model and the interaction model in a use model which, when run, simulates an elapse of time during which said at least one parameter is modified to thereby modify the product sub-model from a first condition of the product to a second condition thereof, said use model simulating interaction between the body sub-model and the product sub-model to produce, during a single run, a first representation of at least one product feature of the product corresponding to said first condition of the product and to further produce, during the single run, a second representation of said at least one product feature of the product corresponding to said second condition of the product; and evaluating the use model to determine the performance of said at least one product feature of the product during said elapsed simulation time.

* * * * *